United States Patent
Li

(10) Patent No.: US 10,237,396 B2
(45) Date of Patent: Mar. 19, 2019

(54) LAUNCHING APPLICATIONS FROM A LOCK SCREEN OF A MOBILE COMPUTING DEVICE VIA USER-DEFINED SYMBOLS

(71) Applicant: Eric Qing Li, Daytona Beach Shores, FL (US)

(72) Inventor: Eric Qing Li, Daytona Beach Shores, FL (US)

( * ) Notice: Subject to any disclaimer, the term of this patent is extended or adjusted under 35 U.S.C. 154(b) by 0 days.

(21) Appl. No.: 15/809,637

(22) Filed: Nov. 10, 2017

(65) Prior Publication Data

US 2018/0091644 A1 Mar. 29, 2018

Related U.S. Application Data

(60) Continuation of application No. 14/886,044, filed on Oct. 17, 2015, and a division of application No. 13/935,034, filed on Jul. 3, 2013.

(51) Int. Cl.
| | |
|---|---|
| *H04M 1/725* | (2006.01) |
| *H04W 4/02* | (2018.01) |
| *H04W 72/04* | (2009.01) |
| *H04M 1/67* | (2006.01) |
| *G06F 3/0488* | (2013.01) |
| *H04M 1/60* | (2006.01) |

(52) U.S. Cl.
CPC .... *H04M 1/72572* (2013.01); *G06F 3/04883* (2013.01); *H04M 1/67* (2013.01); *H04M 1/72519* (2013.01); *H04M 1/72522* (2013.01); *H04W 4/025* (2013.01); *H04M 1/6016* (2013.01); *H04M 1/6083* (2013.01); *H04M 1/72552* (2013.01); *H04M 1/72566* (2013.01); *H04M 2250/10* (2013.01); *H04M 2250/12* (2013.01); *H04M 2250/22* (2013.01); *H04M 2250/74* (2013.01)

(58) Field of Classification Search
CPC ......... H04M 1/72572; H04W 72/0446; H04W 4/025
See application file for complete search history.

(56) References Cited

U.S. PATENT DOCUMENTS

| | | | | |
|---|---|---|---|---|
| 7,365,737 B2* | 4/2008 | Marvit | .................... | G06F 3/017 345/156 |
| 2012/0058783 A1* | 3/2012 | Kim | ...................... | G06F 1/1626 455/456.2 |

(Continued)

*Primary Examiner* — Kamran Afshar
*Assistant Examiner* — Minjung Kim

(57) ABSTRACT

A first task and a second task executable by a mobile computing device are associated with a first predefined symbol and a second predefined symbol, respectively. The first task and the second task are different types of tasks executable by the mobile computing device after the mobile computing device has been unlocked. Through a touch-sensitive display of the mobile computing device, a first gesture input from a user is detected while the mobile computing device is locked. The first gesture input represents the first predefined symbol. In response to the detecting the first gesture input, the first task is executed. Through the touch-sensitive display of the mobile computing device, a second gesture input from the user is detected while the mobile computing device is locked. The second gesture input represents the second predefined symbol. In response to the detecting the second gesture input, the second task is executed.

20 Claims, 35 Drawing Sheets

(56) References Cited

U.S. PATENT DOCUMENTS

| | | | |
|---|---|---|---|
| 2013/0106742 A1* | 5/2013 | Lee | G06F 3/0484 345/173 |
| 2013/0283199 A1* | 10/2013 | Selig | G06F 3/0484 715/781 |
| 2014/0215496 A1* | 7/2014 | Sexton | G06F 3/048 719/318 |

* cited by examiner

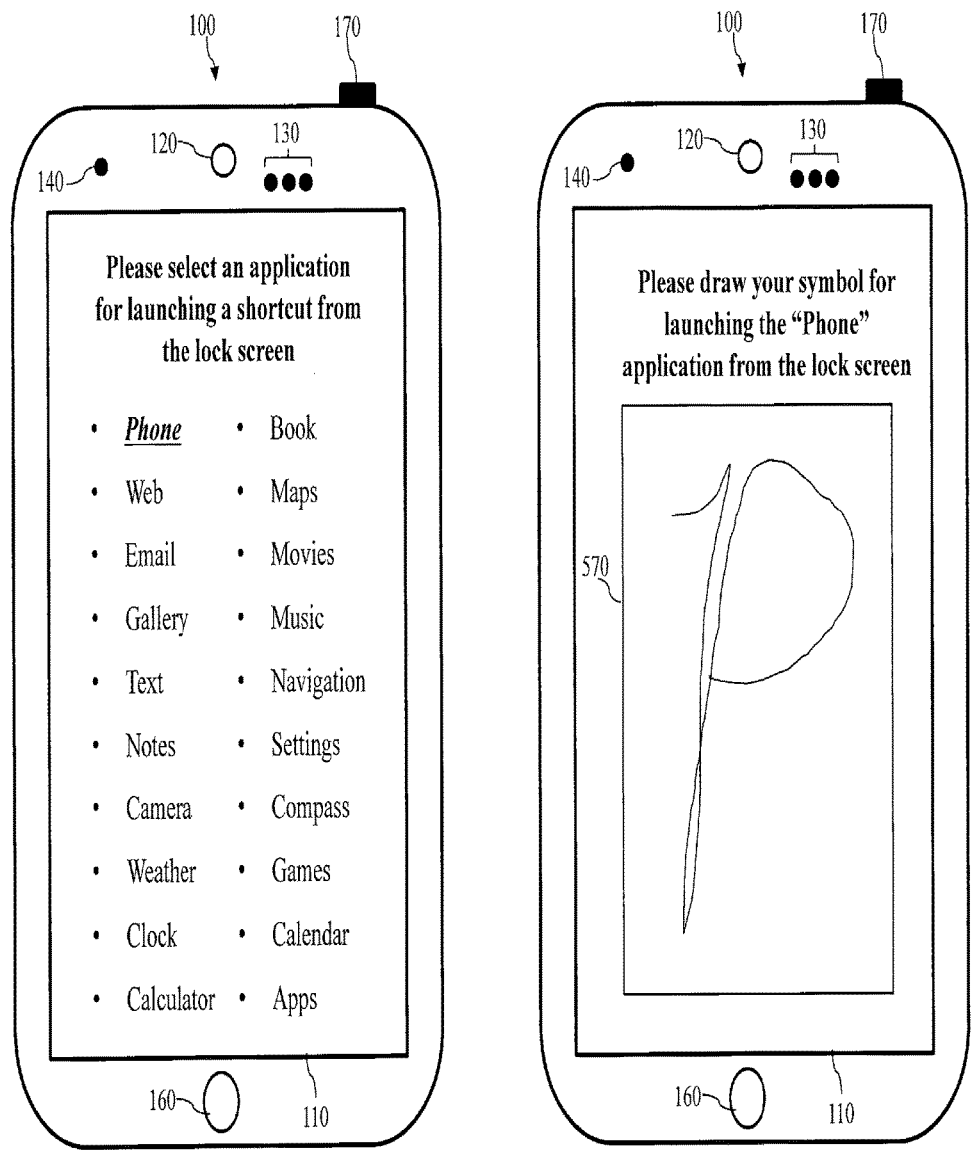

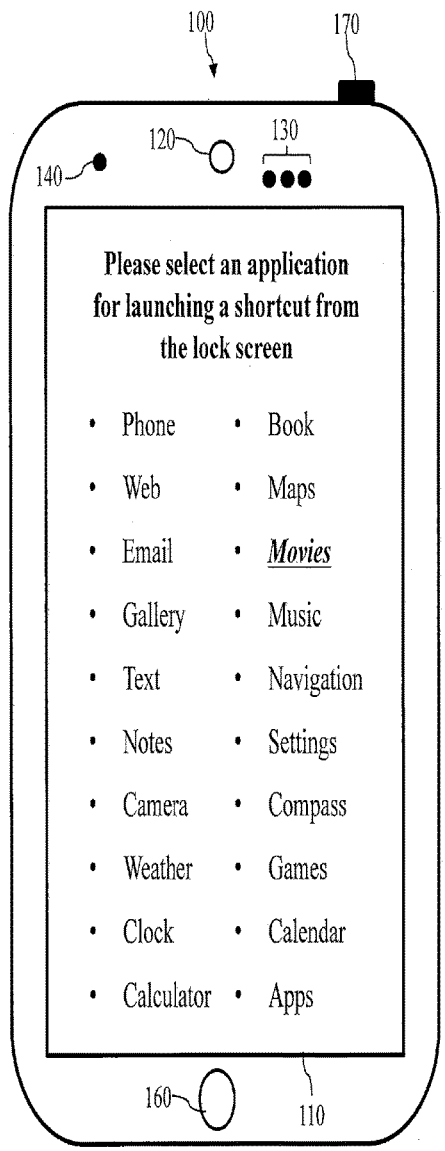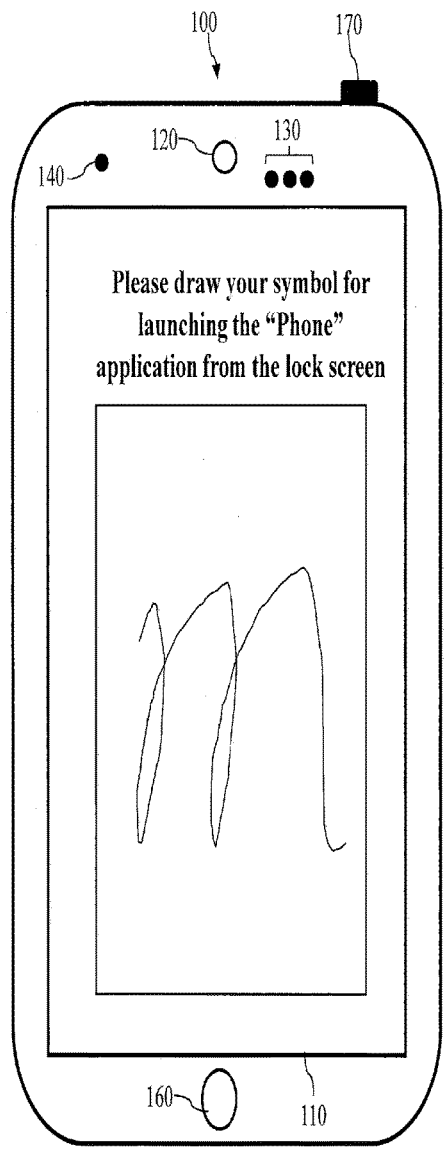
Fig. 14A                                   Fig. 14B

LAUNCHING APPLICATIONS FROM A LOCK SCREEN OF A MOBILE COMPUTING DEVICE VIA USER-DEFINED SYMBOLS

PRIORITY DATA

The present application is a continuation application of U.S. patent application Ser. No. 14/886,044, filed on Oct. 17, 2015, entitled "Automatic Volume Control Based on Context and Location", which is a divisional application of U.S. patent application Ser. No. 13/935,034, filed on Jul. 3, 2013, entitled "Automatic Volume Control Based on Context and Location", the disclosures of which are hereby incorporated by reference in their respective entireties.

BACKGROUND

Technical Field

The present disclosure generally relates to improving the interface and usability of a mobile computing device, such as a smartphone or a tablet computer.

Related Art

In recent years, the rapid advances in computer technology and broadband telecommunications have enhanced the popularity of mobile computing devices such as tablet computers and smartphones. Among other things, these mobile computing devices can be used to browse the web, play games, music, or videos, take pictures, send/receive emails, etc. However, existing mobile computing devices may still have various drawbacks that limit their usability or versatility. These drawbacks may lead to user frustration.

Therefore, while existing mobile computing devices have been generally adequate for their intended purposes, they have not been entirely satisfactory in every aspect.

BRIEF DESCRIPTION OF THE DRAWINGS

FIGS. 12, 13A-16A, 13B-16B, 17-20, 21A-21B, 22-24, and 25A-25B are diagrammatic views of various interfaces of an example mobile computing device for an improved lock screen according to various aspects of the present disclosure.

DETAILED DESCRIPTION

Figure 1:
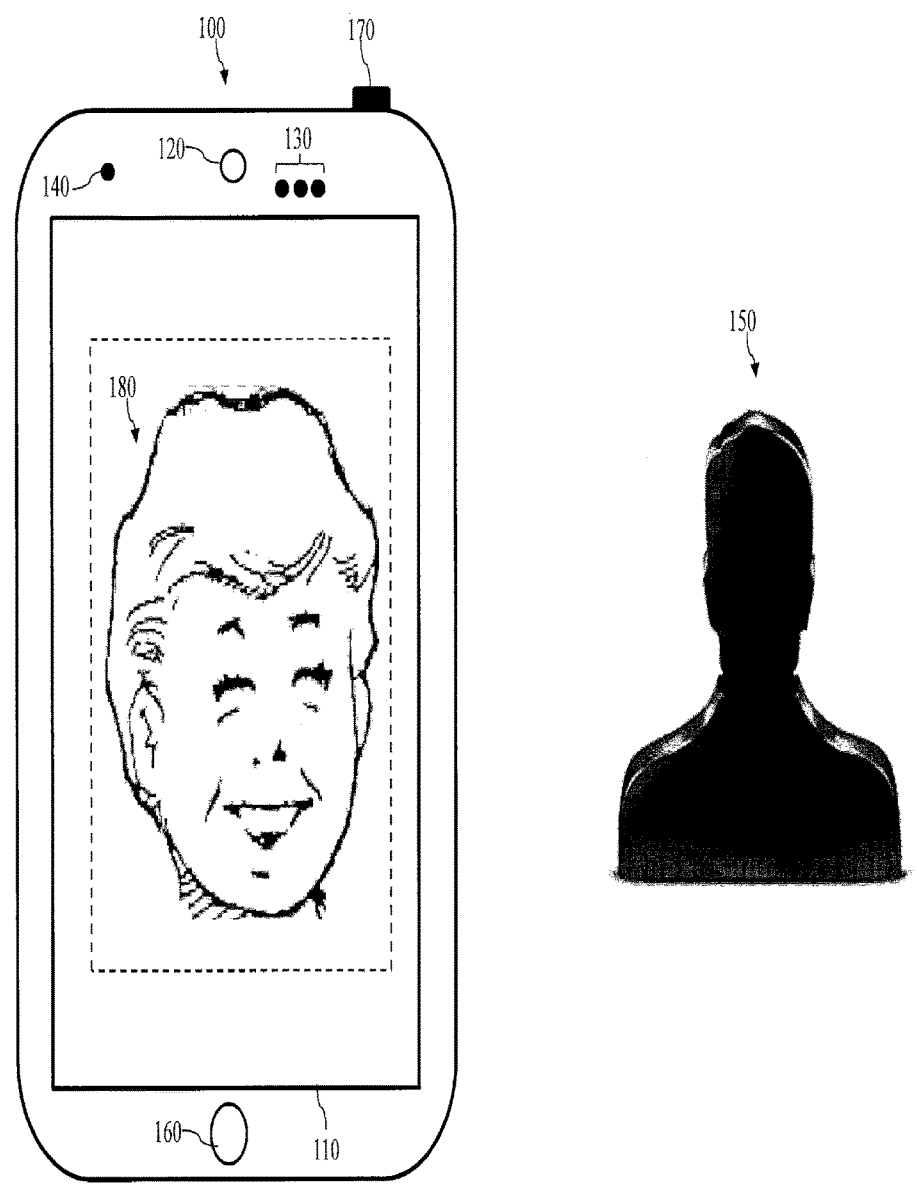
FIG. 1 is a diagrammatic view of an example mobile computing device and a user for performing a face-unlock according to various aspects of the present disclosure.

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity. In addition, the present disclosure may repeat reference numerals and/or letters in the various examples. This repetition is for the purpose of simplicity and clarity and does not in itself dictate a relationship between the various embodiments and/or configurations discussed As used herein, the term "about" refers to a +/−5% variation from the nominal value. As used herein, the term "and/or" includes any and all combinations of one or more of the associated listed items. As used herein, the singular forms "a", "an", and "the" are intended to include the plurality forms as well, unless the context clearly and specifically indicates otherwise. In addition, unless defined otherwise, all technical and scientific terms used herein have the same meaning as commonly understood by one of ordinary skill in the art to which this disclosure belongs.

In recent years, the rapid advances in computer technology and broadband telecommunications have led the growing popularity of mobile computing devices such as tablet computers and mobile telephones. A user of these mobile computing devices can perform a plurality of tasks on these mobile computing devices, for example tasks that previously required a conventional desktop or laptop computer. Among other things, a user can play movies/videos, browse the web, play games, view photographs, listen to digital music, read e-books, receive navigational instructions, send and receive emails, conduct audio or video telephone calls, perform word processing/spreadsheet calculation/presentation management tasks, or take advantage of additional functionalities offered by applications (apps) that can be downloaded from online app stores.

However, the mobile computing devices may still have certain drawbacks that limit the versatility and the usability of these devices. The present disclosure offers solutions to overcome these drawbacks, as discussed in more detail below.

Maintaining secured access to a user's mobile computing device (e.g., smartphone or a tablet computer) has always been a challenge to their manufacturers (or makers of an operating system that runs on these devices). For example, it may be desirable to limit the access to a smartphone or a tablet computer to an authorized user only. This may be referred to as "unlocking" the smartphone or tablet computer. Some methods of adding security to the unlocking process involve using password protection, that is, a user needs to input a correct password to gain access to the smartphone or tablet computer. Recently, a "face-unlock" method has also been employed to unlock a smartphone or tablet computer. To perform the face-unlock process, a user basically lets the camera of the smartphone or tablet computer capture a facial image of the user. The smartphone or tablet computer then compares the captured facial image to a previously-stored facial image and determines whether the user who is attempting to unlock the smartphone or tablet computer is the authorized user having the previously-stored facial image.

Although the face-unlock process has proven useful to some degree, one drawback that it suffers is tied to inconsistent performance based on poor lighting conditions. For example, if the user attempts to perform the face-unlock process in a poorly-lit environment, the camera of the smartphone or tablet computer often times is not able to capture a good enough facial image of the user, and the face-unlock process may fail as a result. The user may then be asked to perform an alternative method of unlocking the phone. This is frustrating to the user, who may then abandon the face-unlock process altogether after suffering through a few failed attempts.

The present disclosure proposes methods and devices that offer an improved face-unlock experience for the user.

Referring to FIG. 1, a simplified diagrammatic view of a mobile computing device 100 is illustrated. In some embodiments, the mobile computing device 100 may be a laptop computer, or a tablet computer (for example, APPLE's® IPAD®, an ANDROID® tablet, a WINDOWS® powered tablet, or a BLACKBERRY® tablet), or a mobile telephone (for example, APPLE's® IPHONE®, an ANDROID® smartphone, a WINDOWS® smartphone, or a BLACKBERRY® smartphone), or a wear-able electronic device (e.g., a smart watch or glass).

In some embodiments, the mobile computing device 100 may include a touch-sensitive display (or touch screen) 110 for displaying one or more visual objects. However, it is understood that the various aspects of the present disclosure may apply to a non-touch screen display as well. For example, whereas a touch screen device may detect user input via sensing the contact and the movement of the user's fingers or a stylus on the touch screen, a non-touch screen device may detect user input via more traditional mechanisms such as a mouse, a keyboard, a remote control, a gesture, or voice commands.

The mobile computing device 100 may further include a camera 120. The camera 120 may be any type of image-capturing device suitable for implementation on a smartphone or a tablet computer, for example a camera that contains a CMOS image sensor. The camera 120 is configured to capture both still shots (photographs) of a person or an object, or a motion video of the person or object.

The mobile computing device 100 also includes a lighting mechanism 130 that is capable of producing or illuminating light. In the embodiment shown in FIG. 1, the lighting mechanism 130 includes a plurality of light-emitting diodes (LEDs), but it may include additional or other types of light-producing devices in alternative embodiments. When activated, the LEDs emit light. The intensity and color of the emitted light can be controlled by software implemented on the mobile computing device 100. It is understood that both the camera 120 and the lighting mechanism 130 are implemented on a "front" side of the mobile computing device 100 (i.e., the same side as the display 110). However, the mobile computing device 100 may further include a different camera and/or another lighting mechanism on the back side of the mobile computing device 100 as well.

The mobile computing device 100 further includes an ambient light sensor 140. The ambient light sensor 140 is configured to gauge how much light is available in an area near the mobile computing device. In other words, the ambient light sensor 140 can be used to determine whether the mobile computing device 140 is located in a well-lit or a poorly-lit environment.

Suppose a user 150 now wishes to perform a face-unlock process. The user 150 may press a home button 160 or a power button 170 of the mobile computing device 100, which may turn on the display 110 and thereafter initiate the face-unlock process automatically. In some embodiments, however, the user 150 may also be first asked to perform another task before the face-unlock process is initiated. For example, the user 150 may be asked to swipe an object on the display 110 after the home button 160 or the power button 170 is pressed before the face-unlock process is initiated. By performing these actions, the user 150 essentially sends a request to the mobile computing device 100 that he/she wishes to gain access to the mobile computing device.

After the mobile computing device 100 receives the user's request to gain access to the device, it instructs the ambient light sensor 140 to sense or detect an ambient light condition near the mobile computing device 100. The detected ambient light condition is then compared to a predefined lighting condition threshold. For example, the predefined lighting condition threshold may be a minimum lighting condition that allows a user's face to be clearly captured by the camera 120. In some embodiments, this predefined lighting condition threshold may be preset by a manufacturer of the mobile computing device 100 or by the maker of the operating system running on the mobile computing device 100.

In other embodiments, the predefined lighting condition threshold is actually determined through a calibration process. For example, at the time when the user 150 initially configures (or sets up) the face-unlock action with the mobile computing device 100, the user 150 may be asked to position his/her face in front of the mobile computing device 100 such that his/her face can be captured by the camera 120. While the user's face is being continuously captured by the camera 120, the mobile computing device 100 turns on the lighting mechanism 130 and gradually increases its lighting output. The increasing of the light output of the lighting mechanism 130 causes the ambient lighting situation to continuously improve as well. Thus, the ambient light sensor 140 is instructed to continuously detect the ambient lighting condition while the light output of the lighting mechanism 130 is increased. At some point, the camera 120 can capture a satisfactorily clear facial image of the user 150, and the ambient lighting condition detected by the ambient light sensor 140 corresponding to the satisfactory capture of the user's facial image is stored in the mobile computing device 100 as the predefined lighting condition threshold. To ensure the accuracy of the calibration process, the user 150 may be asked to go into a dimly-lit environment to perform the calibration process.

Returning to FIG. 1, regardless of how the predefined lighting condition threshold is determined, the mobile computing device 100 compares the detected ambient lighting condition with the predefined lighting condition threshold. Based on the comparison, the mobile computing device 100 determines whether the ambient lighting condition is below the predefined lighting condition threshold. If not, the mobile computing device 100 may continue with the face-unlock action, in which the user 150 may be asked to position his/her face in front of the mobile computing device 100 such that his/her facial image 180 is within a specified location of the display 110, for example within the dotted lines as shown in FIG. 1. In other words, if the detected ambient lighting condition reveals that the mobile computing device 100 (and therefore the user 150) is located in a well-lit environment, the face-unlock action is unlikely to encounter any problems and may therefore continue "normally."

On the other hand, if the mobile computing device 100 determines the ambient lighting condition is below the predefined lighting condition threshold, the mobile computing device 100 activates the lighting mechanism 130 such that it illuminates light. The light is sufficient to clearly illuminate the user 150's face. The mobile computing device 100 then performs the face-unlock action for the user 150 while the light is illuminated by the lighting mechanism. By doing so, the user 150's face can be satisfactorily captured by the camera 120 (i.e., captured as a clear facial image 180) even if the user 150 and the mobile computing device 100 are located in a poorly-lit environment. Therefore, the face-unlock action may be performed with a substantially reduced failure rate. It is understood that the specific sequence of activating the lighting mechanism 130 and prompting the user 150 to position his/her face in front of the camera 120 is not important. One can be performed before the other, or vice versa, or they can be performed simultaneously.

In some embodiments, instead of activating the lighting mechanism 130 (e.g., LEDs) to illuminate light, the mobile computing device 100 may turn on a portion of (or all of) the display 110. The display 110 of the mobile computing device 100 may contain a plurality of LEDs each capable of emitting light, or some other light-producing element. As such, the mobile computing device 100 may instruct a portion of the display 110 (for example the portion outside of the dotted lines) to emit bright white light, which also serves to illuminate the user 150's face. In other words, the illuminated display 110 serves a similar function as light emitted by the lighting mechanism 130, and vice versa. Hence, they can be interchangeably used, or used in combination with each other to achieve even more light in certain embodiments.

Regardless of how the light is output by the mobile computing device 100, the user 150's face is captured as a clear facial image 180, which may then be compared with a stored facial image of the user 150 to determine if the user 150 is an authorized user. The stored facial image of the user 150 may be generated when the user 150 initially sets up the face-unlock for the mobile computing device 100, for example during the calibration process discussed above. In some embodiments, the mobile computing device 100 may capture a "live" video of the facial image 180 of the user 150 and compares the video to the stored facial image (or video) of the authorized user. In that sense, the term "facial image" herein may refer to both a still photograph and a motion video.

Assuming the user 150 is an authorized user, he/she may then be authenticated and gain access to the mobile computing device 100 even if he/she is in a poorly-lit environment. By detecting the ambient lighting environment and implementing a corresponding light illumination, the present disclosure substantially improves the reliability of a face-unlock action for the mobile computing device 100 and enhances the likelihood that it will be actually used by prospective users as a security-protection mechanism for accessing the mobile computing device 100.

Figure 2:
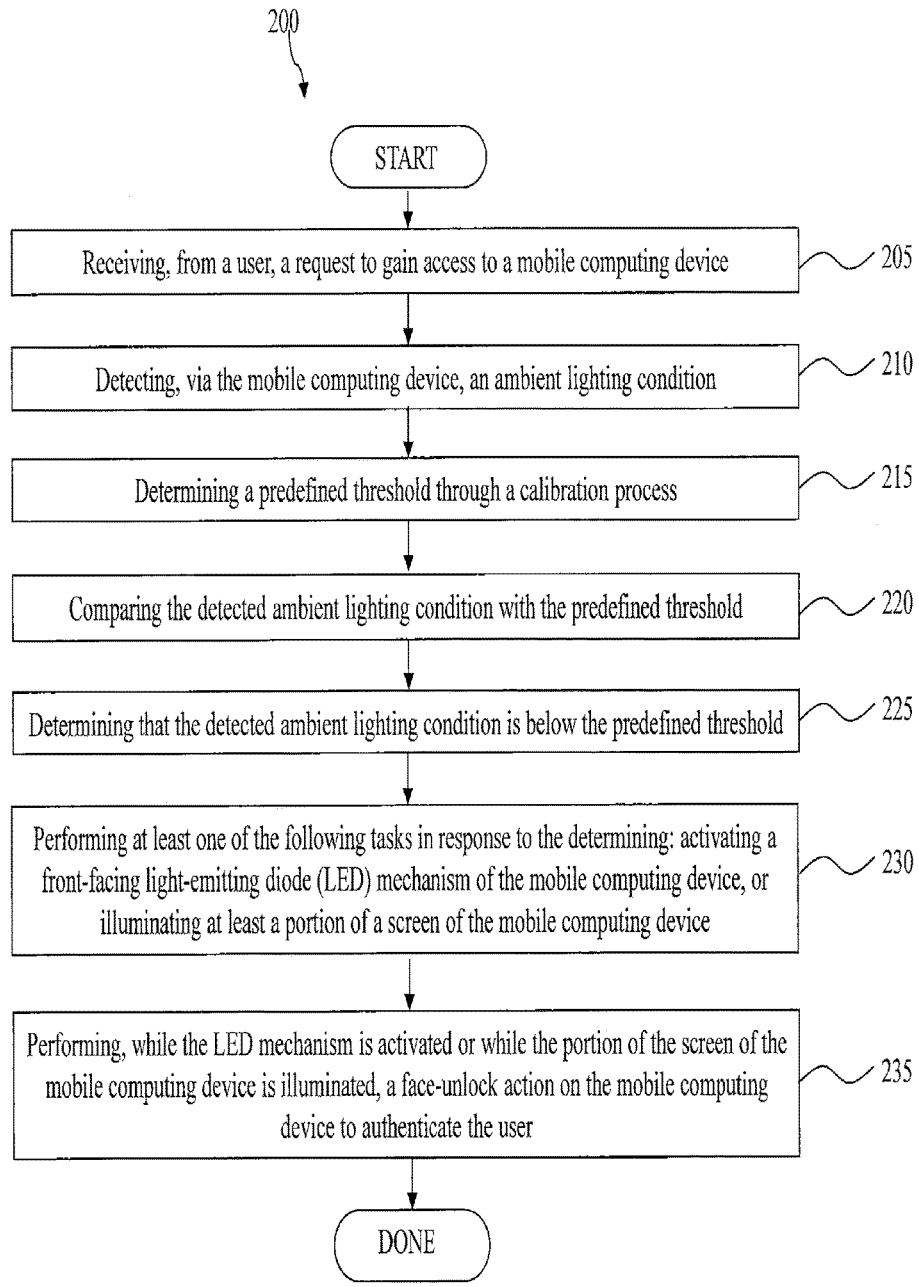
FIG. 2 is a flowchart illustrating an example method for using the mobile computing device to perform a face-unlock according to various aspects of the present disclosure.

FIG. 2 is a simplified flowchart illustrating a method 200 for performing the face-unlock process discussed above. One or more steps of the 200 are performed by a mobile computing device of the user. In some embodiments, the mobile computing device includes a mobile telephone, a tablet computer, a laptop computer, or a wear-able electronic device.

The method 200 includes a step 205, in which a request to gain access to a mobile computing device is received from a user. The method 200 includes a step 210, in which an ambient lighting condition is detected via the mobile computing device. The method 200 includes a step 215, in which the predefined threshold is determined through a calibration process. The method 200 includes a step 220, in which the detected ambient lighting condition is compared with a predefined threshold. The method 200 includes a step 225, in which the detected ambient lighting condition is determined to be below the predefined threshold. The method 200 includes a step 230, in which at least one of the following tasks is performed in response to the step 225: activating a front-facing light-emitting diode (LED) mechanism of the mobile computing device, or illuminating at least a portion of a screen of the mobile computing device. The method 200 includes a step 235, in which a face-unlock action is performed on the mobile computing device to authenticate the user. The step 235 is performed while the LED mechanism is activated or while the portion of the screen of the mobile computing device is illuminated.

In some embodiments, the step 235 includes the following steps: activating a front-facing camera of the mobile computing device; displaying, on the screen of the mobile computing device, a facial image of the user captured by the front-facing camera; prompting the user to move the captured facial image to a specified location on the screen; and comparing the captured facial image to a stored facial image of the user; granting access to the user if the captured facial image matches the stored facial image of the user; and denying access to the user if the captured facial image fails to match the stored facial image of the user.

In some embodiments, the predefined threshold in step 215 is a minimum lighting condition that allows the user's face to be clearly captured by a camera of the mobile computing device. In some embodiments, the step of receiving the request from the user in step 205 includes detecting the mobile computing device being powered on. In some embodiments, the step of detecting the ambient lighting condition in step 210 is performed using an ambient light sensor implemented on the mobile computing device.

It is understood that addition process steps may be performed before, during, or after the steps 205-235 in FIG. 2, but they are not specifically illustrated in FIG. 2 for reasons of simplicity. It is also understood that, unless otherwise specified, the steps 205-235 of the method 200 are not necessarily performed in numerical order.

The discussions above with reference to FIGS. 1-2 describe an improved face-unlock process according to the present disclosure. In addition to face-unlock, the present disclosure also offers an improved voice-unlock process. In more detail, a voice-unlock process generally involves recording a voice-based password from a user, who will then be prompted to speak that recorded voice-based password when such user wants to access the mobile computing device. However, such voice-based password is a static password. That is, once the mobile computing device of the user (or a remote server) stores the user-spoken voice-based password, it remains the password unless the user decides to change it. The static nature of the voice-based password decreases reliability and security of the voice-unlock process. For example, a hacker may somehow obtain that static voice-based password (e.g., through a secret recording) and may then use that password to gain illegal access to the user's mobile computing device. In other words, when the password always remains the same, it is more prone to theft or cracking, and therefore does not offer the optimal security protection for a user.

In comparison, the present disclosure offers a dynamic voice-unlock process. The voice-based password dynamically changes from time to time, which may occur without the user actively demanding or initiating the change. The dynamic voice-unlock process is discussed in more detail below with reference to FIGS. 3-7. Similar elements appearing in FIGS. 1, 3-6 are labeled the same for reasons of clarity and consistency.

Figure 3:
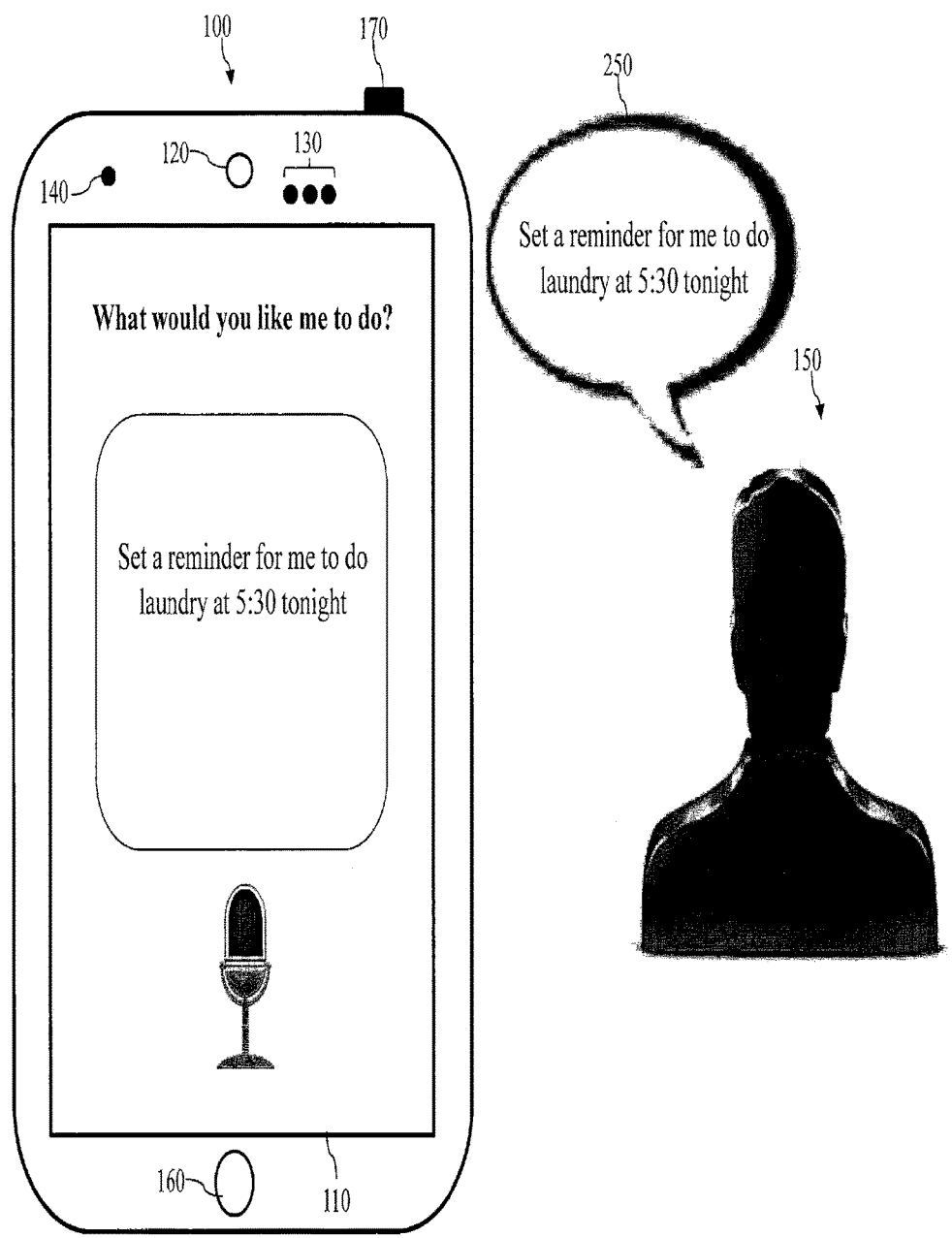
FIGS. 3-6 are diagrammatic views of an example mobile computing device and a user for performing a voice-unlock according to various aspects of the present disclosure.

Referring to FIG. 3, the user 150 of a mobile computing device 100 may engage in voice-based interactions with the mobile computing device 100 periodically. In some embodiments, these voice-based interactions include voice-based commands issued by the user 150 to initiate tasks to be performed by the mobile computing device 100. For example, the user 150 may issue a voice command such as "call dad's work phone", "set a reminder for me to do laundry at 5:30 tonight", "send a text message to Chris", "turn up the volume", "navigate me to 100 Drury lane" etc. The user may also issue a query to the mobile computing device 100, for example "what is the score of the Yankees-Red Sox game last night", "what is the weather for this weekend", "how many feet are in a mile", etc. In some other embodiments, the voice-based interactions include voice-dictations made by the user 150. For example, the mobile computing device 100 may allow the user 150 to dictate the content of an email, a text, or a voice search. With a click of a button, the user 150 may dictate, as an example text message, "I am unable to make it to dinner tonight, sorry guys, maybe next time." In yet other embodiments, the voice-based interaction may include a telephone call made by the user 150.

According to the various aspects of the present disclosure, the mobile computing device 100 may be activated periodically to record a spoken phrase 250 from the user 150 while the mobile computing device 100 is engaged in the voice-based interactions with the user 150. For example, while the user 150 is issuing the command "set a reminder for me to do laundry at 5:30 tonight," the mobile computing device 100 is activated to record this phrase. As another example, while the user 150 is issuing the query "what is the score of the Yankees-Red Sox game last night," the mobile computing device 100 is activated to record this phrase as well. As yet another example, while the user 150 is dictating the text message "I can't make it to dinner tonight, sorry guys, maybe next time", the mobile computing device 100 is activated to record this phrase as well.

In some embodiments, the mobile computing device 100 records the spoken voice phrase 250 from the voice-based interaction only if the phrase 250 is intelligible or comprehensible. That is, the mobile computing device 100 needs to have a high confidence level that the voice phrase it recorded is indeed what it "thinks" it is. For example, this may be verified by the mobile computing device 100 repeating (either by voice or text) the phrase and then prompting the user 150 to confirm that the recorded phrase is indeed what the user 150 meant to say. In other embodiments, the mobile computing device 100 may initially record voice phrases 250 that may or may not be 100% accurate. The subsequent actions from the user may help the mobile computing device 100 determine the accuracy of the recorded phrase though. For example, if the user dictates a sentence, and the mobile computing device displays that sentence on the screen 110, if the user 150 does not enter any corrections to that sentence, the mobile computing device 100 may deem that sentence correctly entered. In other words, the mobile computing device 100 may deem that the voice phrase 250 spoken by the user 150 has been accurately captured.

In some embodiments, the recording of the voice phrase 250 by the user 150 is performed without alerting the user 150. Stated differently, the user 150 need not be informed that a voice phrase 250 he/she just spoke was captured or recorded by the mobile computing device 100. In other embodiments, however, the mobile computing device 100 may alert the user 150 that the mobile computing device 100 is indeed recording the voice phrase 250 spoken by the user as a part of the voice-based interaction. For example, the mobile computing device 100 may display an alert such as "your voice command is now being recorded" or something similar on the display 110.

According to the present disclosure, the mobile computing device 100 will use the recorded phrase 250 (or a portion thereof) to generate a dynamically-changing voice password. For example, with the example shown in FIG. 3, the voice phrase 250 is "set a reminder for me to do laundry at 5:30 tonight." The mobile computing device 100 may then select one or more words of this phrase as the password. The selection may be done so that a random segment of the phrase 250 is selected to be the password. For example, the words "set a reminder" may be selected as a voice password. As another example, the words "do laundry" may be selected as a voice password. The selected words may not necessarily be words that are adjacent to each other. For example, the words "do laundry tonight" may be selected as a voice password, even though the words "at 5:30" is between the words "do laundry" and "tonight." In some embodiments, multiple segments of a single phrase may each be saved as a password. Therefore, in the example above, the words "set a reminder", "do laundry", and "do laundry tonight" may all each be saved as a password.

Figure 4:
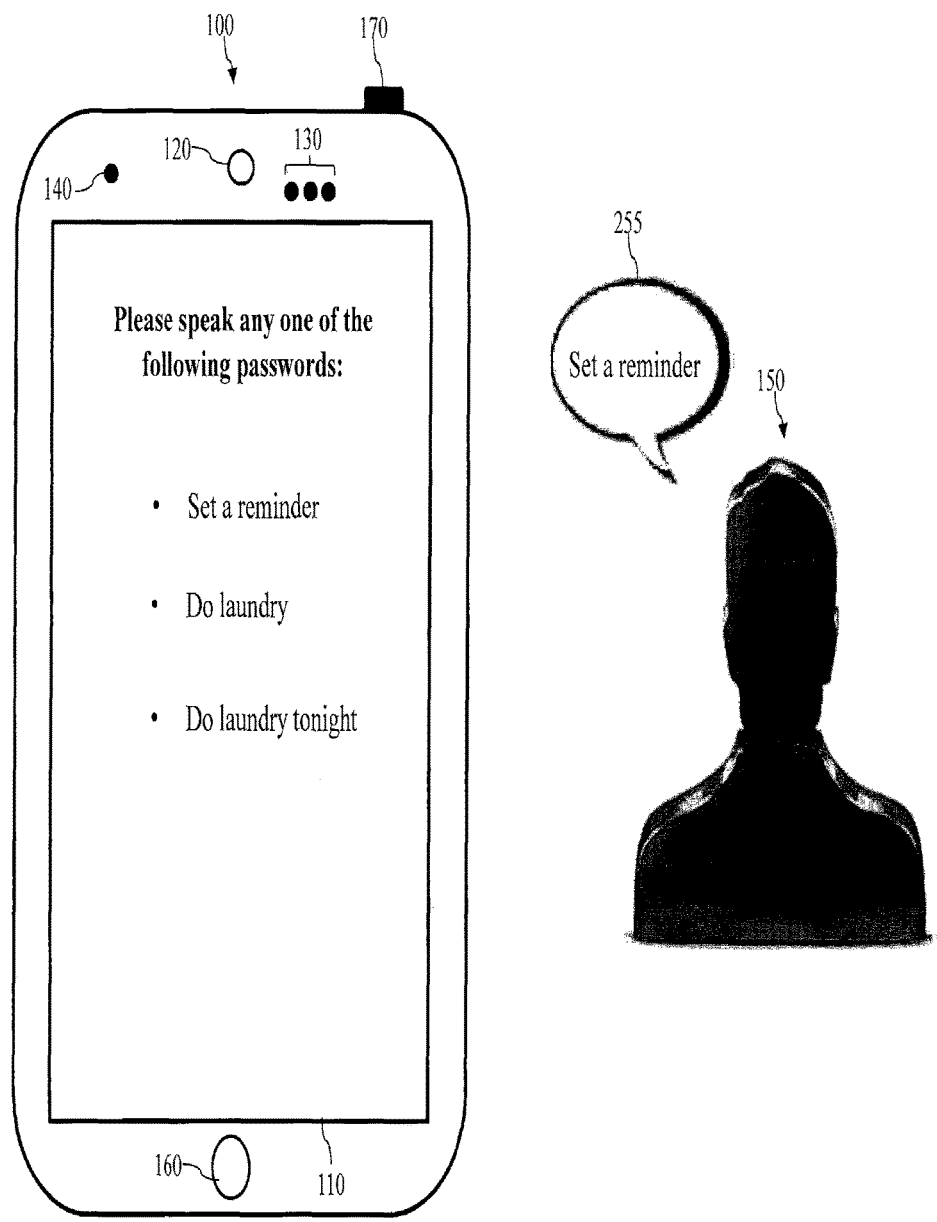
Figure 5:
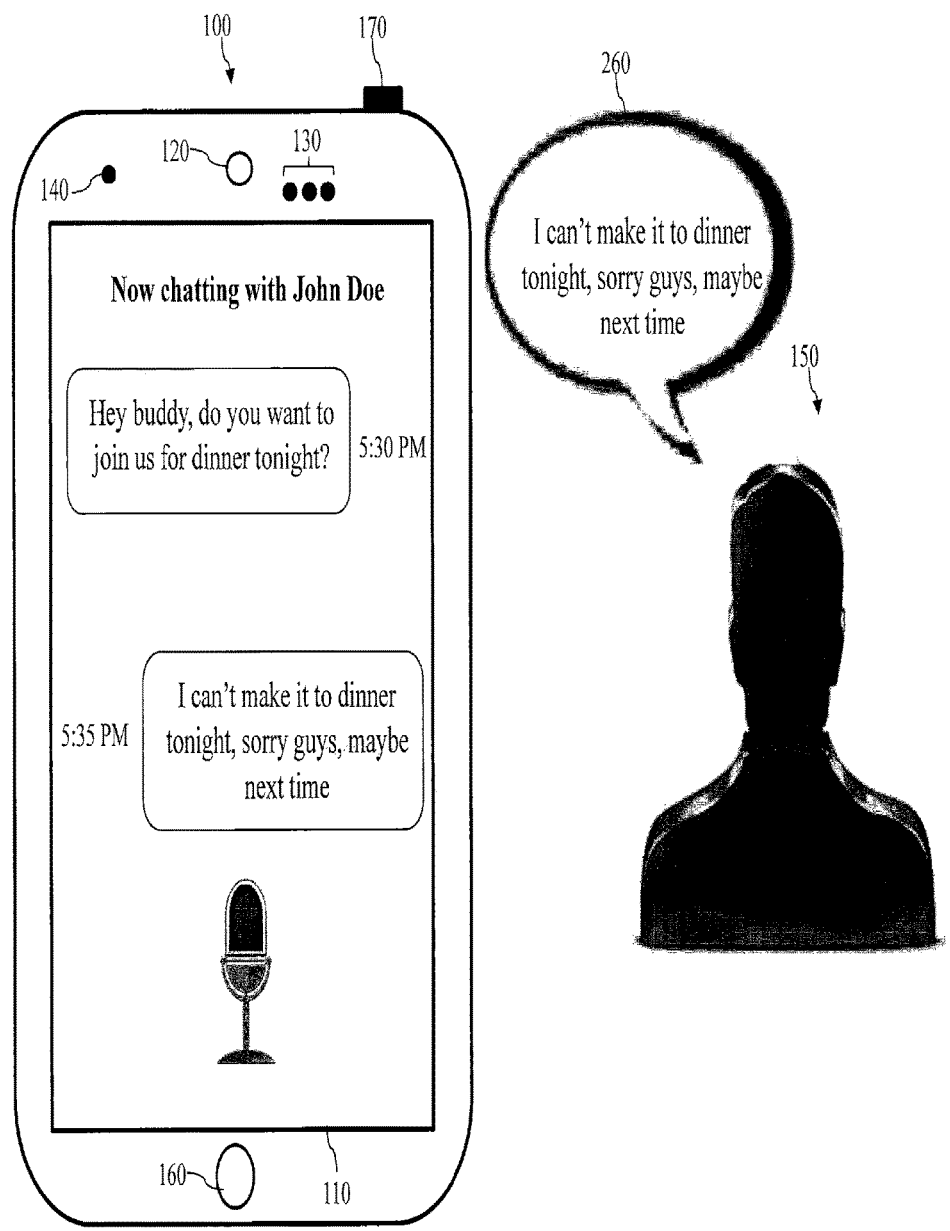

The selected password is saved either locally in a database in a local memory storage of the mobile computing device 100, or in a remote electronic database, or both. The password may now be used as a password for performing a voice-unlocking process. Referring to FIG. 4, after the mobile computing device 100 receives a request from the user 150 to gain access to the mobile computing device (e.g., detecting the power button 170 or the home button 160 has been pressed), the mobile computing device 100 displays a message on the display 110 to prompt the user 150 to speak a password. As an example, the mobile computing device 100 may prompt the user 150 to speak any one of the following passwords "set a reminder", "do laundry", or "do laundry tonight." In some other embodiments, the mobile computing device 100 may only display one of the passwords (instead of displaying multiple passwords) and prompt the user 150 to speak only that one password.

In response to the prompt displayed by the mobile computing device 100, the user 150 may speak a password 255. If the user 150 is the authorized user, he/she can speak the correct password with the correct voice associated with that password. In other words, the user 150 had previously spoken those words in the password displayed by the mobile computing device. Therefore, if the user 150 speaks those words again, the voice behind the words will match. On the other hand, if the user trying to gain access to the mobile computing device 100 is not the authorized user, he/she will not be able to reproduce the correct voice associated with the password. In other words, even though the user can read and understand the prompt, and therefore can speak the "correct" password, the voice associated with the spoken password 255 is from a different person. Since different people have different voices (e.g., in terms of voice amplitude and frequency), person A (e.g., authorized user) and person B (e.g., unauthorized user) may both speak the same word or words, but their voices will not be identical or at least substantially similar.

Based on this principle, the mobile computing device 100 records the password 255 spoken by the user attempting to gain access. The mobile computing device 100 then compares the recorded spoken password 255 with the previously recorded password. This comparison process involves a voice-matching process to ensure that not only does the user have to speak the correct password, but that he/she also must speak the correct password with the correct voice associated with such password. If the comparison process indicates that the voice from the password 255 matches the recorded password, then access will be granted to the user. However, if the comparison process indicates that the voice from the password 255 fails to match the recorded password, then access will be denied to the user, or the user will be required to go through an alternative authentication process (e.g., entering a password, etc.).

What constitutes "matching" may be set by the mobile computing device 100 using a predetermined threshold. For example, if the amplitude and/or frequency of the voice associated with the password 255 is within an X % (X<=100) of the amplitude and/or frequency of the voice associated with the previously stored password, then the password 255 spoken by the user is considered to match the correct password, and access will be granted to the user. As an example, X may be in a range from about 90%-99.99%.

The process discussed above with reference to FIGS. 3-4 may repeat itself after the user 150 gains access to the mobile computing device. For example, referring to FIG. 5, after gaining access to the mobile computing device 100, the user 150 may dictate (via a spoken phrase 260) a text message "I can't make it to dinner tonight, sorry guys, maybe next time" to a friend. The mobile computing device 100 may then record this spoken phrase 260 and select random segments of such phrase as a new voice password. For example, the words "I can't make it", "dinner tonight", or "next time" may each be selected as the new voice password. Again, the recording of the phrase 260 may be done with or without alerting the user 150.

Figure 6:
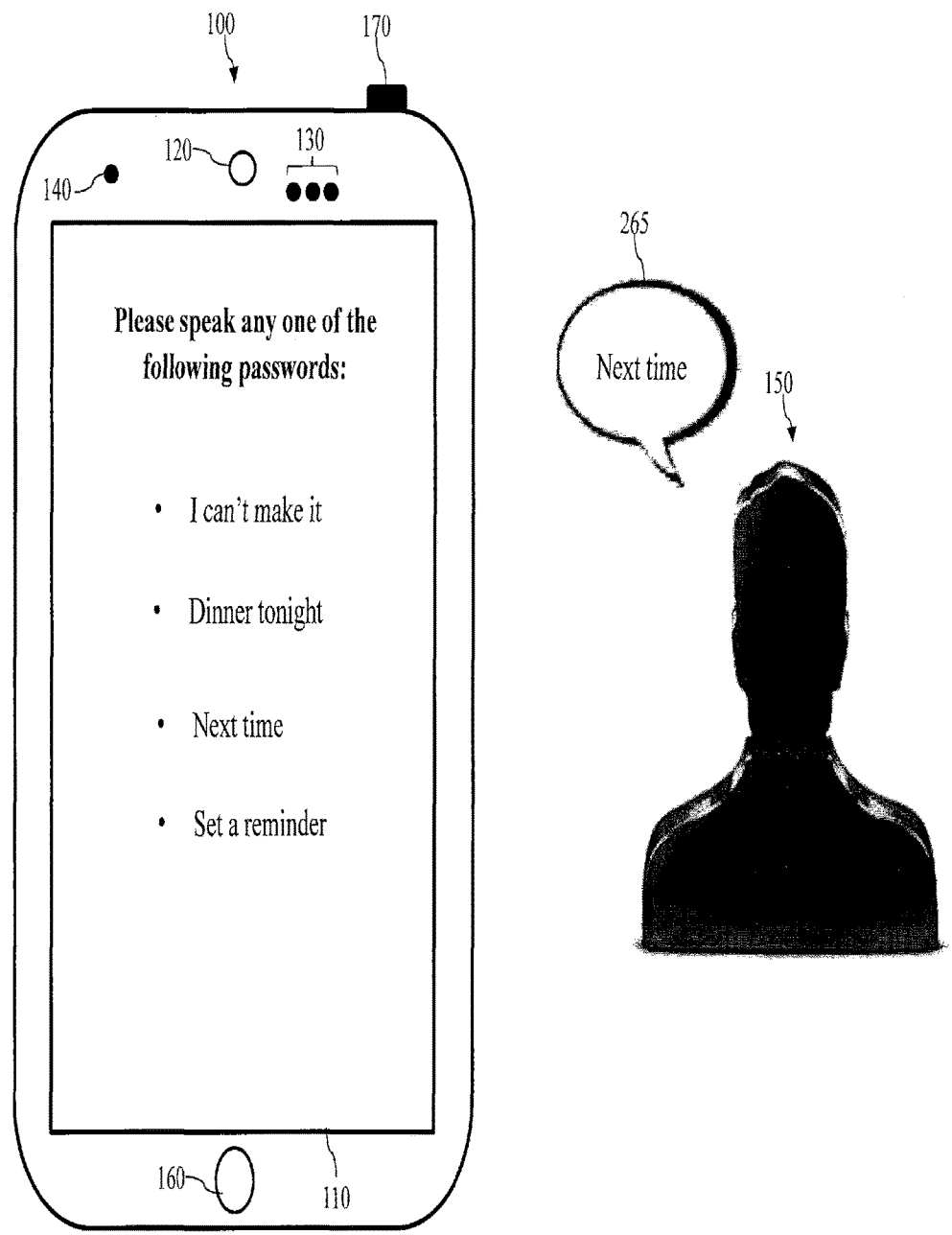

Referring now to FIG. 6, at some time after the new voice password is selected and saved either in a local database on the mobile computing device 100 or in a remote electronic database, the user 150 is attempting to gain access to the mobile computing device 100 again. The mobile computing device 100 again prompts the user 150 to speak one of the following new voice passwords "I can't make it", "dinner tonight", or "next time." In the illustrated embodiment, one or more of the previous voice passwords (e.g., "set a reminder") may also be displayed (and they still function as effective passwords). In other embodiments, once the new voice passwords are generated, the previous voice passwords are erased and are no longer effective. In those cases, only the newly-generated voice password will be displayed.

If the user 150 is the authorized user whose voice was recorded for the correct password, then he/she can speak the password and have the mobile computing device 100 verify that he/she is indeed the authorized user, because the voice will match the stored password. Otherwise, the user will be denied access if he/she is an unauthorized user, as the voice will fail to match that of the stored password.

Based on the above discussions, it can be seen that the voice password discussed herein is a dynamic password, because it can change constantly or periodically. The changing of the voice password may occur without the user requesting to change it. Rather, a new voice password may be dynamically generated based on the voice-based interactions between the mobile computing device 100 and the user, for example through voice commands, dictations, or telephone calls. Since the voice password is generated periodically and randomly, the user himself/herself may not even know what the current voice password is until he/she is being prompted to enter it during a voice unlock process. Nevertheless, the authorized user can still gain access to the mobile computing device 100 without encountering problems, since the authorized user can readily reproduce the correct voice associated with the updated password. On the other hand, even if a voice password has been illegally obtained by an authorized person (e.g., by a secret recording), that person may still not be able to gain access to the mobile computing device, because such voice password may have been changed already by the time the authorized person attempts to use the recorded voice password to unlock the mobile computing device 100. Thus, the constantly-changing nature of the voice password means that it is harder to be faked or stolen, thereby increasing its effectiveness and security.

Based on user preferences, the mobile computing device 100 may also decide how often to update or change the voice password. For example, in a settings menu, the user may choose from options to change the voice password every day, every week, every month, or every specified number of days, etc. Based on the user selection, the mobile computing device 100 can implement the updating of the voice password accordingly. In addition, the mobile computing device 100 may implement another unlock mechanism as a back-up unlock method for the voice-unlock mechanism discussed above. For example, the face-unlock may be used as a back-up mechanism for the voice-unlock, or vice versa. Other unlock mechanisms such as text passwords, drawing predefined patterns, etc., may also be used as back-up unlock mechanisms for unlocking the mobile computing device 100 in case the voice-unlock fails. Furthermore, although the dynamic voice-unlock process is discussed above using the mobile computing device 100 (e.g., smartphones, tablet computers, laptop computers, wear-able electronic devices) as an example, other computer systems may also benefit from the dynamic voice-unlock process disclosed herein. For example, a desktop workstation or a server may also be "unlocked" via the dynamic voice unlock process discussed herein. The authorized user's voice may be recorded from online chatting sessions, for example.

Figure 7:
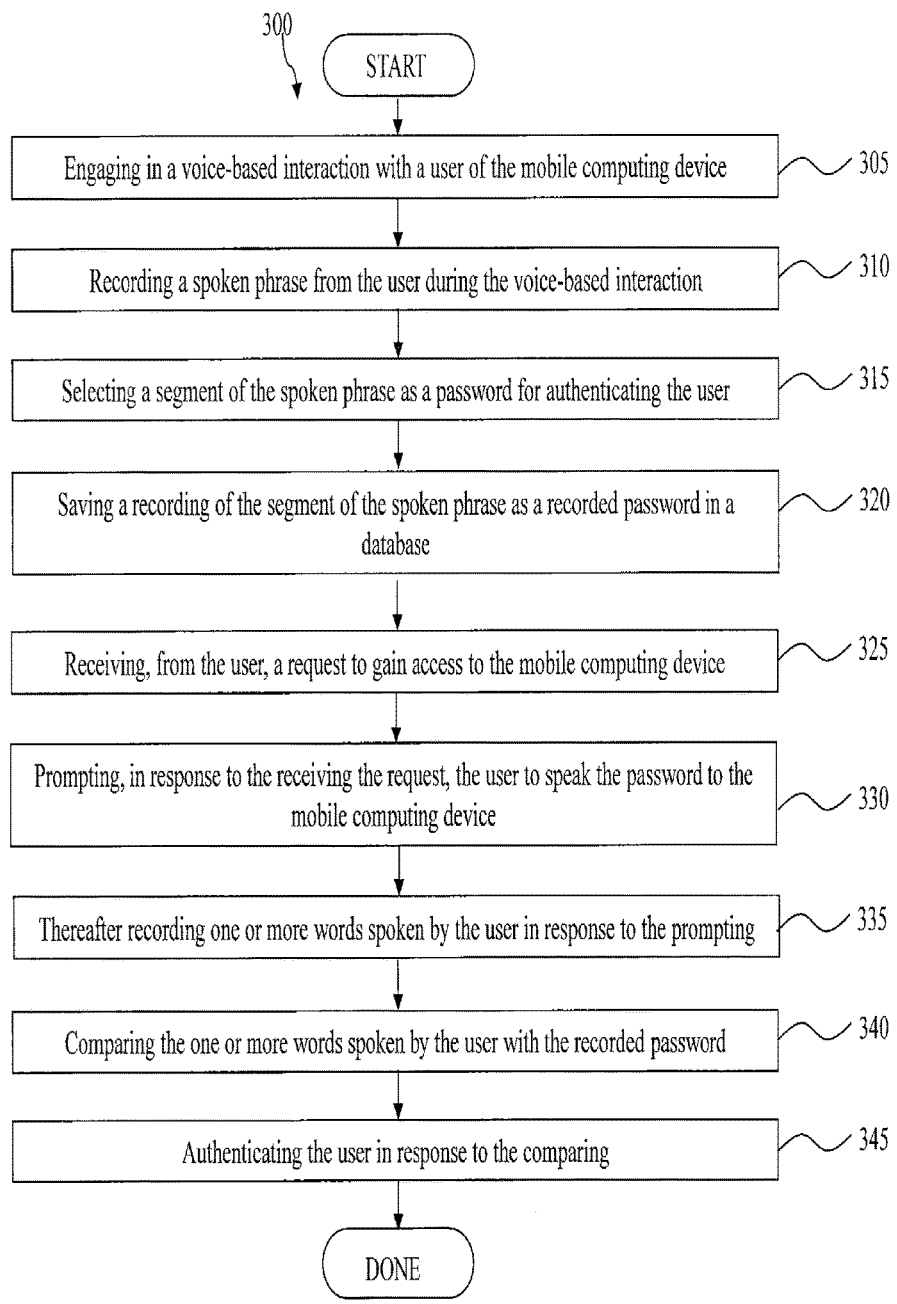
FIG. 7 is a flowchart illustrating an example method for using the mobile computing device to perform a voice-unlock according to various aspects of the present disclosure.

FIG. 7 is a simplified flowchart illustrating a method 300 for performing the dynamic voice-unlock process discussed above. One or more steps of the 300 are performed by a mobile computing device of the user. In some embodiments, the mobile computing device includes a mobile telephone, a tablet computer, or a laptop computer.

The method 300 includes a step 305, in which the mobile computing device is engaged in a voice-based interaction with a user of the mobile computing device. The method 300 includes a step 310, in which a spoken phrase from the user is recorded during the voice-based interaction. The method 300 includes a step 315, in which a segment of the spoken phrase is selected as a password for authenticating the user. The method 300 includes a step 320, in which a recording of the segment of the spoken phrase is recorded as a recorded password in a database. The method 300 includes a step 325, in which a request to gain access to the mobile computing device is received from the user. The method 300 includes a step 330, in which the user is prompted to speak the password to the mobile computing device. The method 300 includes a step 335, in which one or more words spoken by the user in response to the prompting is recorded. The method 300 includes a step 340, in which the one or more words spoken by the user is compared with the recorded password. The method 300 includes a step 345, in which the user is authenticated in response to the comparing.

In some embodiments, the comparing in step 340 includes matching a voice associated with the one or more words spoken by the user with a voice from the recorded password.

In some embodiments, the spoken phrase in step 310 contains one or more identifiable words. In some embodiments, the selecting in step 315 is performed so that the at least one of the identifiable words is randomly selected as the segment of the spoken phrase.

In some embodiments, the engaging in step 305 includes conducting a telephone conversation. In some other embodiments, the engaging in step 305 includes performing a voice dictation. In yet other embodiments, the engaging in step 305 includes receiving a voice command from the user and initiating a task using the mobile computing device in response to the voice command.

In some embodiments, the recording of step 310 is performed without alerting the user.

It is understood that, unless otherwise specified, the steps 305-345 of the method 300 are not necessarily performed in numerical order. It is also understood that addition process steps may be performed before, during, or after the steps 305-345 in FIG. 7. For example, the spoken phrase may be a first spoken phrase, the password may be a first password, and the request may be a first request. The method 300 may further include the following steps: after the authenticating, recording, via the mobile computing device, a second spoken phrase from the user, the second spoken phrase being different from the first spoken phrase; selecting a segment of the second spoken phrase as a second password for authenticating the user; saving a recording of the segment of the second spoken phrase as a recorded second password in the database; receiving, from the user, a second request to gain access to the mobile computing device; prompting, in response to the receiving the second request, the user to speak the second password to the mobile computing device; thereafter recording one or more words spoken by the user in response to the prompting; comparing the one or more words spoken by the user with the second recorded password; and thereafter authenticating the user in response to the comparing the one or more words spoken by the user with the second recorded password.

In some embodiments, the method 300 may further include the following steps: receiving, from the user, a third request to gain access to the mobile computing device; prompting, in response to the receiving the third request, the user to speak one of: the first password or the second password to the mobile computing device; thereafter recording one or more words spoken by the user in response to the prompting; comparing the one or more words spoken by the user with the first record password or the second recorded password; and thereafter authenticating the user in response to the comparing the one or more words spoken by the user with the first recorded password or the second recorded password.

These additional steps, and other suitable steps of the method 300 are not specifically illustrated in FIG. 7 for reasons of simplicity.

Another drawback of the existing mobile computing devices relates to screen time-out. To conserve battery life, mobile computing devices may be programmed to dim its screen (i.e., display) after a period of inactivity from the user. The screen will then be turned off shortly thereafter if the user does not attempt to keep the screen on, for example by touching it. Most modern day mobile computing devices offer the user an option to set the screen time-out period, for example anywhere from 30 seconds to a few minutes. However, if the screen time-out period is set too low, the user may be constantly interrupted by the dimming of the screen while the user is still viewing content on the mobile computing device, which requires the user to touch the screen (or engage the mobile computing device in some other suitable manner) to indicate that the user is still actively using it. These constant interruptions may annoy or frustrate the user. On the other hand, if the screen time-out period is set too high, the mobile computing device may be accidently left on by the user from time to time, and the unnecessarily long screen time-out period may waste the battery of the mobile computing device.

The present disclosure offers an adaptive screen time-out to address the problems facing existing mobile computing devices. The adaptive screen time-out is discussed in more detail below with reference to FIGS. 8-12. Similar elements appearing in FIGS. 1 and 8-9 are labeled the same for reasons of clarity and consistency.

Figure 8:
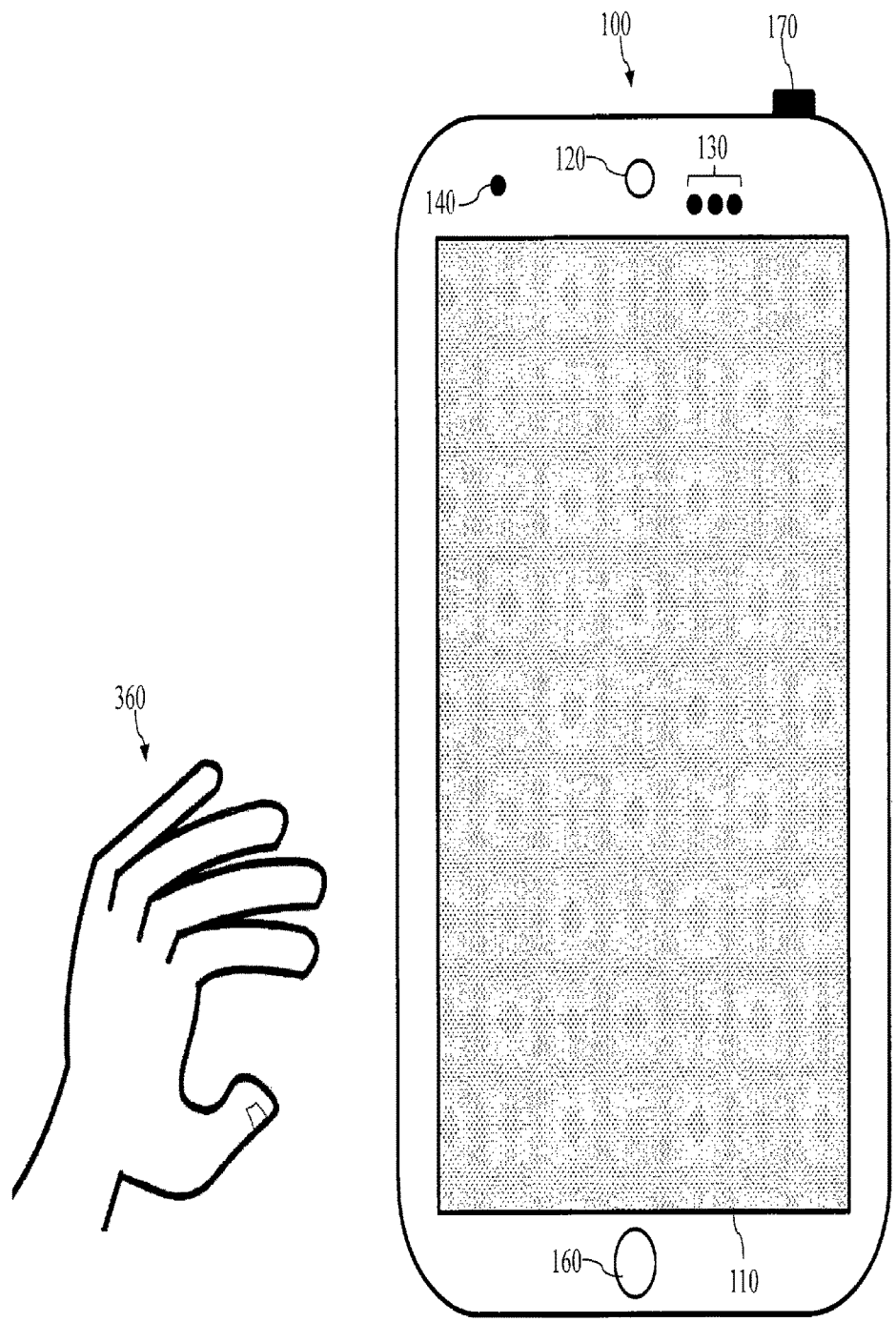
FIGS. 8-9 are diagrammatic views of an example mobile computing device for performing a dynamically adjustable screen time-out according to various aspects of the present disclosure.
Figure 9:
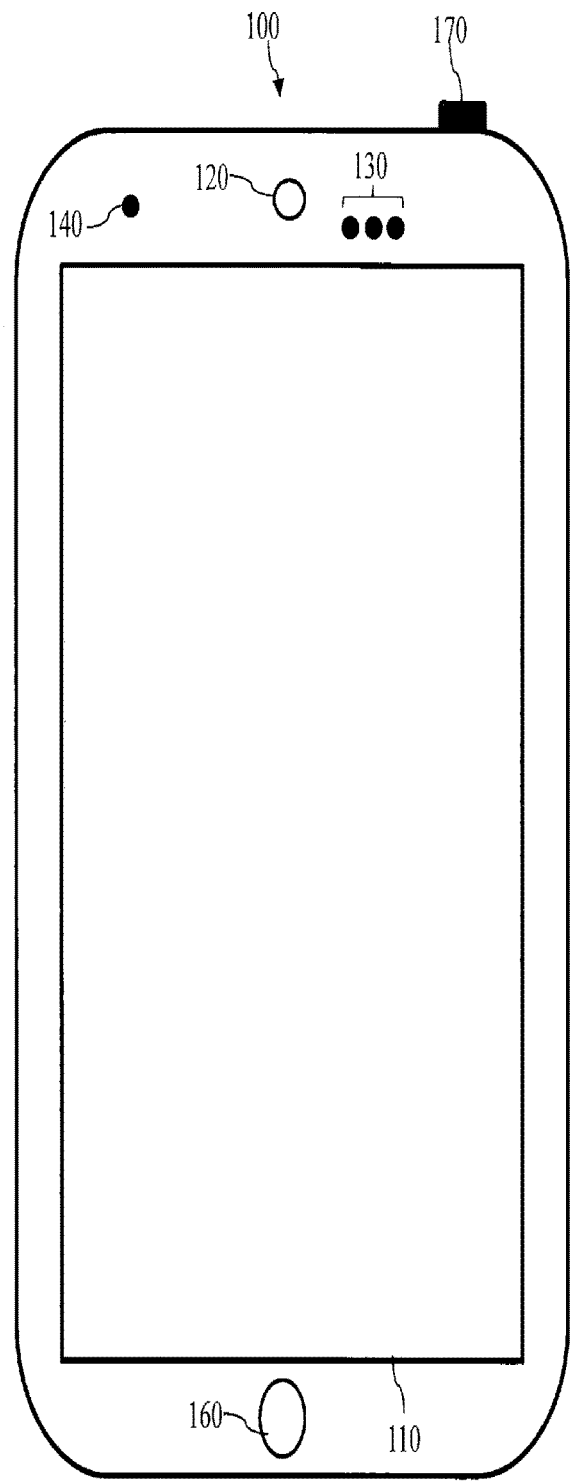

Referring to FIG. 8, the display 110 of the mobile computing device 100 has detected a period of inactivity from the user (e.g., the user 150 shown in FIG. 6). Inactivity from the user may correspond to a lack of user input, such as an absence of a touch input to the display 110. The mobile computing device 100 may have a preset default screen time-out period, which may be set by the manufacturer of the mobile computing device 100. In some embodiments, the screen time-out period may also be set by the user. For example, the user may go into a settings menu of the mobile computing device 100 and choose the default screen time-out period from a list of screen time-out periods. Alternatively, the user may also specify a screen dimming period, which occurs X seconds (e.g., 5 seconds) before the screen time-out period.

To facilitate the following discussion, in the example discussed below, the default screen time-out period is one minute, which means the display will be turned off in one minute if no touch input is received from the user for one continuous minute. The mobile computing device 100 dims the display 110 before the display 110 is turned off, so as to give the user an opportunity to "revive" the display 110 (e.g., un-dim it) or otherwise indicate that he/she is still using the mobile computing device 100. For example, when the default screen time-out period has been set to one minute, the display 110 may be dimmed after 55 seconds of inactivity from the user, and if the user does not engage the mobile computing device 100 in some manner during the next 5 seconds (e.g., touching the display 110), the display 110 will be turned off.

Suppose the user is still actively using the mobile computing device 100 (e.g., viewing a web page on the display 110). The user may then engage the mobile computing device 100. In the illustrated embodiment, the user engages the mobile computing device 100 by touching the display 110 with his/her hand 360 while the display 110 is dimmed but not turned off completely. In other embodiments, the user may engage the mobile computing device 100 by another suitable mechanism, for example by touching the display 110 with a stylus, or by voice command, or by shaking/tilting/moving the mobile computing device 100, etc.

Referring now to FIG. 9, when the mobile computing device 100 detects the engagement of the mobile computing device 100 from the user (e.g., the user's hand touching the display 110), the mobile computing device 100 undims the display 110. The mobile computing device 100 also increases the default screen time-out period. For example, the screen time-out period is increased from 1 minute to 2 minutes. In other words, the display 110 will be turned off after two minutes of continuous user inactivity, which also means the display 110 will be dimmed after 1 minute and 55 seconds of continuous user inactivity.

Suppose now that 1 minute and 55 seconds has gone by without any user engagement of the display 110, the display 110 will dim again, similar to what is shown in FIG. 8. If the user is still actively using the mobile computing device 100, he/she may again engage the mobile computing device 100 in a manner similar to those discussed above. The mobile computing device 100 will undim the display 110 in response to detecting the user's engagement, and increase the screen time-out period again, for example from 2 minutes to 4 minutes. In some embodiments, the increase in the screen time-out period is linear (e.g., increasing by 1 predetermined number every time). In other embodiments, the increase in the screen time-out period may be non-linear (e.g., geometric). As an example, the first increase in the screen time-out period may be from 1 minute to 2 minutes, the second increase in the screen time-out period may be from 2 minute to 4 minutes, the third increase in the screen time-out period may be from 4 minute to 8 minutes, etc. In alternative embodiments, the increase in the screen time-out period may be governed by a predefined algorithm.

This process may be repeated as long as the user still engages the mobile computing device 100 in some manner to prevent the display 110 from being turned off. Consequently, the screen time-out period keeps on increasing. As the screen time-out period keeps on getting higher, the user is interrupted less frequently by the screen dimming. Therefore, it can be seen that the screen time-out period according to the present disclosure becomes adaptive to the user's behavior. The user's engagement of the display 110 likely means that the user is still using the mobile computing device 100, and therefore the mobile computing device 100 "learns" not to time out the display 110 too soon. The increasingly-longer intervals before the user is disrupted by the dimming of the display 110 results in less user frustration and annoyance. For example, within a 20-minute span, a user may have been interrupted 20 times by the screen dimming for an existing mobile computing device (i.e., dimming about every minute). In comparison, the user may be only interrupted 4 times by using the mobile computing device 100 with the adaptive screen time-out (e.g., interruptions at 1 minute, 3 minutes, 7 minutes, and 15 minutes). It can be seen that according to the present disclosure, the disruptions caused by the screen time-out occur far less-frequently, thereby enhancing user satisfaction. In addition, the battery is not being wasted because the user is still using the mobile computing device 100.

If at some point, for example when the screen time-out period has been increased to 8 minutes, and user inactivity has been detected for 8 continuous minutes without the user's engagement of the mobile computing device 100, the display 110 will be turned off. In the present embodiments, the screen time-out period is now reset to the default screen time-out period, i.e., 1 minute in this example discussed above. When the user turns on the display 110 the next time, the display 110 will be timed out again after 1 minute (and be dimmed after 55 seconds). The subsequent user engagement of the mobile computing device 100 (or the lack thereof) will determine whether the screen time-out period will be adjusted.

The longer screen timeout period hardly results in waste of the battery resources, since the only possible scenario where battery waste occurs is when the screen time-out period has been increased to a fairly long period, AND if the user has forgotten to manually turn off the display 110 after he/she finishes using it. This is unlikely to occur, but even if it does occur, the battery waste happens only once, as the screen time-out period will revert back to the (relatively) short default screen time-out period when the display 110 times itself out after user inactivity. In addition, the screen time-out period according to the present disclosure may still be capped at some maximum amount, for example ten or twenty minutes. This ensures that an inadvertent user error (i.e., forgetting to turn the display 110 off) will not lead to a catastrophic failure (e.g., the display remaining on for too long and draining most, if not all, of the battery).

It is also understood that although the adaptive screen time-out of the present disclosure has been described using a touch-sensitive screen of a mobile computing device 100 as an example, the concept may be applied to other computing devices that relies on turning off the screen to conserve power. For example, most traditional laptops use a trackpad and/or a keyboard as inputs. The screen of the laptop may dim and then turn itself off if user inactivity has been detected for a predetermined period of time. For example, the user has not typed anything through the keyboard or touched the touch pad for X seconds or minutes. According to the adaptive screen time-out discussed above, the laptop will also increase its screen time-out period if the user engages the laptop (e.g., touching the touchpad or typing on the keyboard, or even through a speaker/microphone). Such laptop may achieve substantially the same benefits from utilizing the adaptive screen time-out discussed above.

Another aspect of the adaptive screen time-out of the present disclosure involves monitoring a frequency of the user engagement with the mobile computing device 100, and adjusting the screen time-out period in response to the monitored frequency. For example, while content is being displayed on the display 110, as shown in FIG. 9, the mobile computing device 100 monitors how frequently the user's hand (or stylus) touches the display 110. If a user normally touches the display 110 frequently, for example at least once every few seconds, then a prolonged inactivity for that user (for example 30 seconds or a minute) is an indication that the user is no longer using the mobile computing device 100. This is because the relatively prolonged inactivity (not touching the display for 1 minute or so) is a deviation from the user's normal behavior (e.g., touching the display 110 every few seconds), which probably indicates that the user is no longer viewing content on the display 110. On the other hand, if the user rarely touches the display 110, then even a relatively prolonged inactivity from the user does not necessarily mean that he is no longer using the mobile computing device 100, because such inactivity could be well within the normal behavior of such user.

Thus, based on the monitored frequency of user engagement with the mobile computing device 100, the screen time-out period may be adjusted accordingly to reflect the likelihood of whether the user is using the mobile computing device 100 or not. If the user is frequently engaged with the mobile computing device 100, then the screen time-out period may be shortened, since an absence of user input even within a short time span likely means the user is no longer using the mobile computing device 100. On the other hand, if the user is infrequently engaged with the mobile computing device 100, then the screen time-out period may be lengthened, since an absence of user input even within a relatively prolonged time span does not necessarily mean that the user is no longer using the mobile computing device 100.

In some embodiments, the mobile computing device 100 provides a plurality of predefined ranges of frequency of engagement with the mobile computing device 100. As an example, these ranges may include: a first range where the user engages with the mobile computing device 100 (e.g., by touching the display 110) every few seconds, a second range where the user engages with the mobile computing device 100 every tens of seconds, and a third range where the user engages with the mobile computing device 100 every minute or so. It is understood, of course, that the above example does not require the user's engagements with the mobile computing device 100 to be evenly or uniformly spaced apart. For example, they may just indicate that the user engagement of the mobile computing device 100 occurs with the above-listed frequency on average (e.g., the user touches the display 110 every few seconds on average), or alternatively that a period of inactivity does not exceed the above-listed frequency (e.g., the user does not go more than a few seconds without touching the display 110 while still using the mobile computing device 100).

The mobile computing device 100 may then associate a plurality of predefined screen time-out periods with the predefined ranges of frequency of user engagements, respectively. As an example, the user may associate a first screen time-out period of 30 seconds with the first range of frequency of user engagement with the mobile computing device 100, a second screen time-out period of 1 minute with the second range of frequency of user engagement with the mobile computing device 100, and a third screen time-out period of 5 minutes with the third range of frequency of user engagement with the mobile computing device 100 discussed above.

The mobile computing device 100 then dynamically adjusts the screen time-out period for the display 110 based on the monitored user engagement frequency. For example, if the user has been monitored to touch the display every 5 seconds or so, then the observed user engagement frequency falls within the first predefined range, and corresponding the mobile computing device 100 sets the screen time-out period to 30 seconds. This is because since the user touches the display 110 so frequently, a mere 30 seconds of the display 110 not being touched is a good indication of the user no longer using the display 110. As another example, if the user has been monitored to touch the display every minute or so, then the observed user engagement frequency falls within the third predefined range, and correspondingly the mobile computing device 100 sets the screen time-out period to 5 minutes. This is because since the user rarely touches the display 110, a minute (or even a few minutes) of the display 110 not being touched is not necessarily a good indication of the user no longer using the display 110. Consequently, the display 110 should be programmed to remain turned on for a little bit longer.

In this manner discussed above, the screen time-out period is dynamically and adaptively adjusted as an inverse (though not necessarily linear) function of the frequency of user engagement with the mobile computing device 100. In other words, the more frequently the user engages the mobile computing device 100 (e.g., touching the display 110), the shorter the screen time-out period is set. The less frequently the user engages the mobile computing device 100, the longer the screen time-out period is set.

In some embodiments, the monitoring of the user frequency of engagement with the mobile computing device 100 is done consistently, for example every time the user uses the mobile computing device 100. In other embodiments, however, the monitoring of the user frequency of engagement with the mobile computing device 100 is done at predetermined time intervals, for example every few hours, days, or even weeks.

It is understood that while the user engagement of the mobile computing device 100 are described using touching the display 110 as examples, the user engagement of the mobile computing device 100 may be in other forms in alternative embodiments, such as via moving the mobile computing device 100, tilting the mobile computing device 100, talking to the mobile computing device 100, etc.

In some embodiments, the mobile computing device 100 may be compatible with multiple user profiles, where multiple authorized users may each be authorized to use the mobile computing device 100. In these cases, the present disclosure may track each user's frequency of engagement with the mobile computing device 100 and associate that engagement frequency with the use's profile. For example, a husband and a wife may both be authorized users of the mobile computing device 100, so they each have an account with the mobile computing device 100. Through monitoring their frequency of engagement with the mobile computing device 100, the mobile computing device 100 determines that the husband user tends to engage the mobile computing device 100 frequently, while the wife user tends to engage the mobile computing device 100 infrequently. These engagement tendencies may be electronically stored with their respective user profiles.

Thereafter, when the husband user is using the mobile computing device 100, the screen time-out period is dynamically adjusted to be relatively short. On the other hand, when the wife user is using the mobile computing device 100, the screen time-out period is dynamically adjusted to be relatively long. These adjustments are done automatically without necessarily requiring the user's request to do so. Of course, the user may still actively override these dynamically adjusted screen time-out periods via the settings. In addition, the frequency of user engagement with the mobile computing device 100 associated with each user profile may also be updated at predetermined time intervals, for example every few hours, days, or weeks.

In some embodiments, the mobile computing device 100 also takes into account of the particular application the user is running while the engagement frequency is monitored. For example, the user may have different engagement frequencies with the mobile computing device 100 with respect to a web page application and an email application. Thus, the predefined screen time-out periods discussed above may be associated with a particular application as well. For example, if user inactivity has been observed for 20 seconds while the user is browsing a web site, the screen time-out period may be adjusted to a particular predefined screen time-out period. But if the user activity (for the same user) has been observed for 20 seconds while the user is using an email client, the screen time-out period may be adjusted to a different predefined screen time-out period. Again, this is due to the fact that even the same user may have different tendencies of engaging the mobile computing device 100 while using different applications (or programs) on the mobile computing device 100.

It can also be appreciated that all the various aspects of the present disclosure with respect to dynamic screen time-out can be combined in certain embodiments. For instance, the mobile computing device 100 may derive an initial (or default) screen time-out period based on monitoring the frequency of user engagement with the mobile computing device 100. This initial screen time-out period may then be dynamically adjusted subsequently by the user's engagement with the mobile computing device 100 when the display 110 is dimmed.

Figure 10:
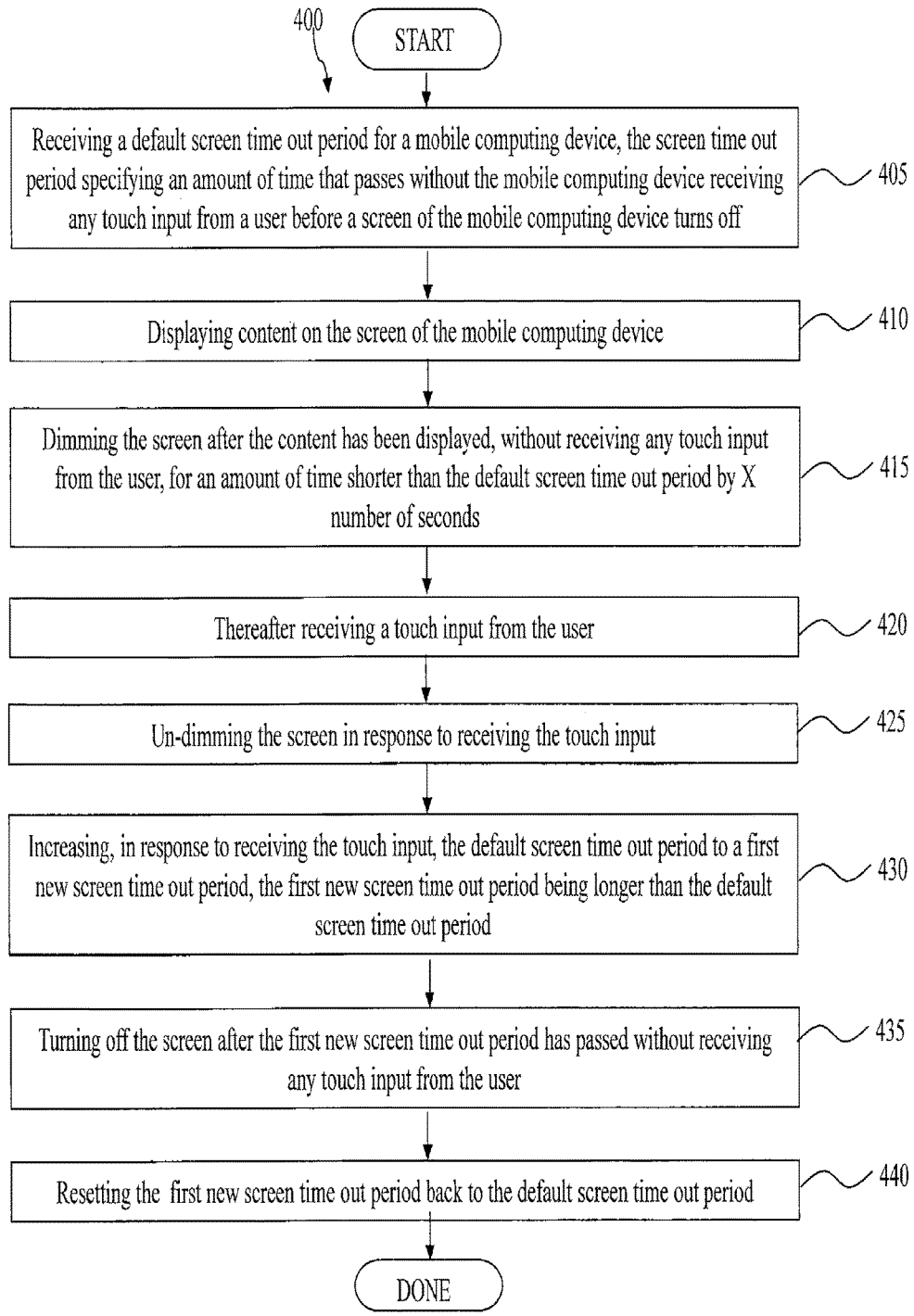
FIGS. 10-11 are flowcharts illustrating example methods for using the mobile computing device to perform a dynamically adjustable screen time-out according to various aspects of the present disclosure.

FIG. 10 is a simplified flowchart illustrating a method 400 for performing the dynamic screen time-out discussed above. One or more steps of the 400 are performed by a mobile computing device of the user. In some embodiments, the mobile computing device includes a mobile telephone, a tablet computer, a laptop computer, a wear-able electronic device such as a smart watch, or a smart glass.

The method 400 includes a step 405, in which a default screen time-out period is received for a mobile computing device. The screen time-out period specifies an amount of time that passes without the mobile computing device receiving any touch input from a user before a screen of the mobile computing device turns off. The method 400 includes a step 410, in which content is displayed on the screen of the mobile computing device. The method 400 includes a step 415, in which the screen is dimmed after the content has been displayed, without receiving any touch input from the user, for an amount of time shorter than the default screen time-out period by X number of seconds. X may be a predefined integer, for example. The method 400 includes a step 420, in which a touch input is received from the user. The method 400 includes a step 425, in which the screen is undimmed in response to receiving the touch input. The method 400 includes a step 430, in which the default screen time-out period is increased in response to receiving the touch input. The default screen time-out period is increased to a first new screen time-out period, the first new screen time-out period being longer than the default screen time-out period. The method 400 includes a step 435, in which the screen is turned off after the first new screen time-out period has passed without receiving any touch input from the user. The method 400 includes a step 440, in which the first new screen time-out period is reset back to the default screen time-out period.

In some embodiments, the screen of the mobile computing device is a touch-sensitive screen. The touch input from the user is received through the touch-sensitive screen.

In some embodiments, the mobile computing device comprises a touch pad that is separate from the screen of the mobile computing device. The touch input from the user is received through the touch pad.

In some embodiments, the step 405 of receiving the default screen time-out period includes the following sub-steps: prompting the user to specify a value for the default screen time-out period; and designating a user-specified value as the default screen time-out period. In other embodiments, the step 405 of receiving the default screen time-out period includes the following sub-steps: prompting the user to enter a screen dimming period that specifies an amount of time that passes without the mobile computing device receiving any touch input from the user before the screen of the mobile computing device dims; and calculating the default screen time-out period based on a user-entered screen dimming period.

It is understood that, unless otherwise specified, the steps 405-440 of the method 400 are not necessarily performed in numerical order. It is also understood that addition process steps may be performed before, during, or after the steps 405-440 in FIG. 10. For example, the method 400 may further include the following steps: continuing the displaying of the content on the screen of the mobile computing device; dimming the screen after the content has been displayed for a further amount of time shorter than the default screen time-out period by X number of seconds; thereafter receiving, from the user, a further touch input to the screen; un-dimming the screen in response to receiving the further touch input; and increasing, in response to receiving the further touch input, the first new screen time-out period to a second new screen time-out period in response to receiving the further touch input from the user.

Figure 11:
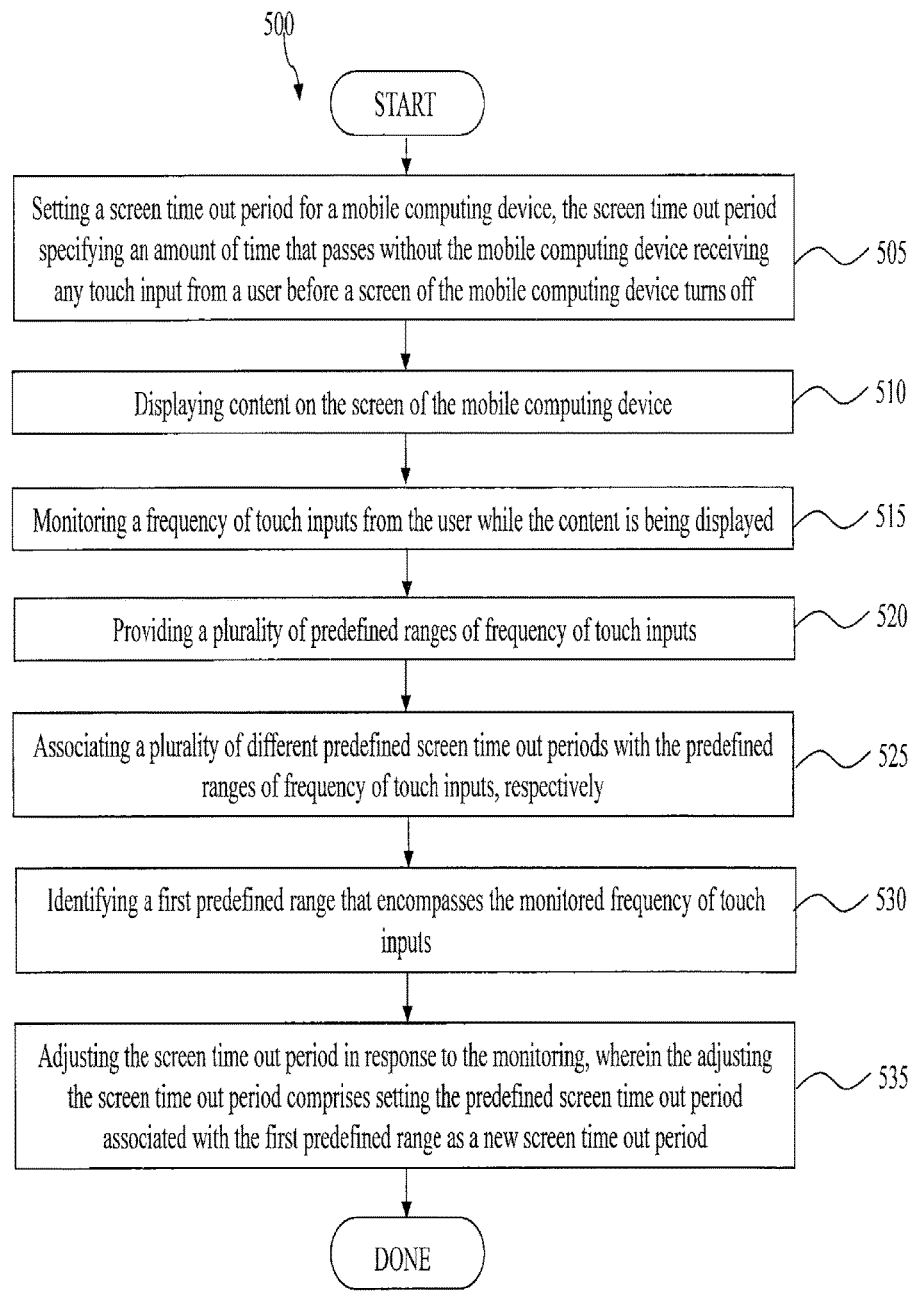

FIG. 11 is a simplified flowchart illustrating a method 500 for performing the dynamic screen time-out discussed above. One or more steps of the 500 are performed by a mobile computing device of the user. In some embodiments, the mobile computing device includes a mobile telephone, a tablet computer, a laptop computer, a wear-able electronic device such as a smart watch or glass.

The method 500 includes a step 505, in which a screen time-out period is set for a mobile computing device. The screen time-out period specifies an amount of time that passes without the mobile computing device receiving any touch input from a user before a screen of the mobile computing device turns off. The method 500 includes a step 510, in which content is displayed on the screen of the mobile computing device. The method 500 includes a step 515, in which a frequency of touch inputs from the user is monitored while the content is being displayed. The method 500 includes a step 520, in which a plurality of predefined ranges of frequency of touch inputs is provided. The method 500 includes a step 525, in which a plurality of different predefined screen time-out periods is associated with the predefined ranges of frequency of touch inputs, respectively. The method 500 includes a step 530, in which a first predefined range is identified. The first predefined range encompasses the monitored frequency of touch inputs. The method 500 includes a step 535, in which the screen time-out period is adjusted in response to the monitoring. The adjusting the screen time-out period includes setting the predefined screen time-out period associated with the first predefined range as a new screen time-out period. In some embodiments, the adjusting the screen time-out period includes setting a new screen time-out period as an inverse function of the frequency of touch inputs from the user.

It is understood that, unless otherwise specified, the steps 505-535 of the method 500 are not necessarily performed in numerical order. It is also understood that addition process additional steps may be performed before, during, or after the steps 505-535 in FIG. 11. For example, the method 500 may further include a step of associating the monitored frequency of touch inputs with a user profile. As another example, the method 500 may further include a step of adjusting the screen time-out period as a function of an application running on the mobile computing device. For reasons of simplicity, additional steps are not discussed herein.

Another drawback of existing mobile computing devices relates to their lock screen versatility. Existing mobile computing devices may allow the user to perform an unlock function via the lock screen, or launch shortcuts to one or more applications of the mobile computing devices from the lock screen directly. However, the lock screens of existing mobile computing devices may not offer the customizability and security expected for an advanced mobile computing device.

To overcome the problems of the lock screens associated with existing mobile computing devices, the present disclosure offers a lock screen that is customizable and offers security control.

Figure 12:
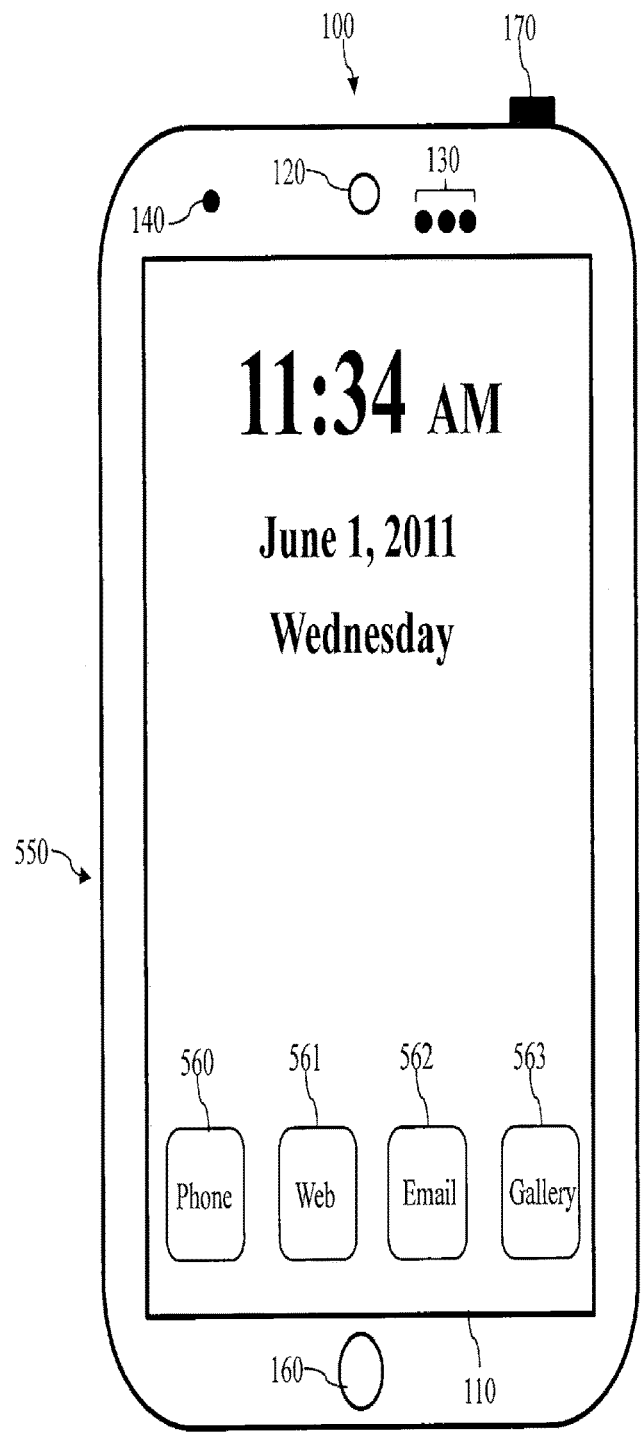
Figure 15A:
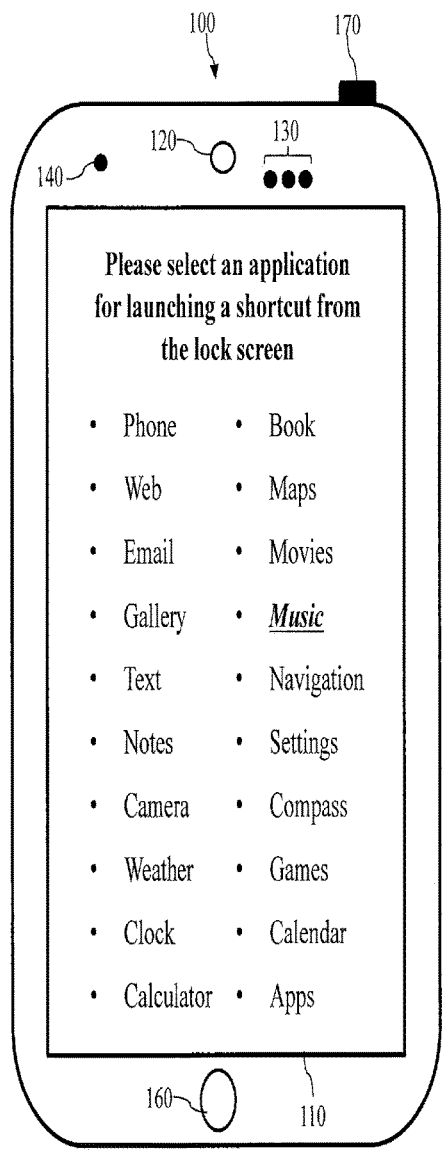
Figure 15B:
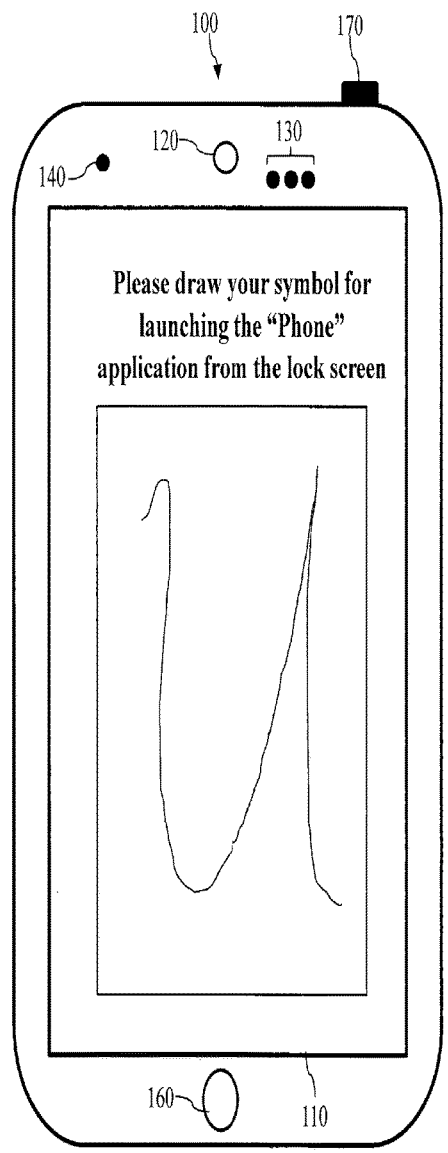

Referring to FIG. 12, an example lock screen 550 is illustrated on the display 110 of the mobile computing device 100. The lock screen 550 may contain information such as time of the day, the day of the week, and the date. The lock screen 550 may also contain a plurality of icons, some examples of which are illustrated in FIG. 12 as icons 560-563. These icons 560-563 each represent a different application that can be run on the mobile computing device 100. Stated differently, each application includes a task that is executable on the mobile computing device 100.

In the embodiment illustrated, these icons 560-563 correspond to "Phone", "Web", "Email", and "Gallery", respectively. A user may perform a predefined engagement action with one of the icons 560-563, such as clicking on the icon or dragging it across a portion of the lock screen 550 to directly launch the application associated with the icon. If no additional security checks are implemented (e.g., prompting the user to enter a password), the launching of the application also unlocks the mobile computing device 100. However, the lack of additional security checks may not be desirable for some users, who prefer to restrict access to the mobile computing device 100 to authorized users only. On the other hand, if a security mechanism such as a password is required, the user essentially must go through two steps to unlock the mobile computing device 100: step 1: choose an application to launch by performing an action with the icon representing the application on the lock screen; and step 2: enter the necessary password (or an alternative security verification mechanism such as the face-unlock and/or voice-unlock discussed above) before the application is actually launched. If the user has to go through such unlocking procedures every time he/she wants to use the phone, it may prove to be cumbersome and annoying to the user.

According to the various aspects of the present disclosure, the mobile computing device 100 implements a lock screen from which the user can quickly launch applications by entering one or more symbols predefined by the user. In some embodiments, the mobile computing device 100 performs a handwriting analysis or image comparison analysis on the symbol entered by the user with a previous symbol defined by the user and stored in a digital memory of the mobile computing device 100. The handwriting analysis or the image comparison analysis each serves as a security check for user authentication. The details of such lock screen are discussed below with reference to FIGS. 13-26.

Referring to FIG. 13A, the mobile computing device 100 displays a list of names for applications that can be directly launched from the lock screen. Note that the list of applications shown in FIG. 13A is merely an example and does not necessarily include every single available application. In addition, the names of applications may be different from embodiment to embodiment. Furthermore, in some alternative embodiments, the icons representing the applications may be displayed instead of, or in addition to, the names of the applications.

The list of applications shown in FIG. 13A is displayed when the user has gained access to the mobile computing device 100 at some point (via whatever suitable method such as password-unlock, face-unlock, voice-unlock, etc). The user has also decided to customize the applications that are launch-able from the lock screen. Therefore, the user may invoke the display shown in FIG. 13A through appropriate settings on the mobile computing device 100. The user may now select a particular application for which a customized launch shortcut is to be generated. In the example shown in FIG. 13A, the application selected is "Phone."

Referring to FIG. 13B, the mobile computing device 100 prompts the user to draw a symbol for launching the application "Phone" from the lock screen. The mobile computing device 100 displays an empty box 570 inside which the user can draw the symbol. The user may draw the symbol either with his/her finger or with a stylus, or another suitable device for interacting with the touch-sensitive interface of the mobile computing device 100. In the example shown in FIG. 13B, the user draws a letter "p" to represent the application "Phone." The mobile computing device 100 then associates the user-defined symbol (i.e., the letter "p" in this example) with the application "Phone" and saves the association into the digital or electronic memory of the mobile computing device 100. In some embodiments, the mobile computing device 100 also conducts an electronic handwriting analysis on the symbol drawn by the user. The characteristics of the symbol drawn by the user in accordance with the electronic handwriting analysis may also be saved into the memory of the mobile computing device 100. In other embodiments, the mobile computing device 100 may record an image of the symbol defined by the user.

FIGS. 14A-14B to FIGS. 16A-16B illustrate additional examples for selecting an application (to be launched from the lock screen) and defining symbols to be associated with the selected application. In FIGS. 14A-14B, the application selected is "Movies", and the user draws a letter "m" to be associated with the application "Movies." The letter chosen to represent the application need not be the initial letter of the name of the application though. For example, in FIGS. 15A-15B, the application "Music" is selected, and since its first letter is "m" just like the applications "Maps" and "Movies", it may not make sense for the user to assign the same letter to all three applications. Thus, the user may assign the letter "u" to the application "Music."

Figure 16A:
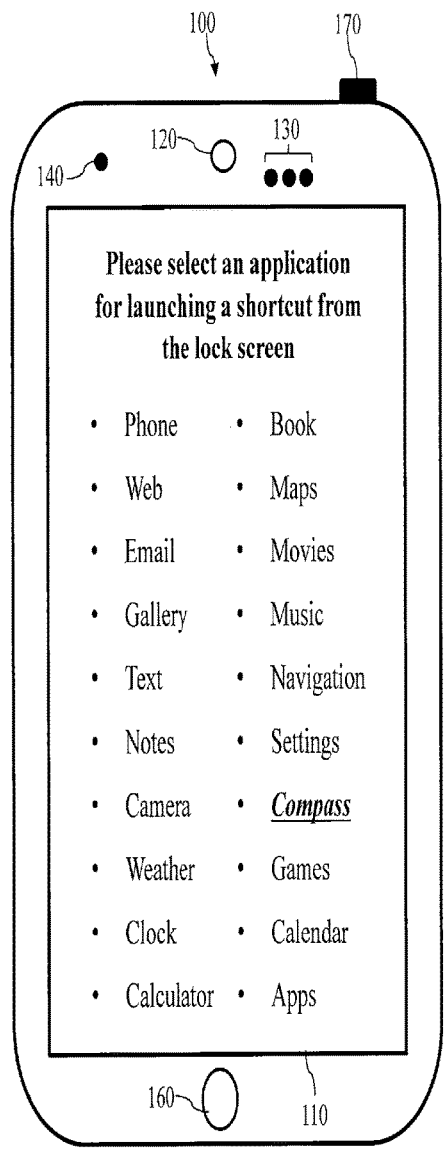
Figure 16B:
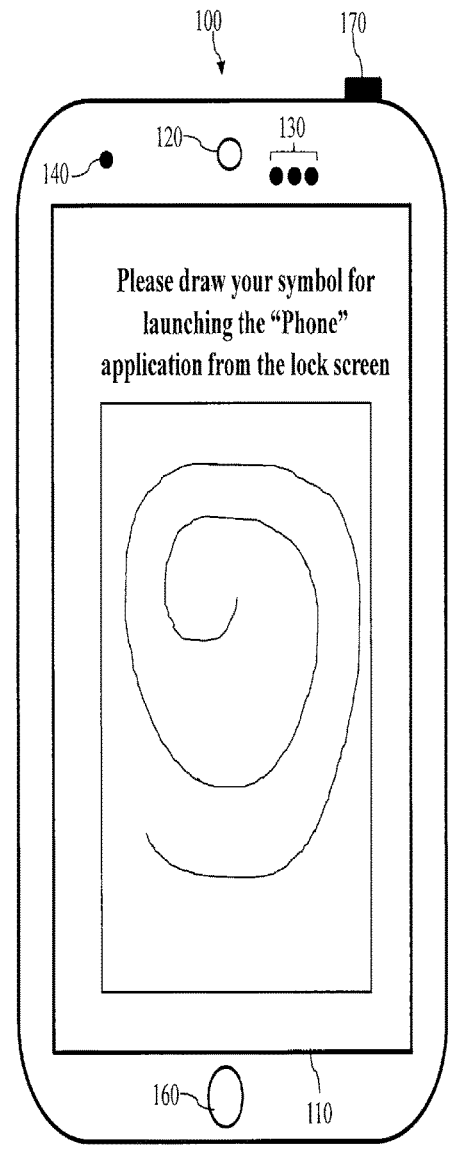

In other embodiments, the user may assign a letter that does not even appear in the name of the application, as long as the user can remember such association. Moreover, the symbol defined by the user need not even by a letter in a recognized alphabet. For example, as shown in FIGS. 16A-16B, the user can draw a spiral-like symbol to represent and be associated with the selected application "Compass." The mobile computing device may once again conduct a handwriting analysis on each user-defined symbol, or record an image of each user-defined symbol and save them into an electronic memory.

Figure 17:
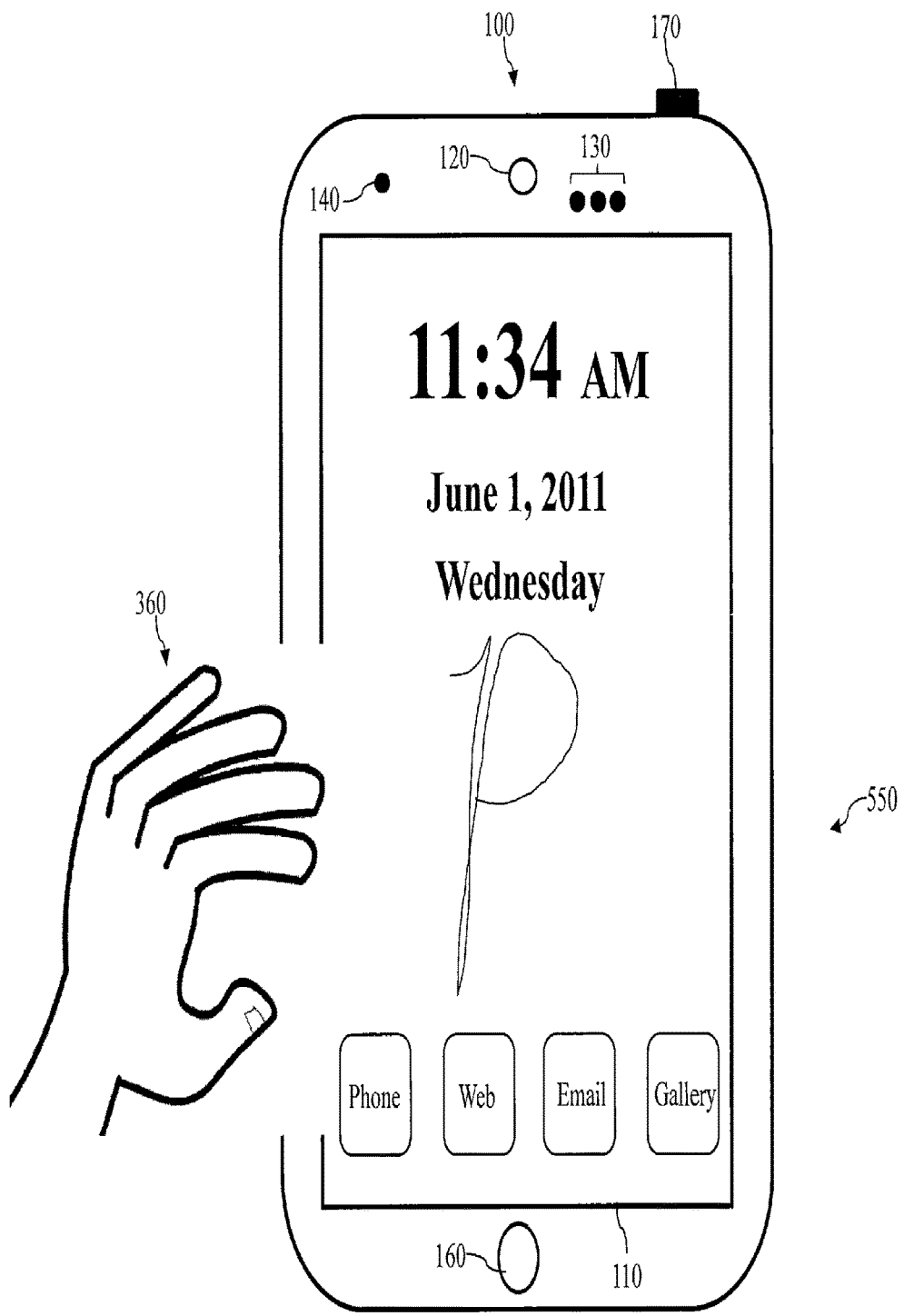
Figure 18:
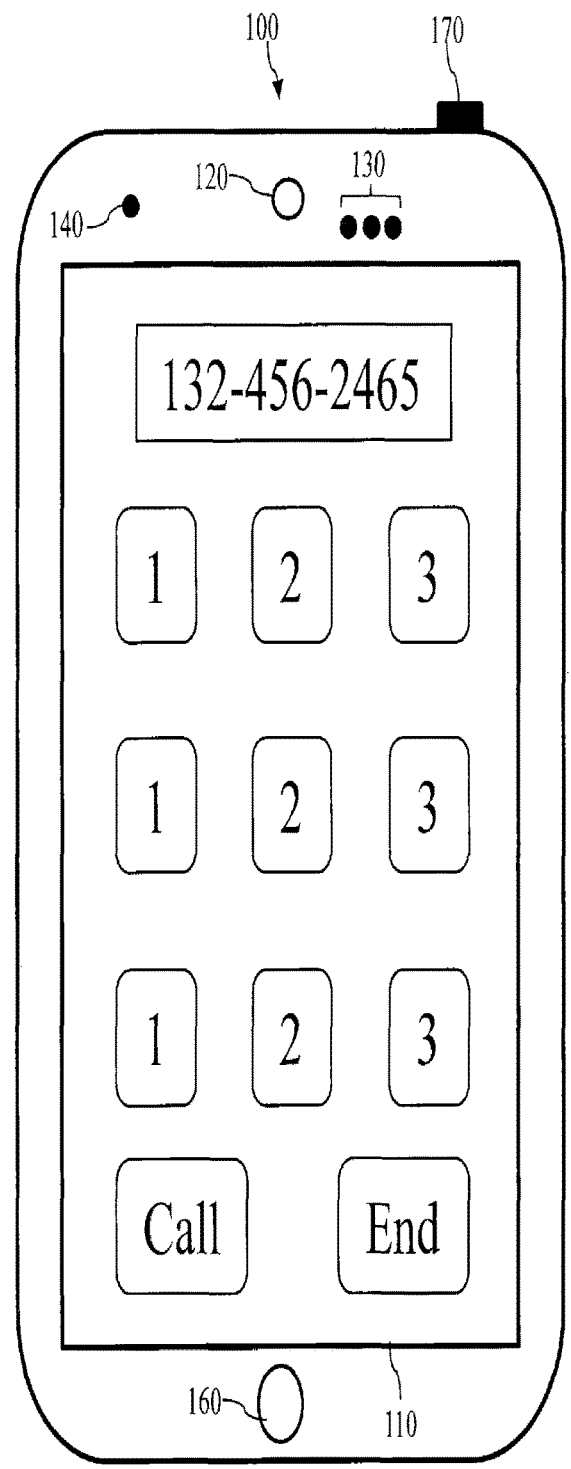

Using the example shown in FIGS. 13A-13B, where the user defined a hand-drawn letter "p" to be associated with the application "Phone", the user may now be able to directly launch the application "Phone" from the lock screen 550, as shown in FIG. 17. For example, after turning on the display 110 and arriving at the lock screen 550, the user may use his/her hand 360 (or with a stylus) to draw the letter "p" in the lock screen 550. The mobile computing device 100 detects this gesture-based input through the touch-sensitive display 110 and performs a comparison between the symbol that was just entered by the user with a list of previously-defined symbols by the user. In some embodiments, the comparison involves conducting another handwriting analysis on the symbol just entered by the user in an attempt to launch the "Phone" application from the lock screen. Based on the results of the handwriting analysis, the mobile computing device 100 determines whether the symbol just entered by the user sufficiently matches any of the previously-defined symbols. If the answer is yes, then the corresponding application—in this case the "Phone" application—is launched directly from the lock screen, as shown in FIG. 18. An extra security verification step is bypassed, since the handwriting analysis can verify that it is indeed the authorized user who is trying to launch the application (and unlock the mobile computing device 100 in the process). Of course, if the handwriting analysis results indicate that the symbol just entered by the user does not match up with any of those symbols previously-defined, the mobile computing device 100 may deny access to the user, or in the alternative ask the user to go through a back-up security verification process (e.g., password unlock, face-unlock, etc.).

In some other embodiments, instead of performing a handwriting analysis on the symbol just entered, the mobile computing device 100 may simply record an image of the just-entered symbol and compare that symbol with the images of the list of previously-defined symbols. A machine/computer analysis may be done on these images to see if any of the images of the previously-defined symbols sufficiently matches with the image of the symbol just captured. If the answer is yes, the mobile computing device 100 can then directly launch the application whose associated symbol image matches the image of the symbol just entered by the user. If the answer is no, then additional user authentication steps may be needed, or the user may be denied access to the mobile computing device 110. Once again, not only is the desired application directly launched from the lock screen for the user's convenience, but the extra step of security verification is also bypassed, as the symbol image comparison analysis serves the purpose of the security check.

In yet some other embodiments, where the user actually prefers to have an extra security verification step, the mobile computing device 100 need not perform the handwriting analysis nor the symbol image comparison analysis. Instead, the mobile computing device 100 merely needs to determine which letter the symbol that was just entered by the user corresponds to. In other words, if the symbol previously defined by the user was deemed to constitute the letter "p", then the symbol that was just entered by the user does not necessarily have to match up with the previously-entered "p" in terms of handwriting characteristics. As long as the mobile computing device 100 can determine that the symbol just entered corresponds to the letter "p", the mobile computing device 100 can directly launch the "Phone" application from the lock screen. Even though these embodiments of the lock screen lack the security aspect, they still offer versatility compared to conventional lock screens, since the user may launch any number of applications (as long as he/she has already defined their corresponding symbols), rather than just the four or five applications whose icon representations are located on the conventional lock screen.

Figure 19:
Figure 20:
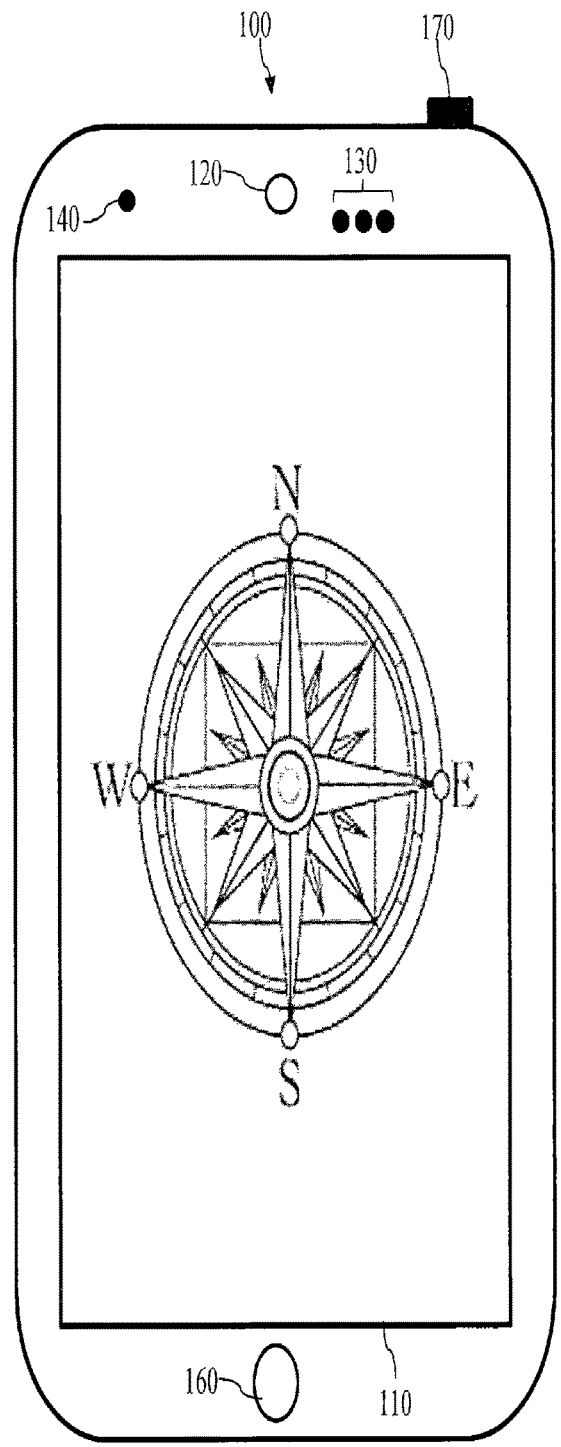
Figure 21A:
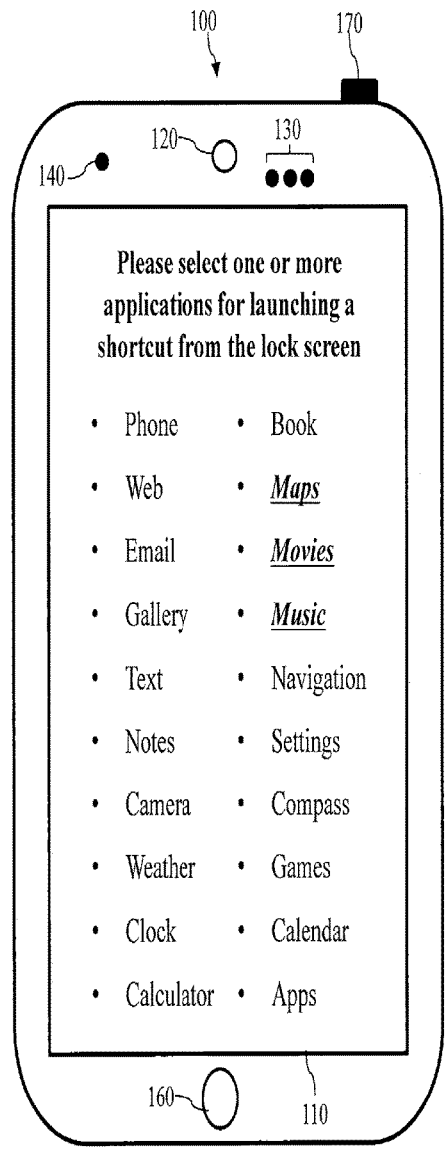
Figure 21B:
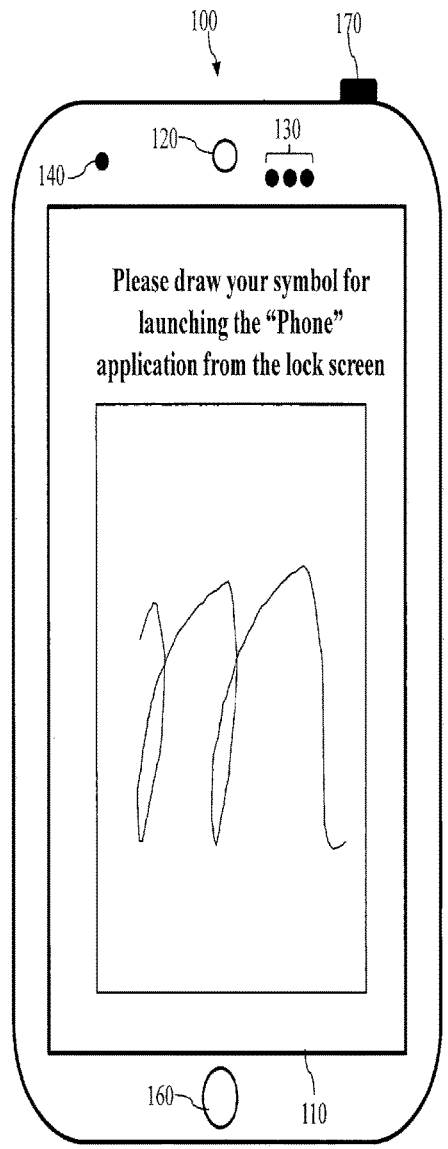

FIGS. 19-20 illustrate another example of directly launching an application from the lock screen 550 based on a user-defined symbol. In the example shown in FIG. 19, the symbol entered by the user corresponds with the spiral-like symbol previously defined by the user to be associated with the "Compass" application, as shown in FIGS. 16A-16B. After the user draws the spiral-like symbol on the display 110, the mobile computing device 100 may perform another handwriting analysis or symbol image comparison analysis to determine whether the symbol just entered by the user matches up with any of the previously-defined symbols.

In some embodiments, if the user-defined symbol is not within any well-known alphabets, the mobile computing device 100 may employ a lower threshold for verifying the just-entered symbol. The rationale is that an unauthorized user who is trying to gain illegal access to the mobile computing device 100 is less likely to known about the existence of such uncommon symbol. This means if the uncommon symbol (or something similar thereto) was entered by a user, there is a higher likelihood that such symbol was actually entered by the authorized user who knew of the uncommon symbol's existence and previous association with one of the applications. Another rationale is that, unlike familiar letters in a well-known alphabet, the user may not have developed a patterned way in writing the uncommon symbol (such as the spiral-like symbol shown in FIGS. 16B and 19). Thus, there may be a greater degree of deviation in terms of the symbol being drawn from time to time. The mobile computing device 100 may be programmed to "forgive" or "overlook" minor deviations between the previously-defined symbol VS the one just entered, since these minor deviations do not necessarily indicate that the symbol was just drawn by an unauthorized user. In comparison, for the symbols that correspond to familiar letters in a well-known alphabet, the mobile computing device 100 may employ a stricter standard of verification to ensure that the symbol was indeed entered by the authorized user. In any case, once the spiral-like symbol entered by the user in FIG. 19 is deemed to match with the spiral-like symbol previously stored in FIG. 16B, the mobile computing device 100 directly launches the "Compass" application, as shown in FIG. 20.

Figure 22:
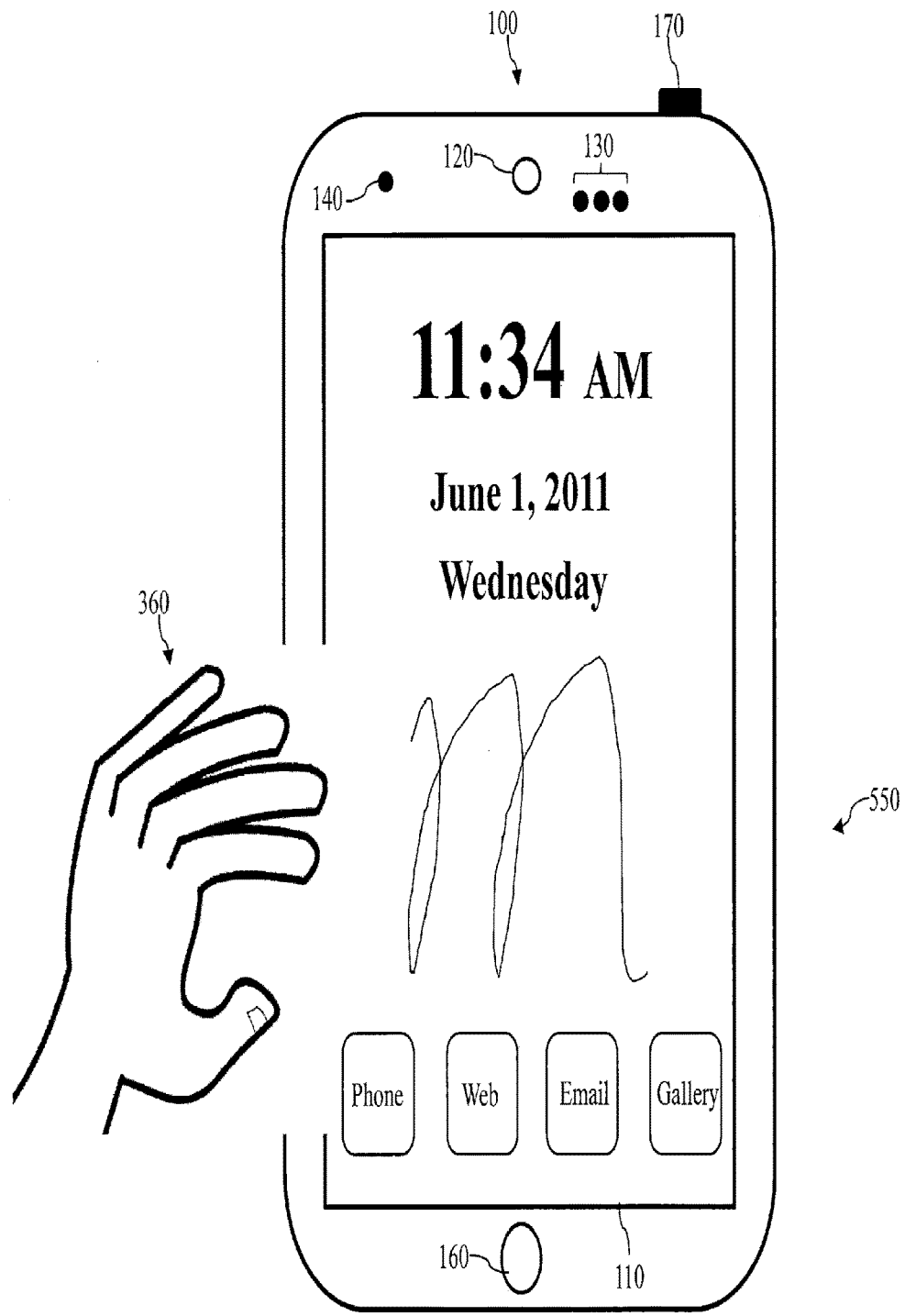
Figure 23:
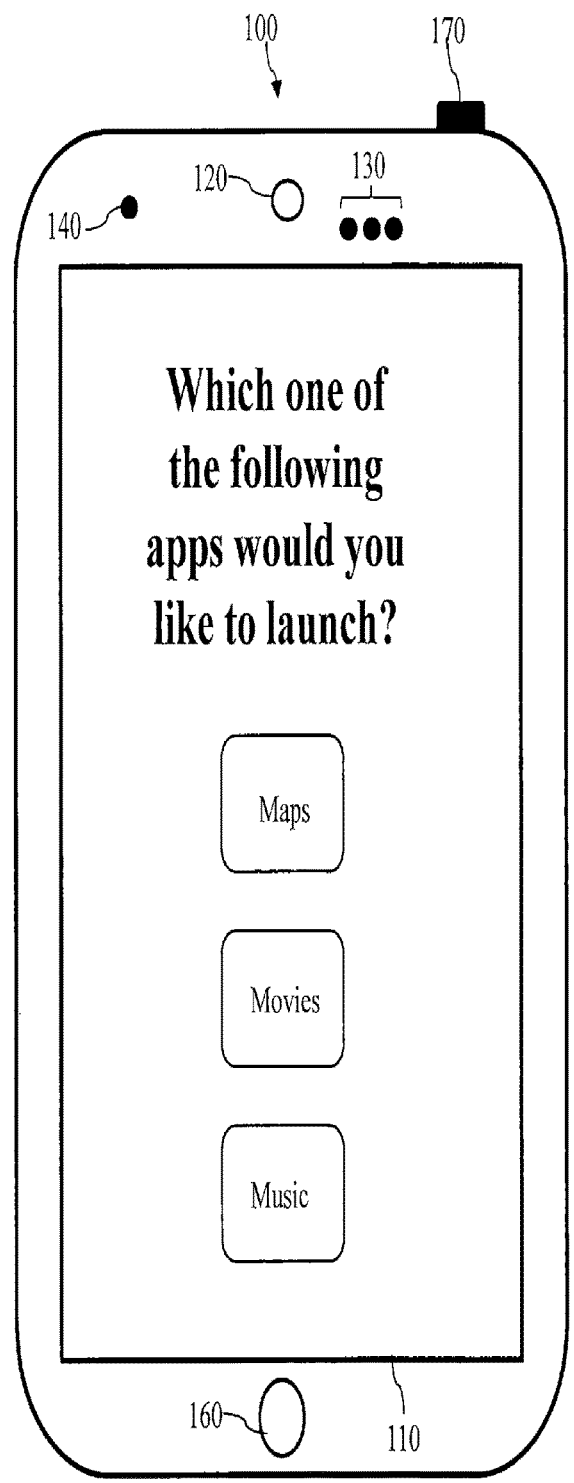
Figure 24:
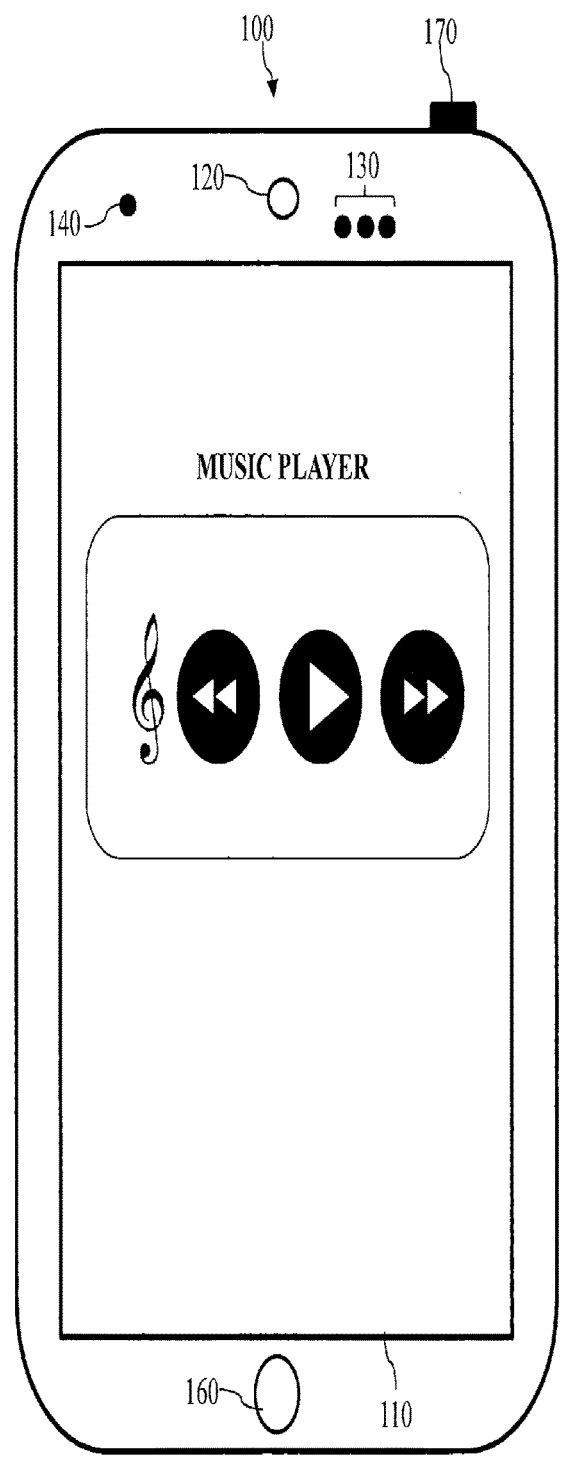

It is also understood that the symbol defined by the user and the application to be associated need not necessarily have a one-to-one correspondence. In some embodiments, multiple applications may be associated with the same symbol. For example, referring to FIGS. 21A-21B, since the applications "Maps", "Movies", and "Music" each have the letter "m" in their names, the user may be allowed to define a hand-written letter "m" to be associated with all three of these applications. Thereafter, once the user enters the letter "m" (that matches up with the previously-defined letter "m") in the lock screen 550, as shown in FIG. 22, the computing device 100 may prompt the user to choose which one of the applications associated with the letter "m" should be launched, for example as shown in FIG. 23. The user may choose the "Music" app, for example, and the computing device 100 will launch the "Music" app, which is shown in FIG. 24.

Figure 25A:
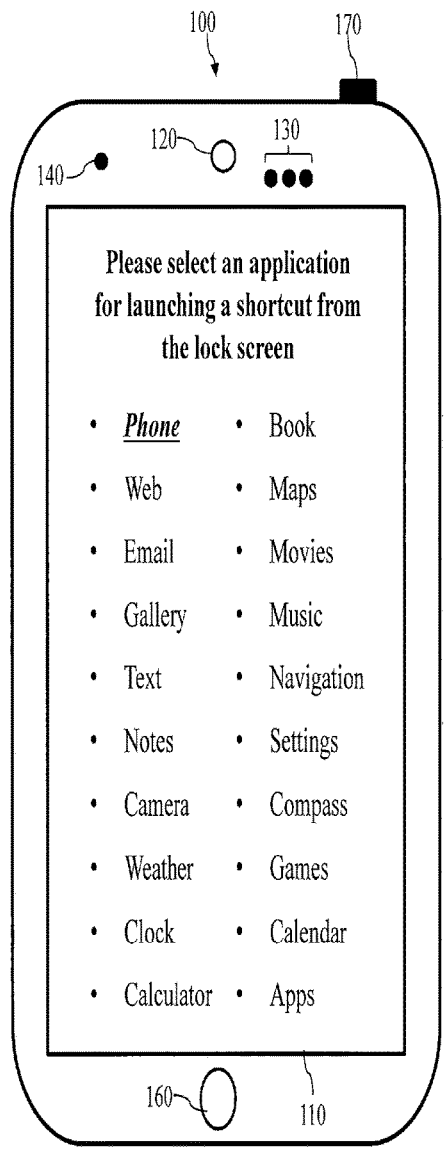
Figure 25B:
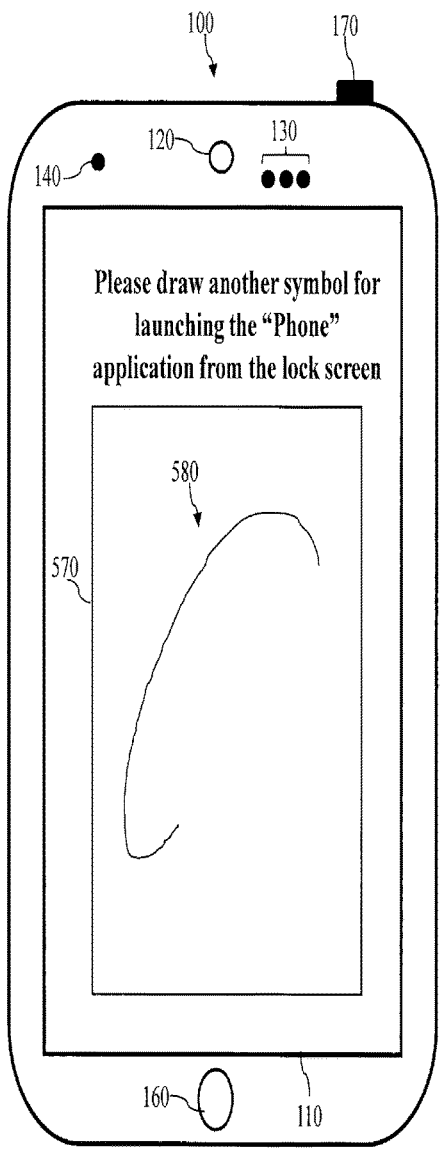

Similarly, in some embodiments, multiple symbols may be associated with the same symbol. For example, after the user has already drawn the letter "p" as a symbol to be associated with the application "Phone" as shown in FIGS. 13A-13B, the user may additionally define another symbol 580 to also be associated with the application "Phone", as shown in FIGS. 25A-25B. In the example illustrated in FIGS. 25A-25B, the symbol 580 is not a common letter from a well-known alphabet, but rather a user-customized symbol that somewhat resembles a virtual representation of a telephone. Of course, the user may define any arbitrary or random symbol to be associated with any of the applications, as long as the user can remember the symbols and their associations. In this example, the user may also launch the "Phone" application by drawing the symbol 580 on the lock screen.

Figure 26:
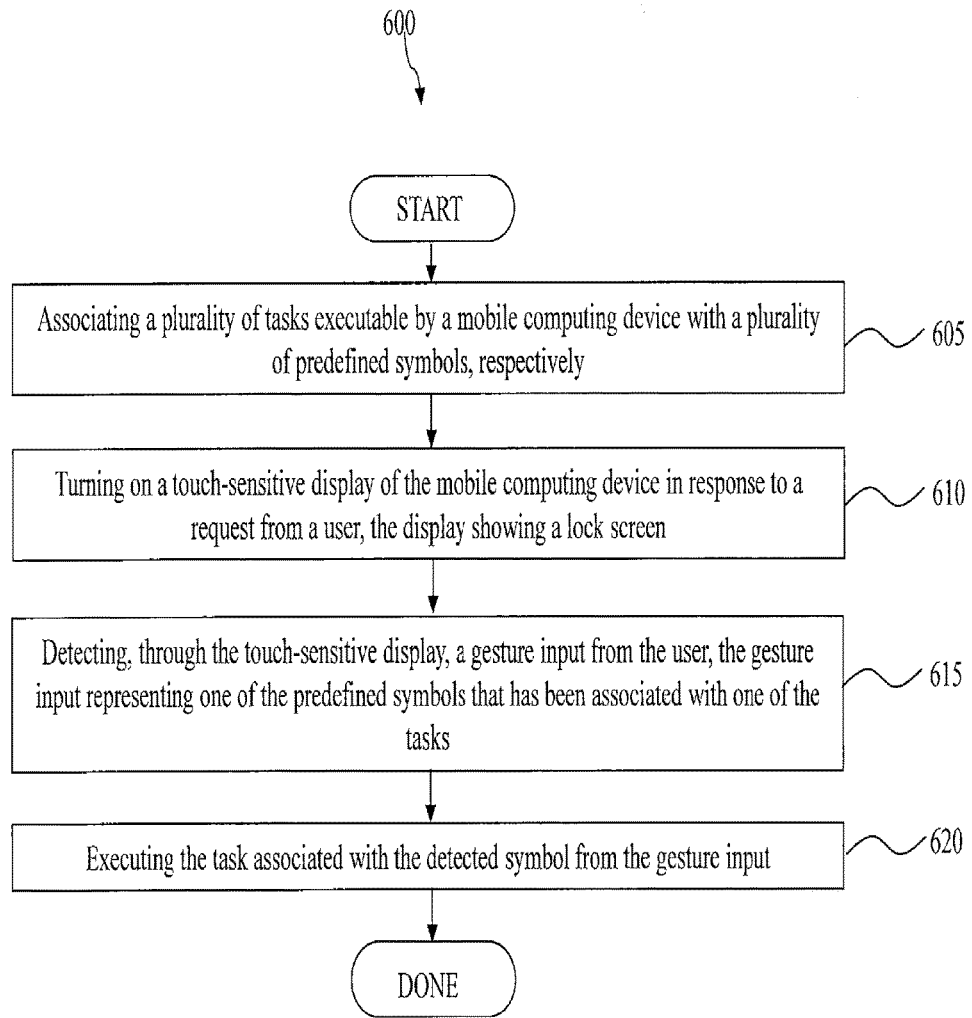
FIG. 26 is a flowchart illustrating an example method for launching applications from a lock screen of the mobile computing device according to various aspects of the present disclosure.

FIG. 26 is a simplified flowchart illustrating a method 600 for launching applications from the lock screen based on entering a user-defined symbol as discussed above. One or more steps of the 600 are performed by a mobile computing device of the user. In some embodiments, the mobile computing device includes a mobile telephone, a tablet computer, a laptop computer, or a wear-able electronic device such as a smart watch or glass.

The method 600 includes a step 605 of associating a plurality of tasks executable by a mobile computing device with a plurality of predefined symbols, respectively. In some embodiments, one of the tasks is an unlocking of the mobile computing device. The method 600 includes a step 610 of turning on a touch-sensitive display of the mobile computing device in response to a request from a user, the display showing a lock screen. The method 600 includes a step 615 of detecting, through the touch-sensitive display, a gesture input from the user. The gesture input represents one of the predefined symbols that has been associated with one of the tasks. In some embodiments, the gesture input is made by a finger of the user. In other embodiments, the gesture input is made by a stylus of the user. The method 600 includes a step 620 of executing the task associated with the detected symbol from the gesture input.

In some embodiments, the predefined symbols include letters of an alphabet. In these embodiments, the associating in step 605 is performed so that a name of each task contains a respective one of the letters that has been associated with the task.

In some embodiments, the associating in step 605 includes the following sub-steps: displaying the tasks to the user; prompting the user to associate the predefined symbols to the tasks, respectively; receiving, from the user, associations between the tasks and the predefined symbols. In these embodiments, the step of displaying the tasks may include a step of listing names of the tasks or a step of displaying virtual representations of the tasks. In some embodiments, the step of prompting includes prompting the user to define one of the symbols by drawing the symbol on the touch-sensitive display. In some embodiments, the method 600 may further include the following steps: storing the symbol drawn by the user, wherein the storing comprises storing handwriting characteristics of the user; conducting, after the detecting the gesture input from the user, a handwriting analysis with respect to the detected symbol; comparing the handwriting characteristics of the stored symbol with handwriting characteristics of the detected symbol; granting the user access to the mobile electronic device if the handwriting characteristics of the stored symbol matches the handwriting characteristics of the detected symbol; and denying the user access to the mobile electronic device if the handwriting characteristics of the stored symbol fails to match the handwriting characteristics of the detected symbol. In some embodiments, the step of comparing includes the following sub-steps: determining whether the detected symbol belongs to a well-known alphabet; employing a higher verification standard if the detected symbol belongs to a well-known alphabet; and employing a lower verification standard if the detected symbol does not belong to a well-known alphabet.

In some embodiments, the associating in step 605 includes associating multiple symbols to at least one of the tasks.

In some embodiments, the associating in step 605 includes associating multiple tasks to at least one of the symbols.

It is understood that, unless otherwise specified, the steps 605-620 of the method 600 are not necessarily performed in numerical order. It is also understood that addition process steps may be performed before, during, or after the steps 605-620 in FIG. 26. For example, the method 600 may further include a step of present the user an additional security verification mechanism after the detecting in step 615 but before the executing the task in step 620. The additional security verification mechanism may include a password-unlock, a face-unlock, or a voice-unlock. For reasons of simplicity, other additional steps are not specifically discussed in FIG. 26 herein.

Another drawback of existing mobile computing devices relates to their audio volume control. These devices allow their users to adjust the volume, for example through a volume slider bar or via a mute/unmute button. However, existing mobile computing devices are not "intelligent" enough to automatically adjust the volume settings based on factors such as environment, context, or location. As an example, suppose a user prefers to put his/her phone (an example mobile computing device) in a "vibrate" or "mute" mode so that incoming calls or emails do not disturb him/her, or at least not in a loud audible manner. However, that user may also need to use phone as a navigation device from time to time, in which case the user may need audio navigation instructions from the phone. Therefore, the user would have to manually increase the volume of the phone before or during navigation. This may be difficult if the user is driving a car, as the user needs to fiddle with the volume settings of the phone while he/she is supposed to be paying full attention to the road. This is not only frustrating to the user, but also dangerous. Even if the user is not using navigation that requires a loud audio output, the user may still prefer to have the phone not on "vibrate" or "mute", because incoming phone calls and/or messages may be missed due to the loud noise produced by the car during driving. Again, fiddling with audio controls of the phone while driving is not desirable.

Even if the user has managed to safely increase the audio output volume to a desirable level while the user is in the car, another potential complication may arise if the user forgets to put the phone back into the "vibrate" or "mute" mode after reaching the target destination. Thereafter, the user may be surprised by a loud phone call or incoming message at an inopportune time, since the phone's audio output volume was increased while the user was in the car. This may be disruptive if the user is in a place where mobile devices are supposed to be turned off or at least remain quiet, such as in a meeting, a church service, a movie theatre, or even if the user is merely attempting to sleep. The user may forget to change the volume settings of the phone to comply with these situations because he/she may still be operating under the assumption that the phone was already in a "vibrate" or "mute" mode, since that is the standard default setting for the phone. Again, this may lead to user frustration with the phone.

To overcome these issues discussed above with the volume controls (or the lack thereof) with existing phones, the present disclosure offers a contextually-aware mobile computing device. In the example discussed below, the contextually-aware mobile computing device is a smartphone, but it is understood that the contextually-aware mobile computing device may be a tablet computer, a laptop computer, or a wear-able electronic device such as a smart watch or glass in other embodiments.

Figure 27:
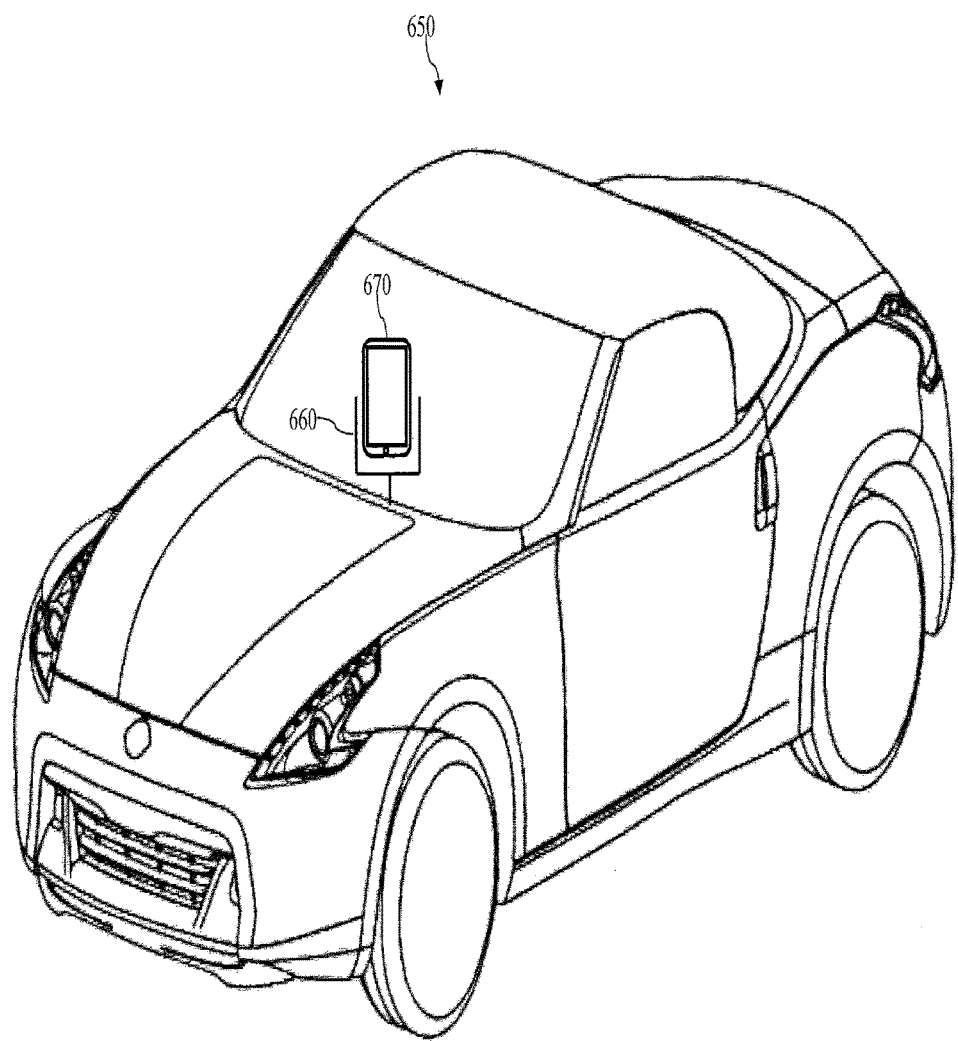
FIGS. 27-28 are diagrammatic views of various environments in which a mobile computing device performs contextually-aware automatic volume adjustment according to various aspects of the present disclosure.

FIG. 27 illustrates a simplified environment in which the contextually-aware smartphone of the present disclosure operates. Referring to FIG. 27, a vehicle 650 is illustrated. The vehicle 650 may be an automobile as illustrated, but may be another type of transportation device in other embodiments. A mount 660 is disposed within the vehicle 650. The mount 660 is configured to hold and interface with a mobile computing device, such as the mobile computing device 100 discussed above. In some embodiments, the mount 660 is pre-installed in the vehicle 650. In other embodiments, the mount 660 may be an aftermarket part that a user of the vehicle 650 installs in the vehicle. A smartphone 670 is also located in the vehicle 650. In the illustrated embodiment, the smartphone 670 is mounted on the mount 660, but this may not be necessary in alternative embodiments.

The smartphone 670 detects that it has been placed in the vehicle 650. In some embodiments, the detection is made in response to the smartphone 670 communicating with an electronic communications interface of the mount 660. The electronic communications interface may include one or more ports that mate with those on the smartphone 670, such as USB ports. Since the mount is located in the vehicle 650, the smartphone 670 "knows" that it must be in the vehicle 650 now. In other embodiments, the smartphone 670 is equipped with sensors such as accelerometers. These sensors can be used to determine whether the smartphone 670 is moving at a fast speed, for example faster than the average running speed of a human. The detection of the smartphone 670 traveling at such high speed is another indication that the smartphone 670 is now located in a vehicle. In some embodiments, the smartphone 670 is determined to be in a vehicle only if the speed at which the smartphone 670 is traveling is faster than the maximum speed of a human but still within a normal range of speeds for an automobile, for example in a range from about 15 miles per hour to about 120 miles per hour. If the smartphone 670 is traveling at a speed faster than this range, then it might be an indication that the smartphone 670 (and its user) is actually in an aircraft, and not in a vehicle, in which case the smartphone 670 should remain silent.

After the smartphone 670 detects that it is inside of the vehicle 650, it increases the audio output volume on the smartphone 670. In some embodiments, the audio output volume is automatically set to a maximum volume. In other embodiments, the audio output volume is automatically increased to a volume greater than the volume before it is placed within the vehicle 650. This volume need not necessarily be the maximum volume, for example it can be a volume preset by the user, such as 80% or 75% of the maximum volume. By doing so, the user need not fiddle with the volume controls on the smartphone 670 while trying to obtain navigation instructions. The user also need not worry about missing a potential phone call, email, or text message while driving, as the loud audio output volume of the smartphone 670 is likely to alert the user of the new call/email/text message (though for safety reasons, the user need not answer these calls/emails/text messages). In some embodiments, the automatic increase of the audio output volume temporarily overrides a "vibrate" or "mute" setting (i.e., the previous audio setting) for the smartphone 670.

In some embodiments, the automatic increase of the audio output volume of the smartphone 670 can be made more restrictive. For example, if the user wants the smartphone 670 to be loud only for receiving navigation directions, but does not mind potentially missing phone calls or other incoming alerts, then the audio output volume can be programmed to automatically increase only if the user has requested navigation instructions. Therefore, in such embodiments, the mere fact that the smartphone 670 has detected its placement within the vehicle 650 will not necessarily trigger the automatic increase of its audio output volume. The smartphone 670 must also detect a request to receive navigation instructions from a user before the audio output volume is automatically increased.

In some embodiments, once the smartphone 670 determines that it has been placed inside of the vehicle 650, it first detects and records its current volume setting before increasing the volume. For example, if the smartphone 670 was on "vibrate" right before it was placed inside of the vehicle 650, this "vibrate" setting is recorded by the smartphone 670 before the volume is increased (e.g., increased to a maximum volume).

Figure 28:
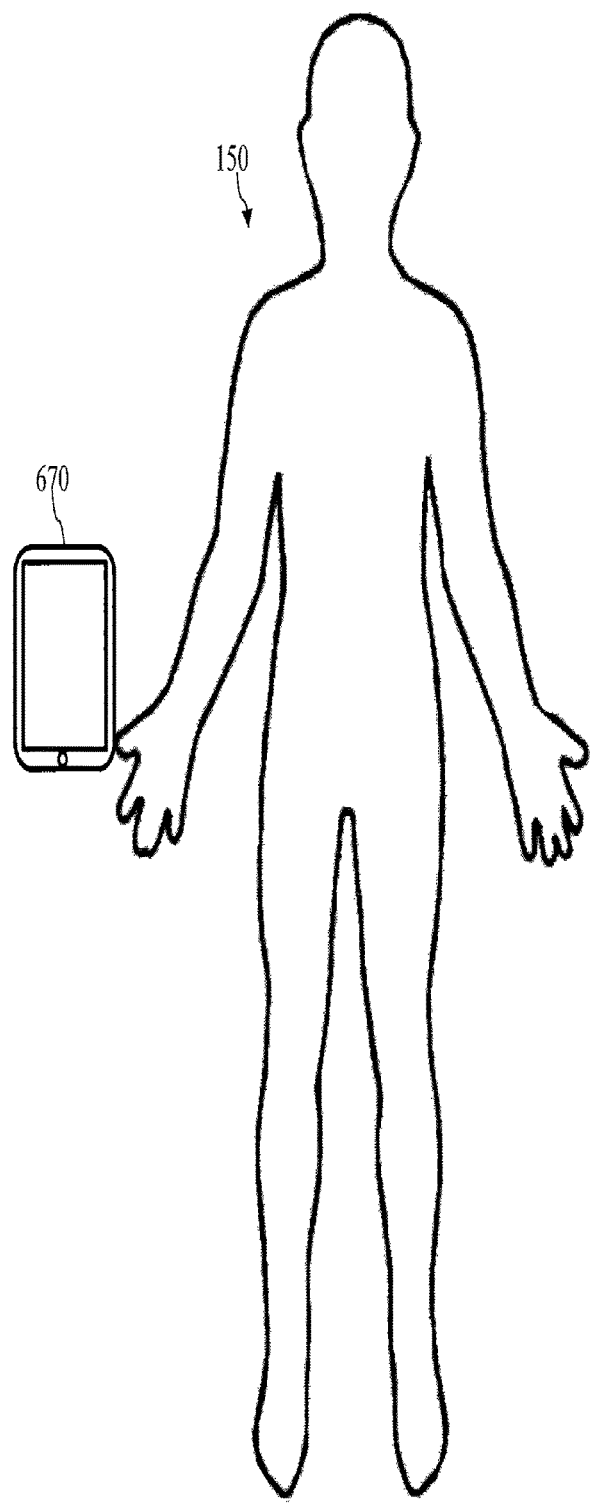

Referring to FIG. 28, after the user 150 finishes the driving session and takes the smartphone 670 outside of the vehicle 650, the smartphone 670 will detect this event. In some embodiments, the smartphone 670 detects it being taken outside of the vehicle 650 by detecting a break with the electronic communication interface of the mount 660. In some other embodiments, the smartphone 670 detects it being taken outside of the vehicle 650 by detecting that the speed of the smartphone is no longer within the range of a normal operating speed of the vehicle 650. In yet some other alternative embodiments, the smartphone 670 may require both a break with the electronic communication interface of the mount 660 AND a detection of a speed outside of the normal operating speed of the vehicle to deem that the smartphone 670 has been taken outside of the vehicle 650.

In any case, after the smartphone 670 deems that it is no longer inside the vehicle 650, it will reset the audio output volume to the recorded volume setting right before the smartphone 670 was placed inside the vehicle 650 (and thus before the audio output volume of the smartphone 670 was increased). This ensures that the user need not worry about resetting the volume control settings manually after reaching the target destination. In other words, by being contextually-aware (i.e., no longer being inside the vehicle 650), the smartphone 670 is automatically programmed to perform a task (i.e., restoring the volume to its previous setting) that the user would have had to do once the target destination is reached. Therefore, in this example above, the smartphone 670 restores its audio output volume back to a "vibrate" mode after detecting that it is no longer inside the vehicle 650, since the "vibrate" setting was the previous audio setting used for the smartphone 670 prior to it being placed inside the vehicle 650. Similarly, had the volume been set at 50% of the maximum audio output volume by its previous audio setting, the smartphone 670 will restore the volume again to 50% after the smartphone 670 is taken outside of the vehicle 650. By resetting the audio output volume to its previous setting, the user will not be potentially disrupted by loud phone calls, emails, or messages in an inappropriate environment.

It is understood that contextually-aware audio output volume adjustment mode discussed above may be entirely disabled by the user (e.g., through the necessary settings) if the user so desires. However, if such mode is enabled, the smartphone 670 can automatically output a loud volume in a vehicle when it is desired, and automatically restore the smartphone 670 to its original volume once it is outside the vehicle, without requiring user intervention. As such, user satisfaction with respect to using the smartphone 670 should be increased.

Figure 29:
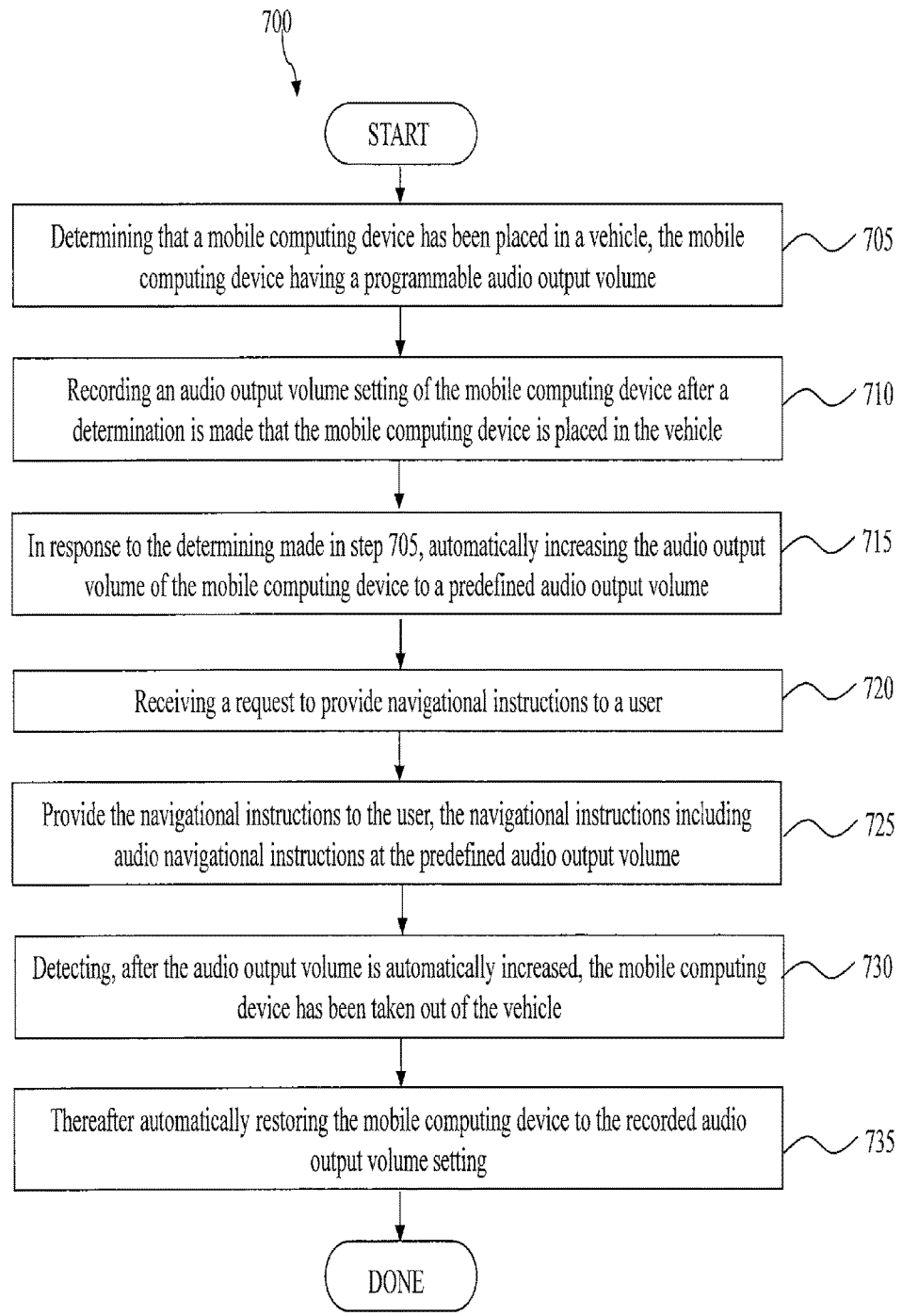
FIG. 29 is a simplified flowchart illustrating a method of using a mobile computing device to perform a contextually-aware automatic volume adjustment according to various aspects of the present disclosure.

FIG. 29 is a simplified flowchart illustrating a method 700 for operating the contextually-aware mobile computing device discussed above. In some embodiments, the mobile computing device includes a mobile telephone, a tablet computer, a laptop computer, or a smart watch or glass.

The method 700 includes a step 705, in which a determination is made that a mobile computing device has been placed in a vehicle. The mobile computing device having a programmable audio output volume. In some embodiments, the vehicle is an automobile. The method 700 includes a step 710, in which an audio output volume setting of the mobile computing device is recorded after the determination is made that the mobile computing device is placed in the vehicle. The method 700 includes a step 715, in which in response to the determination made in step 705, the audio output volume of the mobile computing device is automatically increased to a predefined audio output volume. The method 700 includes a step 720, in which a request to provide navigational instructions is received from a user. The method 700 includes a step 725, in which the navigational instructions are provided to the user. The navigational instructions include audio navigational instructions at the predefined audio output volume. The method 700 includes a step 730, in which after the audio output volume is automatically increased, a detection is made that the mobile computing device has been taken out of the vehicle. The method 700 includes a step 735, in which the mobile computing device is automatically restored to the recorded audio output volume setting.

In some embodiments, the predefined output volume is a maximum output volume of the mobile computing device.

In some embodiments, the determining step in 705 includes a step of detecting that the mobile computing device has been plugged into a dock inside the vehicle. In some embodiments, the step of detecting includes detecting that one or more ports of the mobile computing device have been connected to an electronic interface of the dock.

In some embodiments, the mobile computing device includes one or more sensors that measure a movement speed of the mobile computing device, in which case the step of determining in step 705 includes: a step of measuring, via the one or more sensors, the movement speed of the mobile computing device; and a step of determining that the mobile computing device has been placed in the vehicle in response to the measured movement speed of the mobile computing device being within a predefined speed range. In some embodiments, the predefined speed range is above a maximum speed of a human and within a normal speed range of the vehicle.

It is understood that, unless otherwise specified, the steps 705-735 of the method 700 are not necessarily performed in numerical order. It is also understood that addition process steps may be performed before, during, or after the steps 705-735 in FIG. 29. For example, the method 700 may further include a step of decreasing, before the determining, the audio output volume of the mobile computing device in response to user request. In some embodiments, the step of decreasing the audio output volume of the mobile computing device comprises muting the mobile computing device. In some embodiments, the step of automatically increasing the audio output volume comprises overriding the muting of the mobile computing device.

Figure 30:
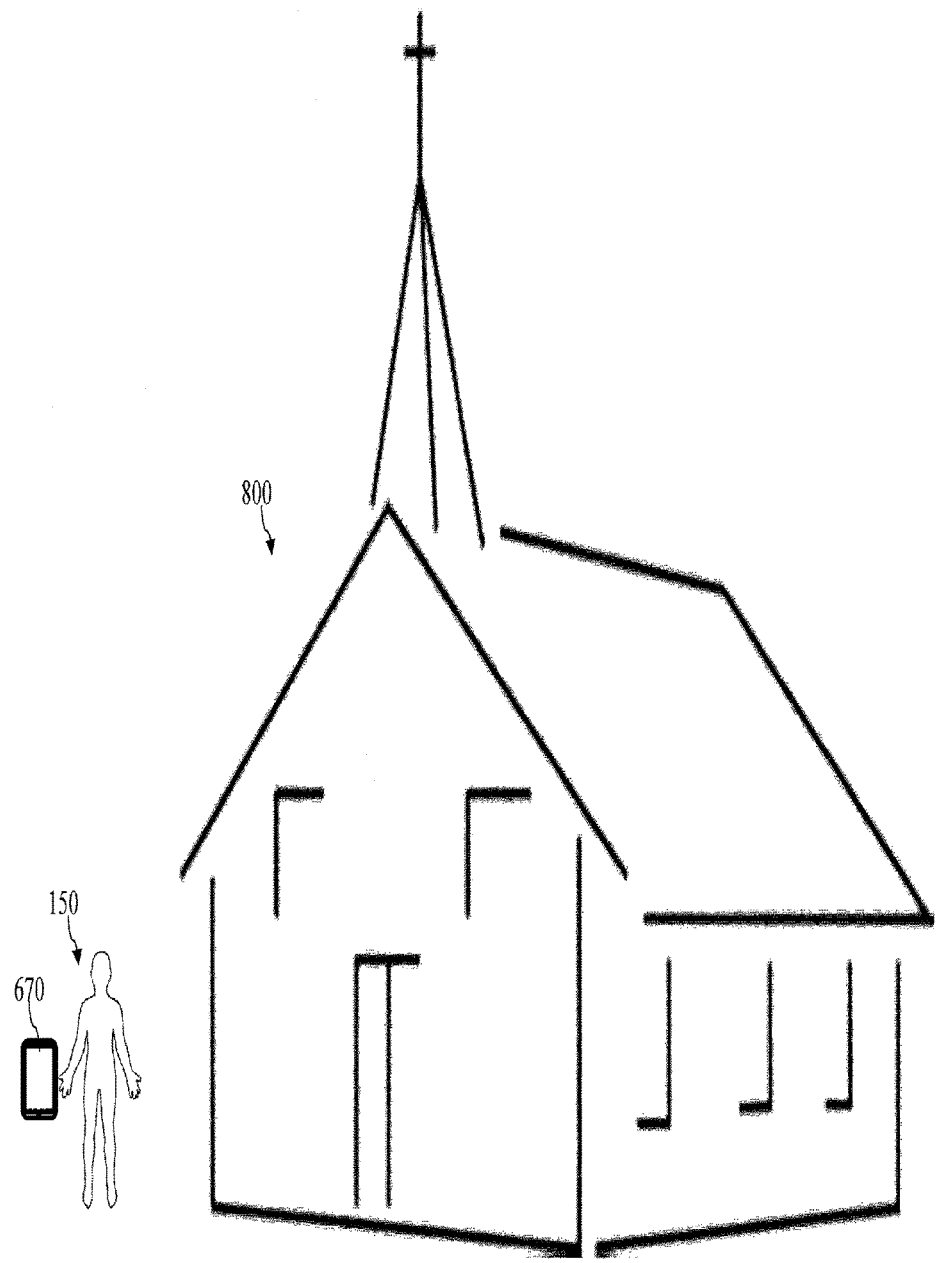
FIG. 30 is a diagrammatic view of an example environment in which a mobile computing device performs locationally-aware automatic volume adjustment according to various aspects of the present disclosure.

FIG. 30 illustrates another scenario in which the contextually-aware mobile computing device 100 performs automatic volume control. Referring now to FIG. 30, the user 150 is at a facility 800. In the embodiment illustrated in FIG. 30, the facility 800 is a church (and it is hereinafter referred to as the church 800), but it is understood that the facility 800 could be any other type of business, establishment, building, etc., in alternative embodiments. Suppose that the user 150 normally keeps the smartphone 670 (an example embodiment of the mobile computing device 100) on a relatively loud volume, but he/she would prefer to keep the smartphone 670 in a silent type mode when he/she is inside the church 800. The silent mode may be either a "vibrate" mode where the smartphone 670 vibrates instead of rings for incoming calls/messages/alerts, or a "mute" mode where the smartphone 670 mutes all sounds and does not vibrate either. Previously, the user 150 would have to remember to actively set the smartphone 670 in the silent mode when he/she is inside the church 800, and then remember to take the smartphone 670 out of the silent mode after leaving the church 800. Problems often arise when the user 150 either forgets to put the smartphone 670 in the silent mode while in the church 800 (e.g., a loud phone call during a quiet church service), or forgets to take the smartphone 670 out of the silent mode after leaving the church 800 (e.g., missing potential phone calls/emails/alerts/messages due to the smartphone 670 being silent).

To address these issues, the contextually-aware smartphone 670 performs automatic volume control based on the detected location of the smartphone 670. For example, in some embodiments, the smartphone 670 detects, via Global Positioning System (GPS) sensors on the smartphone 670, that the user 150 always puts the smartphone 670 in a silent mode at the GPS coordinates corresponding to the church 800. If this pattern is repeated frequently, the smartphone 670 may determine that the user 150 always intends to put the smartphone 670 in the silent mode while he/she is at these GPS coordinates (i.e., the user 150 being at the church 800). The next time the smartphone 670 detects that it is at, or very close to, these GPS coordinates corresponding to the church 800, it will record the audio output volume settings of the smartphone 670 (e.g., at 80% of the maximum volume), and then automatically set the smartphone 670 in the silent mode. When the smartphone 670 detects that it is no longer at those GPS coordinates (i.e., the user 150 has left the church 800), the smartphone 670 will now take itself out of the silent mode and restore the volume to the recorded audio output volume settings (e.g., back to 80% of the maximum volume). Therefore, the user need not remember to tinker with the smartphone 670's volume settings each time he/she goes to, and leaves, the church 800.

In some other embodiments, instead of relying on the user 150's behavioral patterns to determine what the user 150 intends to do, the smartphone 670 is configured to receive a request from the user 150 to "remember" the present location (i.e., the GPS coordinates corresponding to the location of the church 800). The request also specifies that the smartphone 670 should be set in a silent mode when the smartphone 670 is at this location. In other words, the user 150 lets the smartphone 670 "know" at which location it should be silent. In response to this request, the smartphone 670 records the location of the church 800, for example through its GPS coordinates and saves it into an electronic database, which could be either locally maintained on the smartphone 670 itself, or remotely maintained in a remote database. Again, the smartphone 670 will record the audio output volume settings of the smartphone 670 before it is put in the silent mode. Thereafter, the next time the user 150 visits the church 800, the smartphone 670 will automatically put itself in silent mode as long as the user 150 is in the church, and it will take itself out of the silent mode and restore the originally audio output volume when the user 150 leaves the church.

In some embodiments, the smartphone 670 will also gather time-related information when the smartphone 670 is put into the silent mode by the user 150. The time-related information may include the time of the day, the day of the week, or the day or week of the month, etc. By gather time-related information, the smartphone 670 may be able to determine if there is a pattern associated with when the user 150 wants to put the smartphone 670 into the silent mode. For example, if the user 150 has consistently attempted to put the smartphone 670 into silent mode every Sunday morning from 9 AM to 11 AM, then this information may be used later to assist with the automatic volume control. In some embodiments, even if the GPS sensors are normally inactive or disabled, the smartphone 670 may activate the GPS sensors between about 9 AM to 11 AM on Sundays to detect the location of the smartphone 670 (and thus the user 150). If the GPS sensors detect the smartphone 670 being in the church 800 during this time frame, then the smartphone 670 may perform the automatic volume adjustment discussed above (i.e., silencing the smartphone 670 while at the church 800 and restoring the original volume after leaving the church 800).8

Figure 31:
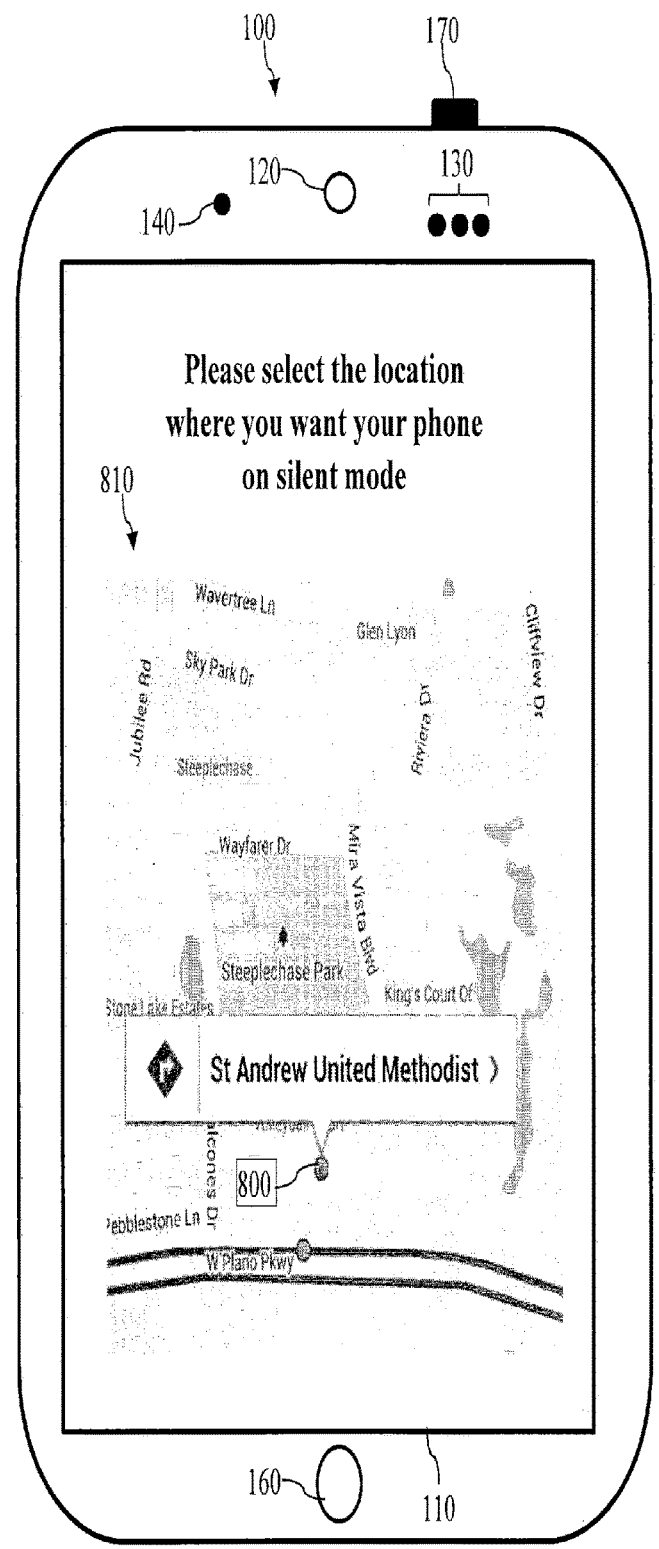
FIGS. 31-32 are diagrammatic views of various interfaces of an example mobile computing device for performing locationally-aware automatic volume adjustment according to various aspects of the present disclosure.

The user 150 also does not necessarily have to physically be at the church 800 to accomplish automatic volume control discussed above. For example, referring now to FIG. 31, the user 150 may launch a map application 810 on the smartphone 670, or on another suitable computing device capable of launching the map application 810, to which the user 810 has an account. The user 150 may use the map application to locate the church 800 and select it as a location where the user would want the smartphone 670 to be put in the silent mode. The map application 810 can obtain the GPS coordinates of the church 800 and save it in a database of predetermined or predefined locations where the smartphone 670 should be silenced.

Thereafter, if the user 150 goes to the church 800, the smartphone 670 will detect (e.g., via the GPS sensors) that it has arrived at one of the locations where the smartphone 670 should be put into silent mode. The smartphone 670 will thus put itself in the silent mode without requiring user intervention and remain silent as long as the user 150 (and thus the smartphone 670 itself) is still at the church 800. When the user 150 leaves the church 800, the smartphone 670 will detect the departure from the church 800 and will then restore the audio volume output to its original volume (which is saved before the smartphone went into silent mode). In this manner, the user 150 need not actually be at a particular location in order to instruct the smartphone 670 that it should be in the silent mode while at that location, and not in the silent mode when it is no longer at that location.

Figure 32:
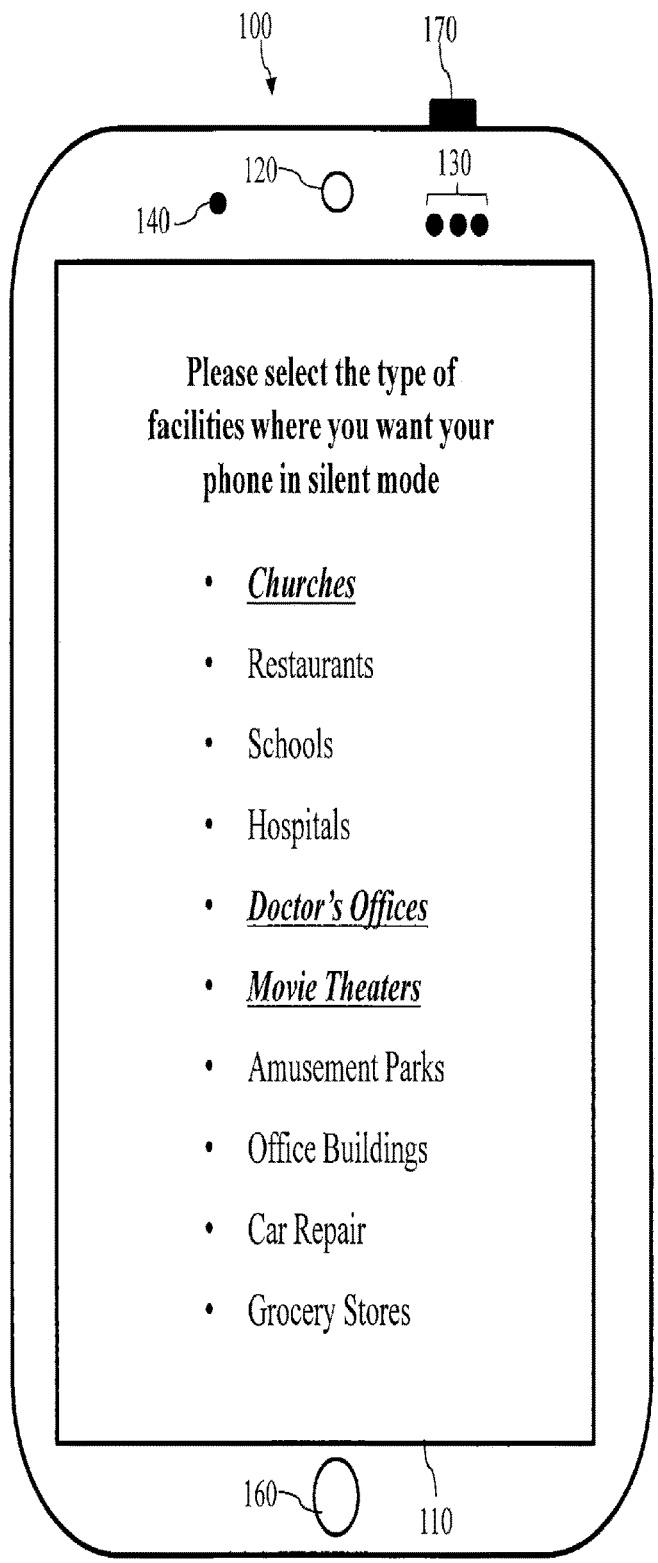

FIG. 32 illustrates another embodiment of choosing one or more predetermined locations where the smartphone 670 should be silenced. In the example in FIG. 32, the smartphone 670 displays a list of different types or categories of businesses or establishments. The user 150 is prompted to choose one or more of these types of business or establishments where he/she would want the smartphone 670 to be in silent mode. In the present example, the user has selected "Churches", "Doctor's Offices", and "Movie Theaters" as places where the smartphone 670 should be kept silent. Thereafter, using the map application 810 in FIG. 31 or another suitable application, the smartphone 670 can obtain a list of churches, doctor's offices, and movie theatres in the user's city (or a plurality of cities where the user 150 frequently visits). The smartphone 670 then retrieves the GPS coordinates (or other suitable positional information) for each church, doctor's office, and movie theater in the obtained list. These GPS coordinates are then saved in a database similar to the ones discussed above. Again, when the user 150 visits any of these places in the future, the smartphone 670 will detect the location and put itself in a silent mode. When the user 150 leaves these places, the smartphone 670 will restore its original volume settings.

In some alternative embodiments, the smartphone 670 need not save the GPS coordinates of the churches, doctor's offices, or movie theaters into a database. Instead, when the user visits a place, the smartphone 670 will look up the place being visited to see if it belongs to one of the categories selected by the user. The look-up may be done by retrieving the GPS coordinates of the place being visited, or by telecommunications with other devices, or by triangulation by cell towers, etc. Again, once a match is found, the automatic volume adjustment discussed above may be performed as well.

Figure 33:
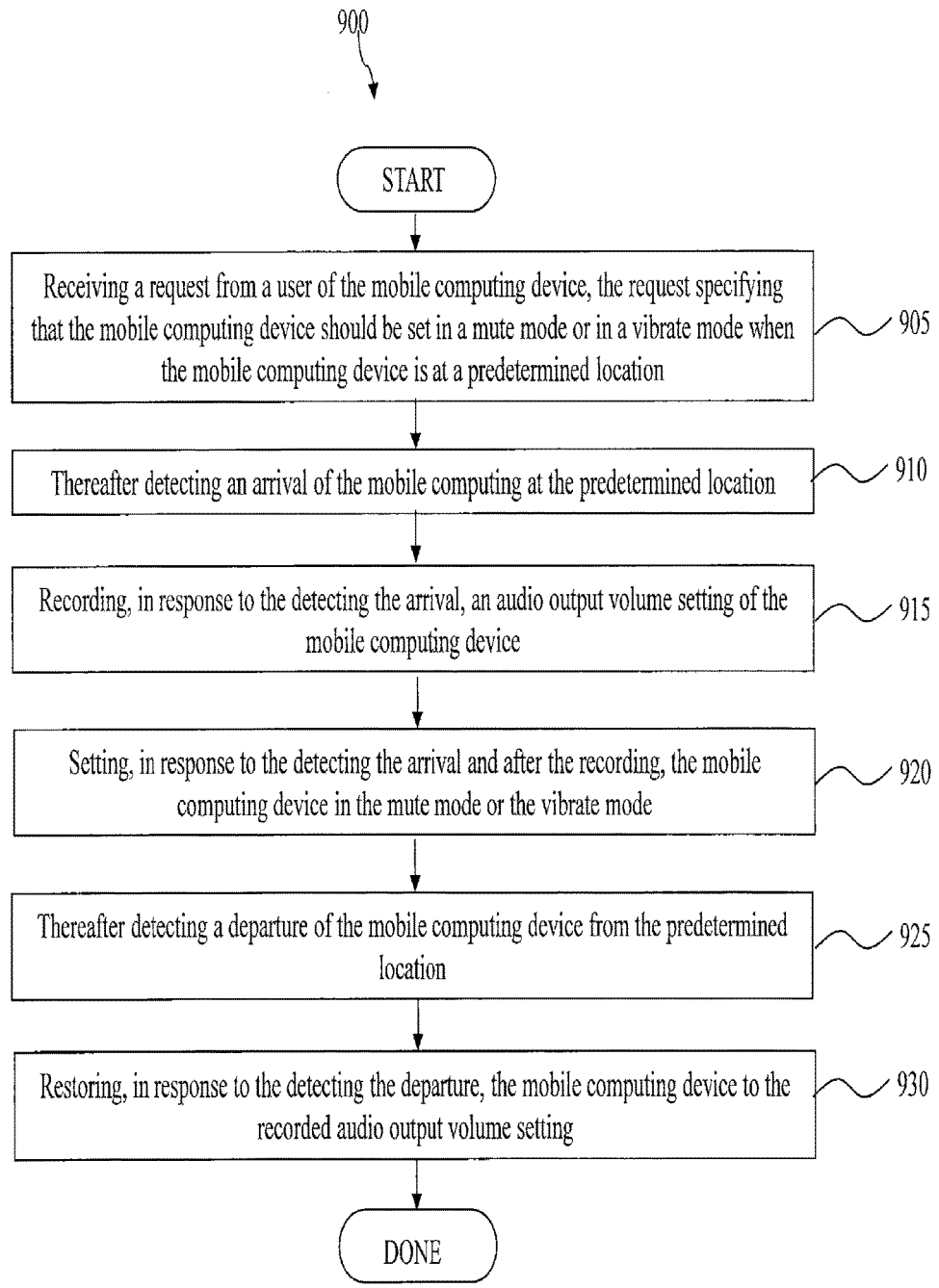
FIG. 33 is a simplified flowchart illustrating a method of using a mobile computing device to perform locationally-aware automatic volume adjustment according to various aspects of the present disclosure.

FIG. 33 is a simplified flowchart illustrating a method 900 for operating the contextually-aware mobile computing device discussed above. In some embodiments, the mobile computing device includes a mobile telephone, a tablet computer, a laptop computer, or a smart watch or glass.

The method 900 includes a step 905 of receiving a request from a user of the mobile computing device. The request specifies that the mobile computing device should be set in a mute mode or in a vibrate mode when the mobile computing device is at a predetermined location. The method includes a step 910 of detecting an arrival of the mobile computing at the predetermined location after the step 905. The method includes a step 915 of recording, in response to the step of detecting the arrival in step 910, an audio output volume setting of the mobile computing device. The method includes a step 920 of setting, in response to the detecting the arrival and after the recording, the mobile computing device in the mute mode or the vibrate mode. The method includes a step 925 of detecting a departure of the mobile computing device from the predetermined location after the step 920. The method includes a step 930 of restoring, in response to the step of detecting the departure in step 925, the mobile computing device to the recorded audio output volume setting.

In some embodiments, the step 905 of receiving the request is performed while the mobile computing device is at the predetermined location.

In some embodiments, the step 905 of receiving the request is performed while the mobile computing device is located remotely from the predetermined location. In these embodiments, the method 900 may further include a step of identifying, in response to user input and before the receiving the request, the predetermined location from an electronic map.

In some embodiments, the step 905 of receiving the request is performed such that a facility at the predetermined location belongs to one of the following categories: a church, a movie theatre, and a doctor's office.

In some embodiments, the steps 910 and 925 of detecting the arrival and the detecting the departure each include a step of determining a location of the mobile computing device via a Global Positioning System sensor.

It is understood that, unless otherwise specified, the steps 905-930 of the method 900 are not necessarily performed in numerical order. It is also understood that addition process steps may be performed before, during, or after the steps 905-930 in FIG. 33. For reasons of simplicity, these additional process steps are not discussed in detail herein.

Figure 34:
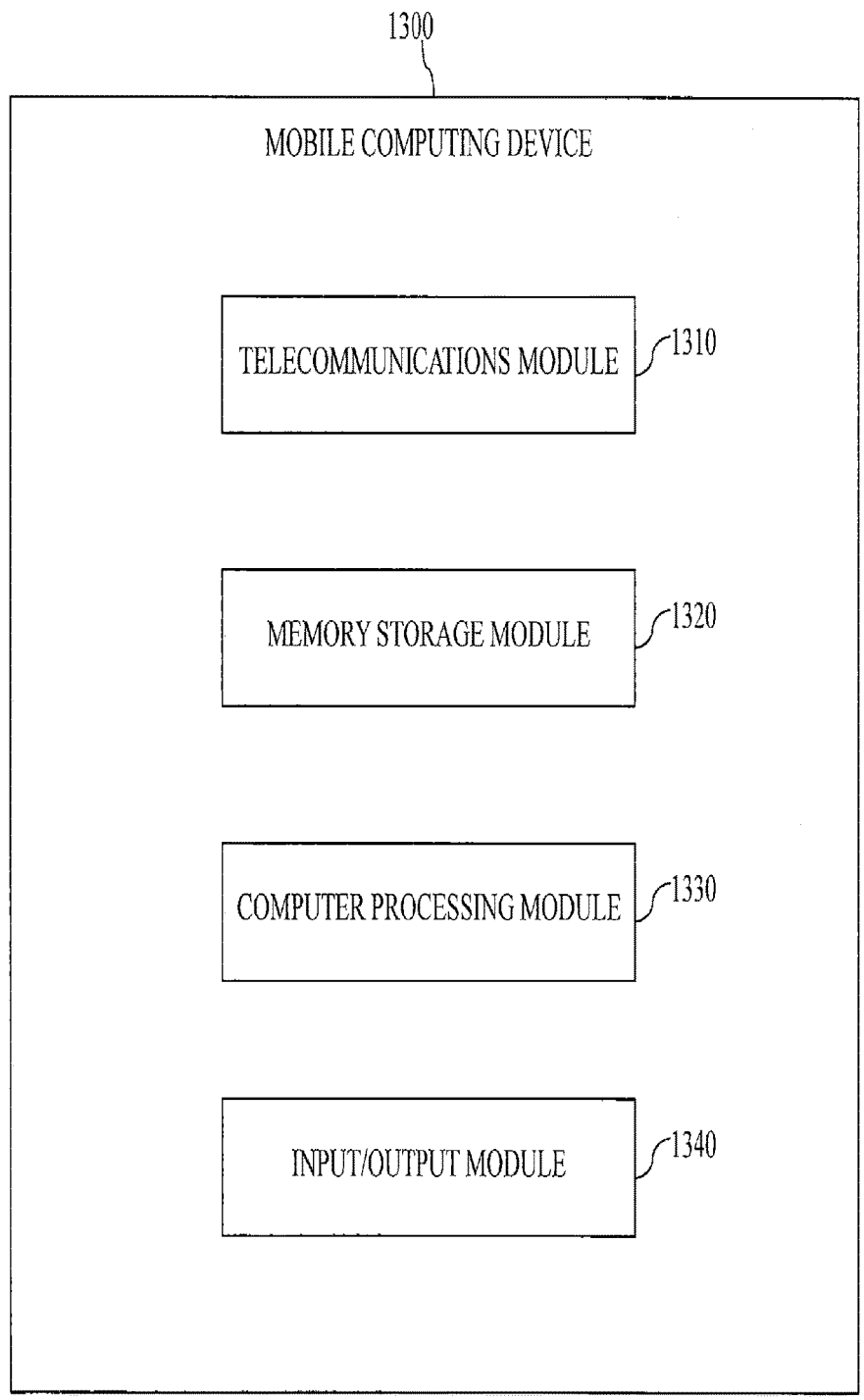
FIG. 34 is a simplified block diagram of an example mobile computing device for performing one or more of the processes of FIGS. 1-33 according to various aspects of the present disclosure.

FIG. 34 is a simplified block diagram of an electronic device 1300 according to the various aspects of the present disclosure. The electronic device 1300 may be implemented as an embodiment of the mobile computing device 100 discussed above.

The electronic device 1300 includes a telecommunications module 1310. The telecommunications module 1310 contains various electronic circuitry components configured to conduct telecommunications with one or more external devices. The electronic circuitry components allow the telecommunications module 1310 to conduct telecommunications in one or more of the wired or wireless telecommunications protocols, including communications protocols such as IEEE 802.11 (WiFi), IEEE 802.15 (Bluetooth), GSM, CDMA, LTE, WIMAX, DLNA, HDMI, etc. In some embodiments, the telecommunications module 1310 includes antennas, filters, low-noise amplifiers, digital-to-analog (DAC) converters, analog-to-digital (ADC) converters, and transceivers. The transceivers may further include circuitry components such as mixers, amplifiers, oscillators, phase-locked loops (PLLs), and/or filters. Some of these electronic circuitry components may be integrated into a single discrete device or an integrated circuit (IC) chip.

The electronic device 1300 may include a computer memory storage module 1320. The memory storage module 1320 may contain various forms of digital memory, such as hard disks, FLASH, SRAM, DRAM, ROM, EPROM, memory chips or cartridges, etc. Computer programming code may be permanently or temporarily stored in the memory storage module 1320, for example. In some embodiments, the computer memory storage module 1320 may include a cache memory where files can be temporarily stored.

The electronic device 1300 may also include a computer processing module 1330. The computer processing module 1330 may contain one or more central processing units (CPUs), graphics processing units (GPUs), or digital signal processors (DSPs), which may each be implemented using various digital circuit blocks (including logic gates such as AND, OR, NAND, NOR, XOR gates, etc) along with certain software code. The computer processing module 1330 may be used to execute the computer programming code stored in the memory storage module 1320.

The electronic device 1300 may also include an input/output module 1340, which may serve as a communications interface for the electronic device 1300. In some embodiments, the input/output module 1340 may include one or more touch-sensitive screens, physical and/or virtual buttons (such as power and volume buttons) on or off the touch-sensitive screen, physical and/or virtual keyboards, mouse, track balls, speakers, microphones, light-sensors, light-emitting diodes (LEDs), communications ports (such as USB or HDMI ports), joy-sticks, image-capture devices (for example cameras), etc. In some embodiments, the touch-sensitive screen may be used to display visual objects discussed above. The various features of the present disclosure discussed above may also be accomplished at least in part using the touch-sensitive screen and/or other components of the input/output module 1340. In alternative embodiments, a non-touch screen display may be implemented as a part of the input/output module 1340.

Figure 35:
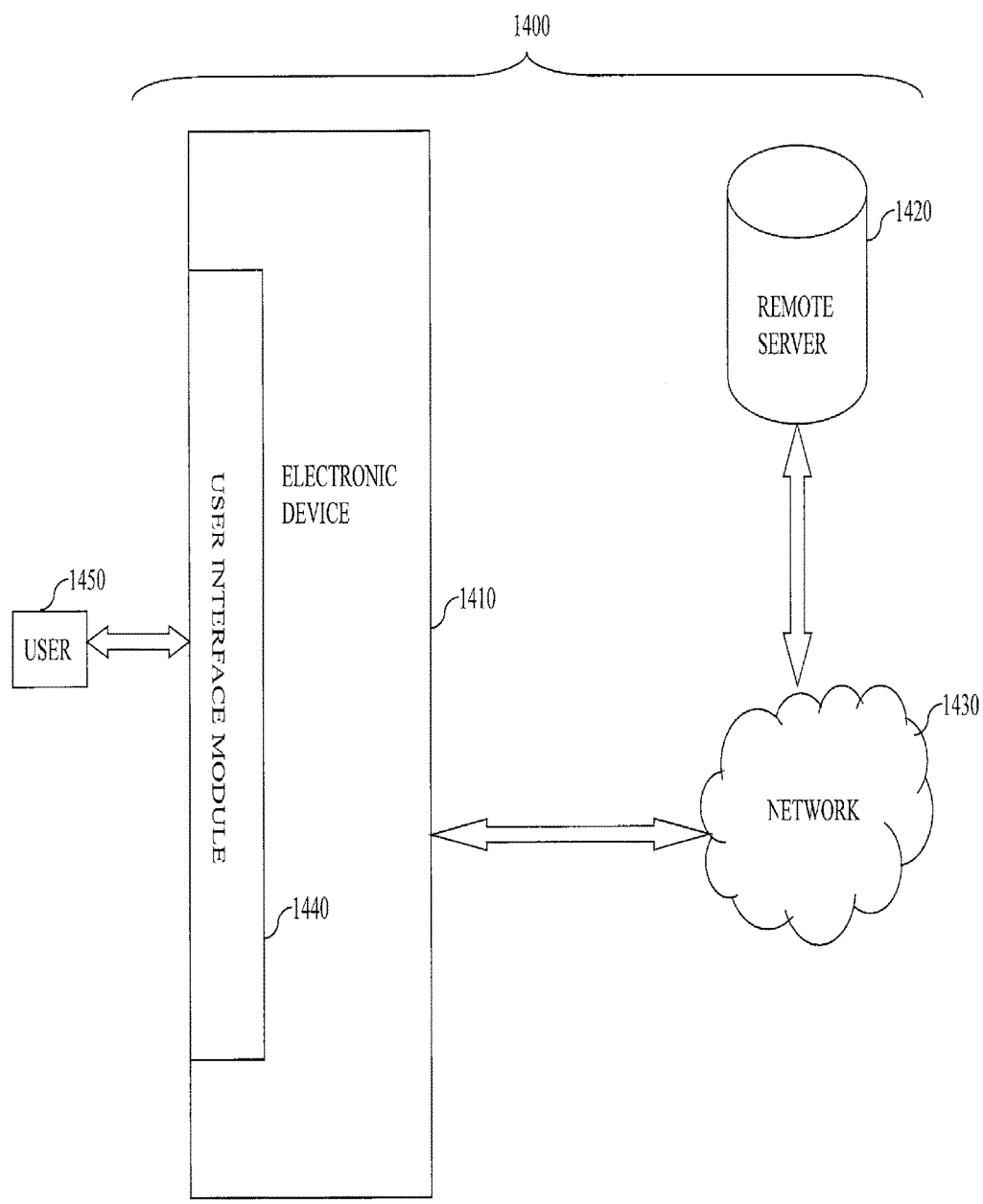
FIG. 35 is a simplified block diagram of an example system for performing one or more of the processes of FIGS. 1-33 according to various aspects of the present disclosure.

FIG. 35 is a simplified diagrammatic view of a system 1400 that may be used to perform certain aspects of the present disclosure discussed above. In some embodiments, the system 1400 may include an electronic device 1410. The electronic device 1410 may be implemented as an embodiment of the electronic device 1300 of FIG. 34. In some embodiments, the electronic device 1410 includes a tablet computer, a mobile telephone, a laptop, a smart watch, or a smart glass.

The system 1400 also includes a remote server 1420. The remote server 1420 may be implemented in a "cloud" computing environment and may include one or more databases that store files, for example the various files that can also be stored locally in the electronic device 1410 as discussed above.

The electronic device 1410 and the remote server 1420 may be communicatively coupled together through a network 1430. The network 1430 may include cellular towers, routers, switches, hubs, repeaters, storage units, cabling (such as fiber-optic cabling or telephone cabling), and other suitable devices. The network 1430 may be implemented using any of the suitable wired or wireless networking protocols. The electronic device 1410 and the remote server 1420 may also be able to communicate with other devices on the network 1430 and either carry out instructions received from the network, or send instructions through the network to these external devices to be carried out.

To facilitate user interaction with its offered services, a service provider (that hosts or operates the remote server 1420) may provide a user interface module 1440. The user interface module 1440 may include software programming code and may be installed on the electronic device 1410 (for example in a memory storage module). In some embodiments, the user interface module 440 may include a downloadable "app", for example an app that is downloadable through a suitable service such as APPLE's® ITUNE®, THE APP STORE® from APPLE®, ANDROID's® PLAY STORE®, AMAZON's® INSTANT VIDEO®, MICROSOFT's® WINDOWS STORE®, RESEARCH IN MOTION's® BLACKBERRY APP WORLD®, etc. In the embodiment shown, the user interface module 1440 includes an instance of the "app" that has been downloaded and installed on the electronic device 1410. The app may also be used to perform the various aspects of the present disclosure discussed above, such as with respect to face-unlock, voice-unlock, dynamically adjustable screen time-out, customizable lock screen, and/or the contextually-aware volume controls discussed above.

A user 1450 may interact with the system 1400 by sending instructions to the electronic device 1410 through the user interface module 1440. For example, the user 1450 may be a subscriber of the services offered by the service provider running/hosting/operating the remote server 1420. The user 1450 may attempt to log in to the remote server 1420 by launching the "app" of the user interface 1440. The user's login credentials are electrically sent to the remote server 1420 through the network 1430. After verifying the user login credentials, the remote server 1420 may instruct the user interface module 1440 to display a suitable interface to interact with the user in a suitable manner.

One aspect of the present disclosure involves a mobile computing device. The mobile computing device includes: a computer memory storage module configured to store executable computer programming code; and a computer processor module operatively coupled to the computer memory storage module. The computer processor module is configured to execute the computer programming code to perform the following operations: receiving, from a user, a request to gain access to a mobile computing device; detecting, via the mobile computing device, an ambient lighting condition; comparing the detected ambient lighting condition with a predefined threshold; determining that the detected ambient lighting condition is below the predefined threshold; performing at least one of the following tasks in response to the determining: activating a front-facing light-emitting diode (LED) mechanism of the mobile computing device, or illuminating at least a portion of a screen of the mobile computing device; and performing, while the LED mechanism is activated or while the portion of the screen of the mobile computing device is illuminated, a face-unlock action on the mobile computing device to authenticate the user.

Another aspect of the present disclosure involves a method. The method includes: receiving, from a user, a request to gain access to a mobile computing device; detecting, via the mobile computing device, an ambient lighting condition; comparing the detected ambient lighting condition with a predefined threshold; determining that the detected ambient lighting condition is below the predefined threshold; performing at least one of the following tasks in response to the determining: activating a front-facing light-emitting diode (LED) mechanism of the mobile computing device, or illuminating at least a portion of a screen of the mobile computing device; and performing, while the LED mechanism is activated or while the portion of the screen of the mobile computing device is illuminated, a face-unlock action on the mobile computing device to authenticate the user.

Yet another aspect of the present disclosure involves a mobile computing device. The mobile computing device includes: a computer memory storage module configured to store executable computer programming code; and a computer processor module operatively coupled to the computer memory storage module. The computer processor module is configured to execute the computer programming code to perform the following operations: engaging in a voice-based interaction with a user of the mobile computing device; recording a spoken phrase from the user during the voice-based interaction; selecting a segment of the spoken phrase as a password for authenticating the user; saving a recording of the segment of the spoken phrase as a recorded password in a database; receiving, from the user, a request to gain access to the mobile computing device; prompting, in response to the receiving the request, the user to speak the password to the mobile computing device; thereafter recording one or more words spoken by the user in response to the prompting; comparing the one or more words spoken by the user with the recorded password; and authenticating the user in response to the comparing.

One more aspect of the present disclosure involves a method. The method includes: engaging in a voice-based interaction with a user of the mobile computing device; recording a spoken phrase from the user during the voice-based interaction; selecting a segment of the spoken phrase as a password for authenticating the user; saving a recording of the segment of the spoken phrase as a recorded password in a database; receiving, from the user, a request to gain access to the mobile computing device; prompting, in response to the receiving the request, the user to speak the password to the mobile computing device; thereafter recording one or more words spoken by the user in response to the prompting; comparing the one or more words spoken by the user with the recorded password; and authenticating the user in response to the comparing.

Yet one more aspect of the present disclosure involves a mobile computing device. The mobile computing device includes: a computer memory storage module configured to store executable computer programming code; and a computer processor module operatively coupled to the computer memory storage module. The computer processor module is configured to execute the computer programming code to perform the following operations: receiving a default screen time-out period for a mobile computing device, the screen time-out period specifying an amount of time that passes without the mobile computing device receiving any touch input from a user before a screen of the mobile computing device turns off; displaying content on the screen of the mobile computing device; dimming the screen after the content has been displayed, without receiving any touch input from the user, for an amount of time shorter than the default screen time-out period by X number of seconds; thereafter receiving a touch input from the user; un-dimming the screen in response to receiving the touch input; and increasing, in response to receiving the touch input, the default screen time-out period to a first new screen time-out period, the first new screen time-out period being longer than the default screen time-out period.

One more aspect of the present disclosure involves a method. The method includes: receiving a default screen time-out period for a mobile computing device, the screen time-out period specifying an amount of time that passes without the mobile computing device receiving any touch input from a user before a screen of the mobile computing device turns off; displaying content on the screen of the mobile computing device; dimming the screen after the content has been displayed, without receiving any touch input from the user, for an amount of time shorter than the default screen time-out period by X number of seconds; thereafter receiving a touch input from the user; un-dimming the screen in response to receiving the touch input; and increasing, in response to receiving the touch input, the default screen time-out period to a first new screen time-out period, the first new screen time-out period being longer than the default screen time-out period.

Yet one more aspect of the present disclosure involves a mobile computing device. The mobile computing device includes: a computer memory storage module configured to store executable computer programming code; and a computer processor module operatively coupled to the computer memory storage module. The computer processor module is configured to execute the computer programming code to perform the following operations: setting a screen time-out period for a mobile computing device, the screen time-out period specifying an amount of time that passes without the mobile computing device receiving any touch input from a user before a screen of the mobile computing device turns off; displaying content on the screen of the mobile computing device; monitoring a frequency of touch inputs from the user while the content is being displayed; and adjusting the screen time-out period in response to the monitoring.

One more aspect of the present disclosure involves a method. The method includes: setting a screen time-out period for a mobile computing device, the screen time-out period specifying an amount of time that passes without the mobile computing device receiving any touch input from a user before a screen of the mobile computing device turns off; displaying content on the screen of the mobile computing device; monitoring a frequency of touch inputs from the user while the content is being displayed; and adjusting the screen time-out period in response to the monitoring.

Yet one more aspect of the present disclosure involves a mobile computing device. The mobile computing device includes: a computer memory storage module configured to store executable computer programming code; and a computer processor module operatively coupled to the computer memory storage module. The computer processor module is configured to execute the computer programming code to perform the following operations: associating a plurality of tasks executable by a mobile computing device with a plurality of predefined symbols, respectively; turning on a touch-sensitive display of the mobile computing device in response to a request from a user, the display showing a lock screen; detecting, through the touch-sensitive display, a gesture input from the user, the gesture input representing one of the predefined symbols that has been associated with one of the tasks; and executing the task associated with the detected symbol from the gesture input.

One more aspect of the present disclosure involves a method. The method includes: associating a plurality of tasks executable by a mobile computing device with a plurality of predefined symbols, respectively; turning on a touch-sensitive display of the mobile computing device in response to a request from a user, the display showing a lock screen; detecting, through the touch-sensitive display, a gesture input from the user, the gesture input representing one of the predefined symbols that has been associated with one of the tasks; and executing the task associated with the detected symbol from the gesture input.

Yet one more aspect of the present disclosure involves a mobile computing device. The mobile computing device includes: a computer memory storage module configured to store executable computer programming code; and a computer processor module operatively coupled to the computer memory storage module. The computer processor module is configured to execute the computer programming code to perform the following operations: determining that a mobile computing device has been placed in a vehicle, the mobile computing device having a programmable audio output volume; and in response to the determining, automatically increasing the audio output volume of the mobile computing device to a predefined audio output volume.

One more aspect of the present disclosure involves a method. The method includes: determining that a mobile computing device has been placed in a vehicle, the mobile computing device having a programmable audio output volume; and in response to the determining, automatically increasing the audio output volume of the mobile computing device to a predefined audio output volume.

Yet one more aspect of the present disclosure involves a mobile computing device. The mobile computing device includes: a computer memory storage module configured to store executable computer programming code; and a computer processor module operatively coupled to the computer memory storage module. The computer processor module is configured to execute the computer programming code to perform the following operations: receiving a request from a user of the mobile computing device, the request specifying that the mobile computing device should be set in a mute mode or in a vibrate mode when the mobile computing device is at a predetermined location; thereafter detecting an arrival of the mobile computing at the predetermined location; recording, in response to the detecting the arrival, an audio output volume setting of the mobile computing device; setting, in response to the detecting the arrival and after the recording, the mobile computing device in the mute mode or the vibrate mode; thereafter detecting a departure of the mobile computing device from the predetermined location; and restoring, in response to the detecting the departure, the mobile computing device to the recorded audio output volume setting.

One more aspect of the present disclosure involves a method. The method includes: receiving a request from a user of the mobile computing device, the request specifying that the mobile computing device should be set in a mute mode or in a vibrate mode when the mobile computing device is at a predetermined location; thereafter detecting an arrival of the mobile computing at the predetermined location; recording, in response to the detecting the arrival, an audio output volume setting of the mobile computing device; setting, in response to the detecting the arrival and after the recording, the mobile computing device in the mute mode or the vibrate mode; thereafter detecting a departure of the mobile computing device from the predetermined location; and restoring, in response to the detecting the departure, the mobile computing device to the recorded audio output volume setting.

It should be appreciated that like reference numerals in the present disclosure are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A mobile computing device, comprising:
an electronic memory storing executable instructions; and
one or more electronic processors configured to execute the instructions stored in the electronic memory to perform the following steps:
associating a first task with a first predefined symbol, wherein the first task includes a task executable by the mobile computing device after the mobile computing device has been unlocked;
detecting, through a touch-sensitive display of the mobile computing device a first gesture input from a user while the mobile computing device is locked, the first gesture input representing the first predefined symbol;
determining whether the first gesture input includes one or more letters in an alphabet;
performing a first verification or a second verification wherein:
the first verification comprises verifying the first predefined symbol with a first level of scrutiny in response to a determination that the first gesture input includes the one or more letters in the alphabet; and
the second verification comprises verifying the first predefined symbol with a second level of scrutiny in response to a determination that the first gesture input does not include any letter in the alphabet but includes a user-defined symbol, the second level of scrutiny being lower than the first level; and in response to a successful first verification or successful second verification of the first predefined symbol, executing the first task;

in response to a failed first verification or failed second verification of the first predefined symbol, requesting the user to go through a back-up security verification process wherein the back-up security verification process includes password-unlock, a face-unlock, or a voice-unlock.

2. The mobile computing device of claim 1, wherein the verifying first verification or the second verification comprises comparing the first gesture input with an image.

3. The mobile computing device of claim 1, wherein the associating comprises:
displaying a plurality of different types of tasks to the user;
prompting the user to associate the first predefined symbol to a first task of the different types of tasks and prompting the user to associate a second predefined symbol to a second task of the different types of tasks; and
receiving, from the user, an association between the first task and the first predefined symbol and an association between the second task and the second predefined symbol.

4. The mobile computing device of claim 3, wherein the displaying the different types of tasks comprises: listing names of the different types of tasks; or displaying virtual representations of the different types of tasks.

5. The mobile computing device of claim 3, wherein the prompting comprises prompting the user to draw the first predefined symbol on the touch-sensitive display.

6. The mobile computing device of claim 3, wherein the steps further comprise: detecting, through the touch-sensitive display of the mobile computing device, a second gesture input from the user while the mobile computing device is locked, the second vesture input representing the second predefined symbol; and executing the second task in response to the detecting of the second gesture input.

7. The mobile computing device of claim 3, wherein the associating comprises: associating multiple symbols to at least one of the tasks; or associating multiple tasks to at least one of the symbols.

8. A method, comprising:
associating a first task with a first predefined symbol wherein the first task is executable by a mobile computing device after the mobile computing device has been unlocked:
detecting, through a touch-sensitive display of the mobile computing device, a first gesture input from a user while the mobile computing device is locked, the first gesture input representing the first predefined symbol;
determining whether the first predetermined symbol includes one or more letters in an alphabet;
performing a first verification or a second verification, wherein:
the first verification comprises, verifying the first predefined symbol with a first level of scrutiny in response to a determination that the first predefined symbol includes the one or more letters in the alphabet;
the second verification comprises verifying the first predefined symbol with a second level of scrutiny in response to a determination that the first predefined symbol does not include any letters in the alphabet but includes a user-defined symbol, the second level of scrutiny being lower than the first level; and in response to a successful first verification or successful second verification of the first predefined symbol, executing the first task;

in response to a failed first verification or failed second verification of the first predefined symbol, requesting the user to go through a back-up security verification process wherein the back-up security verification process includes password-unlock, a face-unlock, or a voice-unlock.

9. The method of claim 8, wherein the associating comprises:
displaying a plurality of different types of tasks to the user;
prompting the user to associate the first predefined symbol to a first task of the different types of tasks and prompting the user to associate a second predefined symbol to a second task of the different types of tasks; and
receiving, from the user, an association between the first task and the first predefined symbol and an association between the second task and the second predefined symbol.

10. The method of claim 9, wherein the displaying the different types of tasks comprises:
listing names of the different types of tasks; or
displaying virtual representations of the different types of tasks; and
wherein the verifying comprises comparing the first gesture input with an image.

11. The method of claim 9, wherein the prompting comprises prompting the user to draw the first predefined symbol on the touch-sensitive display.

12. The method of claim 9, further comprising; detecting through the touch-sensitive display of the mobile computing device, a second gesture input from the user while the mobile computing device is locked, the second gesture input representing the second predefined symbol; and executing the second task in response to the detecting of the second gesture input.

13. The method of claim 8, wherein the associating comprises: associating multiple symbols other than the first predefined symbol with the first task; or associating the first task and a plurality of other tasks with the first symbol.

14. A mobile computing device, comprising:
an electronic memory storing executable instructions; and
one or more electronic processors configured to execute the instructions stored in the electronic memory to perform the following steps:
associating a plurality of tasks executable by the mobile computing device with a plurality of predefined symbols, respectively, wherein at least one of the plurality of tasks includes launching a mobile app;
detecting, through a touch-sensitive display of the mobile computing device and while the touch-sensitive display is displaying a lock screen, a gesture input from a user, the gesture input representing one of the predefined symbols that has been associated with one of the plurality of tasks;
determining whether the one of the predefined symbols includes one or more letters of a known alphabet;
performing a first verification or a second verification, wherein:
the first verification comprises verifying the one of the predefined symbols with a first level of scrutiny in response to a determination that the one of the predefined symbols includes the one or more letters in the known alphabet; and the second verification comprises verifying the one of the predefined symbols with a second level of scrutiny in response to a determination that the one of the predefined symbols does not include any letters in the known alphabet but includes a user-defined symbol, the second level of scrutiny being lower than the first level; and in response to a successful first verification or a successful second verification of the one of the predefined symbols, executing one of the plurality of tasks represented by the one of the predefined symbols;

in response to a failed first verification or failed second verification of the first predefined symbol, requesting the user to go through a back-up security verification process wherein the back-up security verification process includes password-unlock, a face-unlock, or a voice-unlock.

15. The mobile computing device of claim 14, wherein the first verification or the second verification comprises comparing the gesture input with an image.

16. The mobile computing device of claim 14, wherein the associating comprises: displaying the tasks to the user; prompting the user to associate the predefined symbols to the tasks, respectively; and receiving, from the user, associations between the tasks and the predefined symbols.

17. The mobile computing device of claim 16, wherein the displaying the tasks comprises: listing names of the tasks; or displaying virtual representations of the tasks.

18. The mobile computing device of claim 16, wherein the prompting comprises prompting the user to define one of the predefined symbols by the user drawing the one of the predefined symbols on the touch-sensitive display.

19. The mobile computing device of claim 16, wherein the steps further comprise: detecting through the touch-sensitive display of the mobile computing device, a further gesture input from the user while the mobile computing device is locked, the further gesture input representing another one of the predefined symbols; and executing another one of the plurality of tasks in response to the detecting of the further gesture input.

20. The mobile computing device of claim 14, wherein the associating comprises: associating multiple symbols to at least one of the tasks; or associating multiple tasks to at least one of the symbols.

* * * * *